United States Patent
Li et al.

(10) Patent No.: US 12,483,752 B2
(45) Date of Patent: Nov. 25, 2025

(54) DISPLAY DEVICE AND AUDIO DATA PROCESSING METHOD THROUGH AN EXTERNAL AUDIO OUTPUT DEVICE

(71) Applicant: HISENSE VISUAL TECHNOLOGY CO., LTD., Shandong (CN)

(72) Inventors: Xianqi Li, Shandong (CN); Wenwen Gao, Shandong (CN); Haocheng Yu, Shandong (CN); Bin Wang, Shandong (CN); Jiande Wei, Shandong (CN); Qiang Wang, Shandong (CN); Xing Wang, Shandong (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 247 days.

(21) Appl. No.: 18/138,996

(22) Filed: Apr. 25, 2023

(65) Prior Publication Data
US 2023/0262286 A1    Aug. 17, 2023

Related U.S. Application Data

(63) Continuation of application No. PCT/CN2022/090559, filed on Apr. 29, 2022.

(30) Foreign Application Priority Data

Apr. 30, 2021   (CN) .......................... 202110479262.0
Apr. 30, 2021   (CN) .......................... 202110479263.5
(Continued)

(51) Int. Cl.
*H04N 21/439*   (2011.01)
*G06F 3/16*      (2006.01)
*H04N 21/431*   (2011.01)

(52) U.S. Cl.
CPC ......... *H04N 21/4396* (2013.01); *G06F 3/165* (2013.01); *H04N 21/431* (2013.01)

(58) Field of Classification Search
None
See application file for complete search history.

(56) References Cited

U.S. PATENT DOCUMENTS

| 5,617,502 A | 4/1997 | Ort et al. |
| 10,359,987 B2 * | 7/2019 | Lambourne ............ G11B 27/00 |

(Continued)

FOREIGN PATENT DOCUMENTS

| CN | 101448164 A | 6/2009 |
| CN | 101741430 A | 6/2010 |

(Continued)

OTHER PUBLICATIONS

English translation of International Search Report issued in PCT/CN2022/090559, mailed Jul. 8, 2022.

(Continued)

*Primary Examiner* — Henry Orr
(74) *Attorney, Agent, or Firm* — ANOVA LAW GROUP, PLLC

(57) ABSTRACT

The disclosure provides a display apparatus and a method. The display apparatus includes a display, a communicator, an external device interface, a memory and a processor. The processor is configured for: receiving a command for adjusting an audio state of an external audio output device in connection with the display apparatus; determining a target audio state to which the external audio output device needs to be adjusted by parsing the command; sending, to the external audio output device, an audio state adjusting instruction for adjusting the audio state to adjust a current audio state of the external audio output device to the target audio state and an instruction for requesting audio state to (Continued)

request the external audio output device to send the target audio state to the display apparatus; receiving the target audio state returned from the external audio output device and displaying the target audio state.

20 Claims, 37 Drawing Sheets

(30) Foreign Application Priority Data

Jun. 17, 2021 (CN) .......................... 202110671208.6
Jun. 22, 2021 (CN) .......................... 202110689967.5
Jun. 28, 2021 (CN) .......................... 202110721616.8

(56) References Cited

U.S. PATENT DOCUMENTS

| | | | |
|---|---|---|---|
| 10,365,884 B2* | 7/2019 | Lambourne | G06F 3/0482 |
| 10,387,102 B2* | 8/2019 | Lambourne | H04R 27/00 |
| 2002/0177474 A1* | 11/2002 | Oliveira | H04W 52/0267 |
| | | | 455/574 |
| 2007/0189411 A1* | 8/2007 | Goss | H04L 27/10 |
| | | | 375/272 |
| 2008/0037151 A1 | 2/2008 | Fujimoto et al. | |
| 2008/0129871 A1 | 6/2008 | Wang et al. | |
| 2009/0041257 A1* | 2/2009 | Yoshizawa | H04N 21/4882 |
| | | | 381/59 |
| 2009/0135300 A1 | 5/2009 | Suzuki | |
| 2012/0128179 A1 | 5/2012 | Kano et al. | |
| 2013/0033644 A1* | 2/2013 | Kim | H04N 21/4821 |
| | | | 348/E5.097 |
| 2016/0073197 A1* | 3/2016 | Hammer | H04W 12/50 |
| | | | 381/80 |
| 2016/0197588 A1 | 7/2016 | Olson et al. | |
| 2016/0373615 A1 | 12/2016 | Chen | |
| 2017/0185371 A1 | 6/2017 | Lin | |
| 2020/0326907 A1 | 10/2020 | Sun | |
| 2021/0127039 A1 | 4/2021 | Uemura et al. | |

FOREIGN PATENT DOCUMENTS

| | | | |
|---|---|---|---|
| CN | 103731722 A | | 4/2014 |
| CN | 104735528 A | | 6/2015 |
| CN | 104934048 A | | 9/2015 |
| CN | 105632541 A | | 6/2016 |
| CN | 106126160 A | | 11/2016 |
| CN | 106331562 A | | 1/2017 |
| CN | 106658219 A | | 5/2017 |
| CN | 107483993 A | | 12/2017 |
| CN | 107562745 A | * | 1/2018 |
| CN | 109151566 A | | 1/2019 |
| CN | 110097897 A | | 8/2019 |
| CN | 110121101 A | | 8/2019 |
| CN | 110175081 A | | 8/2019 |
| CN | 110221806 A | | 9/2019 |
| CN | 110602540 A | | 12/2019 |
| CN | 111214830 A | | 6/2020 |
| CN | 111479154 A | | 7/2020 |
| CN | 111580779 A | * | 8/2020 |
| CN | 112019782 A | | 12/2020 |
| CN | 112153447 A | | 12/2020 |
| CN | 113138745 A | | 7/2021 |
| JP | 2008288628 A | | 11/2008 |
| WO | 2005029882 A1 | | 3/2005 |
| WO | 2011013704 A1 | | 2/2011 |

OTHER PUBLICATIONS

English translation of Chinese Office Action issued in CN202110479262.0, mailed Jul. 4, 2022.
English translation of Chinese Office Action issued in CN202110479263.5, mailed Mar. 24, 2022.
English translation of Chinese Office Action issued in CN202110671208.6, mailed Mar. 17, 2022.
English translation of Chinese Office Action issued in CN202110689967.5 mailed Apr. 6, 2022.
English translation of Chinese Office Action issued in CN202110721616.8 Jul. 21, 2022.
English translation of Chinese Office Action issued in CN202110721616.8 Dec. 21, 2022.

* cited by examiner

DISPLAY DEVICE AND AUDIO DATA PROCESSING METHOD THROUGH AN EXTERNAL AUDIO OUTPUT DEVICE

CROSS-REFERENCE OF RELATED APPLICATIONS

The application is a continuation application of International Application No. PCT/CN2022/090559 filed Apr. 29, 2022, which claims the priorities from Chinese Patent Application No. 202110479262.0 filed on Apr. 30, 2021, Chinese Patent Application No. 202110479263.5 filed on Apr. 30, 2021, Chinese Patent Application No. 202110671208.6 filed on Jun. 17, 2021, Chinese Patent Application No. 202110689967.5 filed on Jun. 22, 2021, and Chinese Patent Application No. 202110721616.8 filed on Jun. 28, 2021, which are hereby incorporated by reference in their entirety.

TECHNICAL FIELD

The disclosure relates to the field of display technology, and in particular to a display apparatus and an audio data processing method.

BACKGROUND

With functions such as media playback, the display apparatuses have attracted a lot of attention from users. The media playback function can support the playback of resources such as audio, video, and images. With the developments of big data and artificial intelligence, the users' demands for the functions of display apparatuses are increasing day by day. For example, some users would like the display apparatuses to be able to provide different sound effects for the playback of different media resources, for example, 3D surround stereo sound for the playback of a film.

SUMMARY

An aspect of the disclosure provides a display apparatus. The display apparatus includes: a display configured to display an image from a broadcast system or network and/or a user interface; a communicator, configured to connect with network; an external device interface configured to connect with one or more external devices; a memory configured to store computer instructions and data associated with the display; and a processor in connection with the display, the communicator, the external device interface and the memory. The processor is configured to execute the computer instructions to cause the display apparatus to perform: receiving a command for adjusting an audio state of an external audio output device in connection with the display apparatus, wherein the command is input by selection of a key on a remote control for the display apparatus; determining a target audio state to which the external audio output device needs to be adjusted by parsing the command, wherein the target audio state comprises include a mute state and an unmute state; sending an audio state adjusting instruction for adjusting the audio state to the target audio state to the external audio output device and an instruction for requesting audio state of the external audio output device; wherein the audio state adjusting instruction is used to adjust a current audio state of the external audio output device to the mute state or the unmute state, and the instruction for requesting audio state is used to request the external audio output device to send the mute state or the unmute state after adjustment based on the audio state adjusting instruction to the display apparatus; and receiving the mute state or the unmute state returned from the external audio output device and display the mute state or the unmute state on the display.

An aspect of the disclosure provides a method for a display apparatus, wherein the display apparatus includes: a display configured to display an image from a broadcast system or network and/or a user interface; and an external device interface configured to connect with one or more external devices. The method includes: receiving a command for adjusting an audio state of an external audio output device in connection with the display apparatus, wherein the command is input by selection of a key on a remote control for the display apparatus; determining a target audio state to which the external audio output device needs to be adjusted by parsing the command, wherein the target audio state comprises a mute state and an unmute state; sending an audio state adjusting instruction for adjusting the audio state to target audio state to the external audio output device and an instruction for requesting audio state; wherein the audio state adjusting instruction is used to adjust a current audio state of the external audio output device to the mute state or the unmute state determined based on the target audio state, and the instruction for requesting audio state is used to request the external audio output device to send the mute state or the unmute state after adjustment based on the audio state adjusting instruction to the display apparatus; and receiving the mute state or the unmute state returned from the external audio output device and displaying the mute state or the unmute state on the display of the display apparatus.

DETAILED DESCRIPTION

In order to make the purposes and embodiments of the disclosure clearer, the exemplary embodiments of the disclosure will be described clearly and completely below in combination with the accompanying drawings in the exemplary embodiments of the disclosure. Obviously, the described exemplary embodiments are some of the embodiments but not all the embodiments of the disclosure.

It should be noted that the brief description of the terms in the disclosure is only for the convenience of understanding the embodiments described hereafter, and is not intended to limit the embodiments of the disclosure. Unless indicated otherwise, these terms should be understood according to the plain and ordinary meanings.

Figure 1:
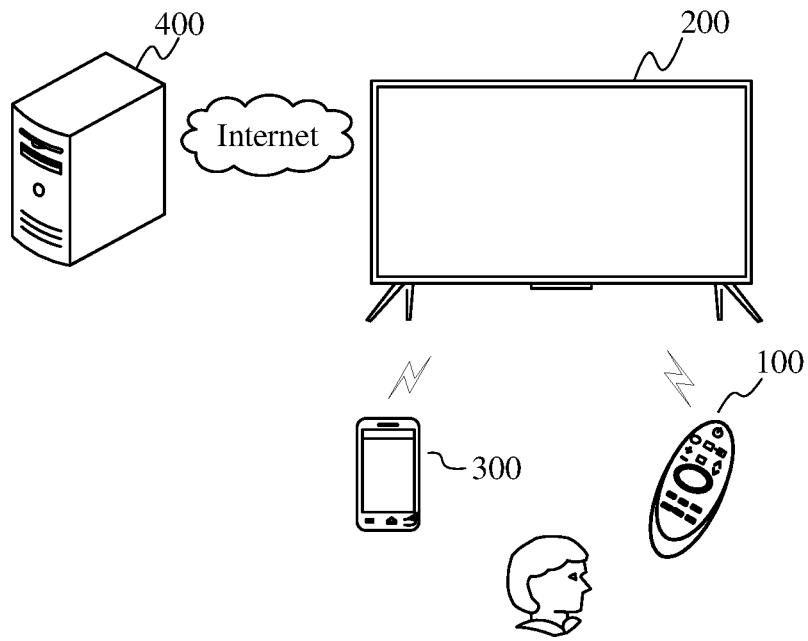
FIG. 1 shows a scenario of a display apparatus according to some embodiments.

FIG. 1 shows a schematic diagram of a scenario of a display apparatus according to an embodiment. As shown in FIG. 1, the display apparatus 200 communicates data with a server 400, and a user may operate the display apparatus 200 through a smart device 300 or a control device 100.

In some embodiments, the control device 100 may be a remote control, and can communicate with the display apparatus 200 through at least one of infrared protocol communication or Bluetooth protocol communication and other short-range communication methods, and controls the display apparatus 200 wirelessly or by other wired methods.

In some embodiments, the smart device 300 may include any one of a mobile terminal, a tablet computer, a computer, a laptop computer, an AR/VR device, etc.

In some embodiments, the smart device 300 may also be used to control the display apparatus 200. For example, an application running on the smart device is used to control the display apparatus 200.

In some embodiments, the smart device 300 may communicate data with the display apparatus.

In some embodiments, the display apparatus 200 may also be controlled in a manner other than the control device 100 and the smart device 300. For example, the user's voice command control may be directly received by a module for acquiring voice commands configured inside the display apparatus 200, or the user's voice command control may be received by a voice control device provided outside the display apparatus 200.

In some embodiments, the display apparatus 200 also communicates data with the server 400. The display apparatus 200 may perform the communication and connection through a Local Area Network (LAN), a Wireless Local Area Network (WLAN), and other networks.

Figure 2:
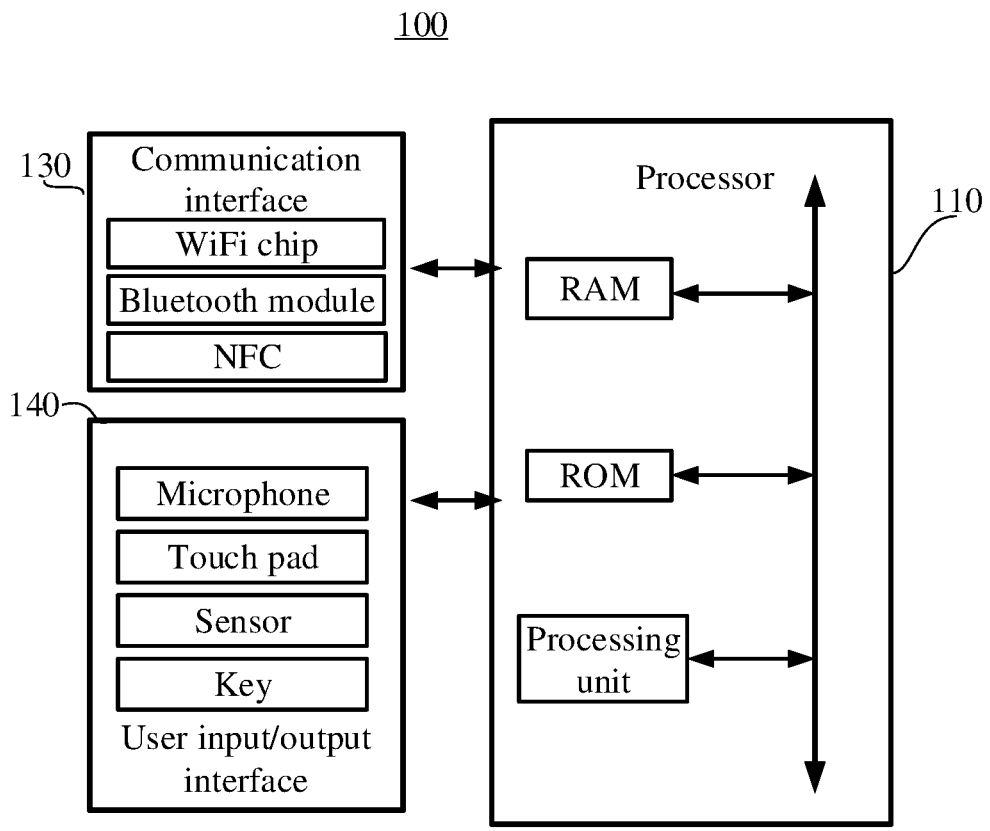
FIG. 2 shows a block diagram of a hardware configuration of a control device 100 according to some embodiments.

FIG. 2 shows a block diagram of the configuration of the control device 100 according to some embodiments. As shown in FIG. 2, the control device 100 includes a processor 110, a communication interface 130, a user input/output interface 140, a memory, and a power supply.

In some embodiments, the communication interface 130 is configured to communicate with external devices, including at least one of a WIFI chip, a Bluetooth module, an NFC or alternative module.

In some embodiments, the user input/output interface 140 includes at least one of microphone, trackpad, sensor, key or alternative module.

Figure 3:
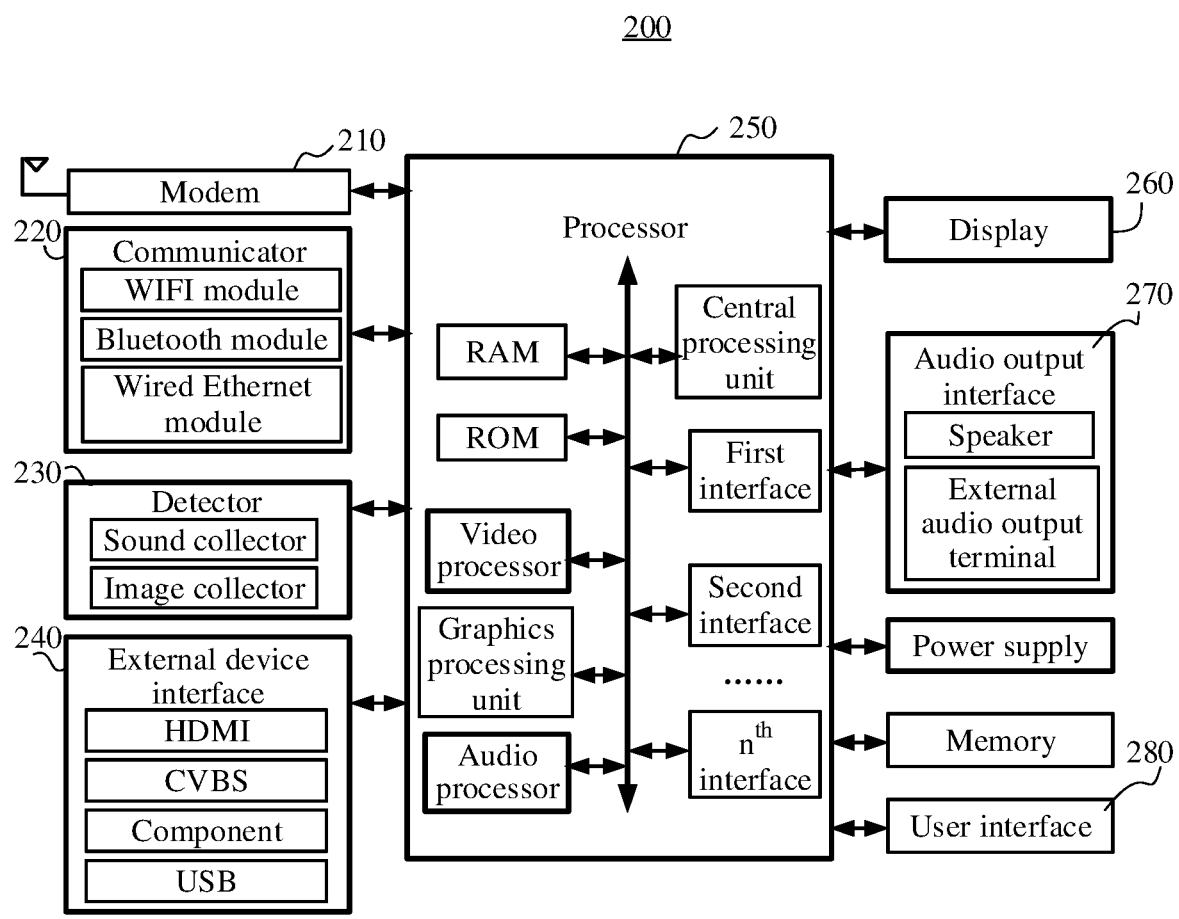
FIG. 3 shows a block diagram of a hardware configuration of the display apparatus 200 according to some embodiments.

FIG. 3 shows a block diagram of a hardware configuration of the display apparatus 200 according to some embodiments.

In some embodiments, the display apparatus 200 includes at least one of a modem 210, a communicator 220, a detector 230, an external device interface 240, a processor 250, a display 260, an audio output interface 270, a memory, a power supply, a user interface.

In some embodiments, the processor includes a central processing unit, a video processor, an audio processor, a graphics processing unit, an RAM, an ROM, and first to n$^{th}$ interfaces for input/output.

In some embodiments, the display 260 includes: a panel component for presenting an image, a driver component for driving the image display, a component for receiving an image signal output from the processor to display the video content and image content as well as a menu control interface, and a user control UI interface, etc.

In some embodiments, the display 260 may be at least one of a liquid crystal display, an OLED display and a projection display, and may also be a projection device and a projection screen.

In some embodiments, the modem 210 receives signals from broadcast systems in a wired or wireless method, and demodulates audio and video signals, such as EPG data signals, from a plurality of wireless or wired broadcast television signals.

In some embodiments, the communicator 220 is a component for communicating with an external device or server according to various types of communication protocols. For example, the communicator may include at least one of a Wifi module, a Bluetooth module, a wired Ethernet module, other network communication protocol chip or near-field communication protocol chip, and an infrared receiver.

In some embodiments, the detector 230 may include a light receiver, an image acquisition device, a sound acquisition device, etc.

In some embodiments, the external device interface 240 may include, but is not limited to, any one or more of a High-Definition Multimedia Interface (HDMI), an analog or data high-definition component input interface (Component), a Composite Video Broadcast Signal (CVBS) input interface, a USB input interface (USB), an RGB port and the like; or may be a composite input/output interface formed by the above-mentioned interfaces.

In some embodiments, the processor 250 and the modem 210 may be located in different separate devices, that is, the modem 210 may also be located in an external device (such as an external set-top box, etc.) of the main device where the processor 250 is located.

In some embodiments, the processor 250 controls the operations of the display apparatus and responds to the user's operations through various software programs stored in the memory. The processor 250 controls the overall operation of the display apparatus 200. For example, in response to a user command for selecting a UI object displayed on the display 260, the processor 250 may perform the operations related to the object selected by the user command.

In some embodiments, the object may be any one of selectable objects, such as a hyperlink, an icon, or other areas available for selection. The operations associated with the selected object include: the operation to display the link to the hyperlinked page, document, image or the like, or the operation to execute the application associated with the icon.

In some embodiments, the processor includes at least one of a Central Processing Unit (CPU), a video processor, an audio processor, a Graphics Processing Unit (GPU), an RAM (Random Access Memory), an ROM (Read-Only Memory), first to n$^{th}$ interfaces for input/output, a communication bus (Bus), etc.

In some embodiments, the GPU is used to generate various graphics objects, such as at least one of icons, operation menus, graphics of user command input, etc.

In some embodiments, the user may input a user command on the Graphical User Interface (GUI) presented on the display 260, and the user input interface receives a user command through the Graphical User Interface (GUI). Alternatively, the user may input a user command by inputting a particular sound or gesture, and the user input interface recognizes the sound or gesture through the sensor to receive the user command.

In some embodiments, the user interface 280 may be an interface for receiving a control input (for example: physical keys on the display apparatus body, or others).

Figure 4:
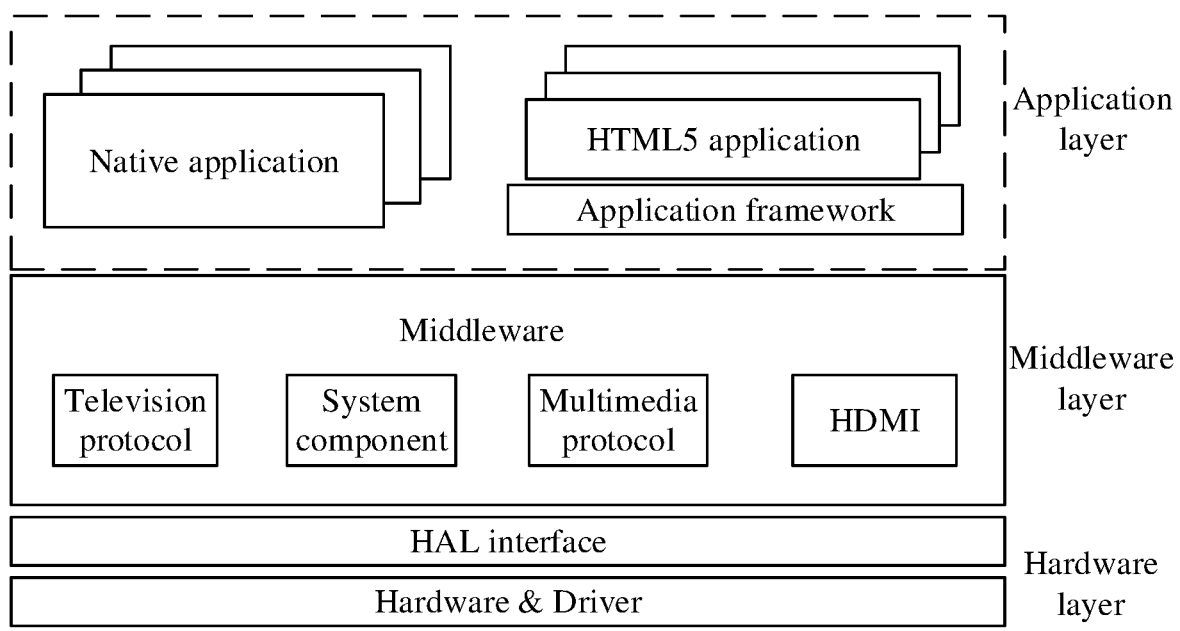
FIG. 4 shows a software configuration diagram in the display apparatus 200 according to some embodiments.

In some embodiments, as shown in FIG. 4, the system of the display apparatus may include a Kernel, a command parser (shell), a file system and an application. As shown in FIG. 4, the system of the display apparatus is divided into three layers, which are respectively an application layer, a middleware layer and a hardware layer from top to bottom.

In some embodiments, the display apparatus can directly enter the display interface of the signal source selected last time or the signal source selection interface after startup, where the signal source may be a preset video-on-demand application or may be at least one of an HDMI interface, a live broadcast TV interface, etc. In response to different signal sources being selected, the display can display the content obtained from the different signal sources.

Figure 5:
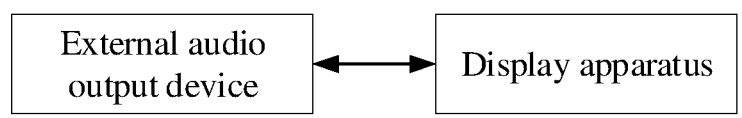
FIG. 5 shows a schematic diagram of connection between an external audio output device and the display apparatus.

The display apparatus supports different external audio output devices in order to meet user's advanced experience with sound effect. The external audio output devices mainly include the following types: Display Speaker (built-in speaker), ARC (Audio Return Channel) device, Bluetooth Device (BT), wired headset, USB audio device, etc. The connection relationship between the external audio output device and the display apparatus can refer to FIG. 5.

Figure 6:
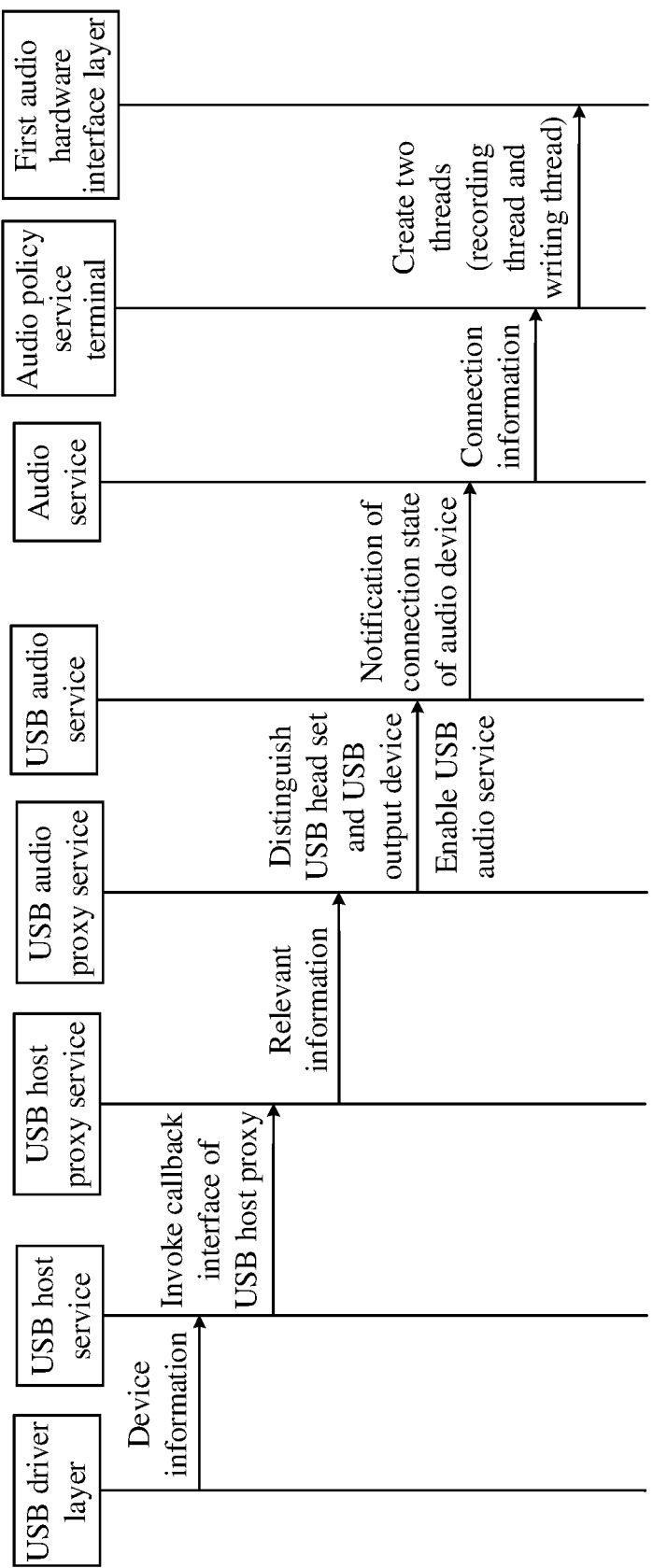
FIG. 6 shows a flowchart of interaction among various softwares of the display apparatus in the process of playing the audio data.

FIG. 6 shows a flowchart of interaction among various software of the display apparatus in the process of playing the audio data. The display apparatus in the embodiments may include: a USB driver layer, a USB host service, a USB host proxy service, a USB audio proxy service, a USB audio service, an audio service, an audio policy service, and an audio hardware interface layer (first audio hardware interface layer).

In the process of connecting with the external audio output device, when the USB driver detects that a USB peripheral device is plugged in, the USB driver firstly recognizes the connection state of the device, communicates the connection state of the device to the USB host service in the form of an event, and invokes the callback interface of the USB host proxy, and sends the relevant information to the USB audio proxy service if the device is determined as an audio device. Here, according to the information carried by the device, the USB audio device is further divided into the USB head set and the USB output device for distinguishing them. Then the USB audio proxy service enables the USB audio service, and the USB audio service notifies the audio service of the connection state of the USB audio device.

The audio service transmits the device connection information to the audio policy service, and the audio policy service records and saves the connection state of the device, and then transmits the device connection information to the audio hardware interface layer. In response to receiving the connection information of the USB peripheral device, the audio hardware interface layer creates two threads including a recording thread and a writing thread, where the recording thread is used to record the audio data from the audio driver layer, and the writing thread is used to write the recorded audio data into the USB audio interface layer. In addition to writing the audio data, the writing thread also needs to identify the sound card information of the device, and record the relevant configuration information (the audio format supported by the peripheral device) for later use.

Some users would like the display apparatus to be able to provide different sound effects for playback different media resources. The display apparatus can support different external audio output devices in order to meet the user's demand for advanced experience with sound effect. The current external audio output devices generally do not have the decoding capability, and the display apparatus has an application that uses a customized player to directly write the audio stream to the audio driver layer to complete audio decoding. Therefore, for the external audio output device, the display apparatus processes the audio stream in the tunnel mode, that is, all audio streams are written into the audio driver layer of the display apparatus (the audio driver layer), and the audio hardware interface layer of the display apparatus (the first audio hardware interface layer) records the decoded audio from the audio driver layer according to the audio format (recording format) of the external audio output device, and finally the decoded audio reaches the external audio output device for sound play. For audio recording, the audio driver layer usually outputs audio streams in a fixed format (writing format, such as sampling precision of 16 bits, little endian, sampling rate of 48000 Hz, and 2 sound channels), and the audio streams in this format are compatible with most of mainstream peripheral devices on the market. However, fascination with audio detail grows as loudspeaker technology advances. Different external audio output devices may use different recording formats, which will cause abnormal play of the sound (fastly/slowly) due to the inconsistence of the writing format with the recording format of the audio stream.

In view of the above issues, an embodiment of the disclosure provides a display apparatus, including at least a processor, a memory and a display, where the structure of the processor can refer to the above-mentioned embodiments. The memory is configured to store computer instructions and data associated with the display. The working process of the display apparatus will be described below in combination with specific drawings.

Figure 7:
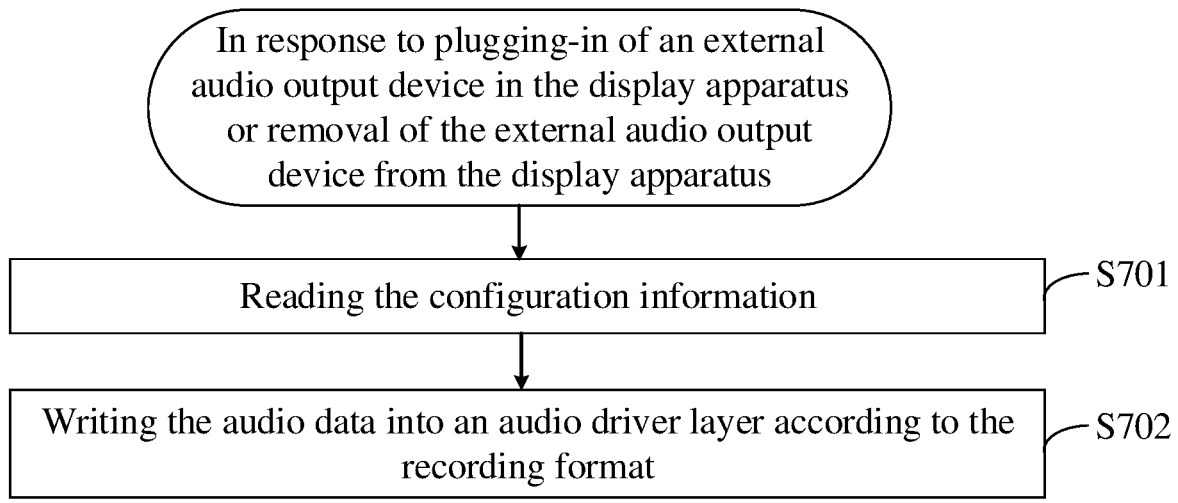
FIG. 7 shows a flowchart of operations of the display apparatus according to some embodiments.

FIG. 7 shows a processing flowchart of the display apparatus according to some embodiments.

An external audio output device is plugged in the display apparatus or removed from the display apparatus.

The external audio output device can establish a connection relationship with the display apparatus by plugging in the display apparatus, and disconnect the connection relationship with the display apparatus by removing from the display apparatus, for example, pulling out of the display apparatus.

The processor is configured to perform steps S701 to S702.

S701: in response to plugging-in of an external audio output device in the display apparatus or removal of the external audio output device from the display apparatus, reading the configuration information, where the configuration information includes recording information of a recording format supported by the external audio output device.

In an embodiment of the disclosure, the recording format may include, but not limited to, an audio type supported by the external audio output device, a sampling frequency supported by the external audio output device, a sampling precision supported by the external audio output device, the endian/little endian information supported by the external audio output device, and other information.

S702: writing the audio data into an audio driver layer according to the recording format.

Figure 8:
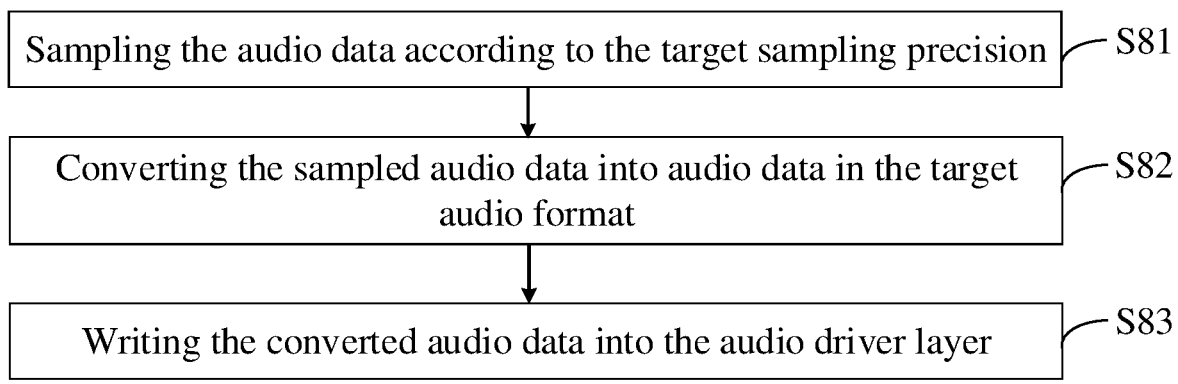
FIG. 8 shows a flowchart for illustrating an implementation of writing the audio data into the audio driver layer based on the recording format according to some embodiments.

There are many implementations for writing the audio data into the audio driver layer according to the recording format. FIG. 8 shows a flowchart of an implementation of writing the audio data into the audio driver layer according to the recording format according to some embodiments, where the processor is further configured to perform steps S81 to S83.

In this embodiment, the recording format includes a target sampling precision and a target audio format, where the target sampling precision and the target audio format both are supported by the external audio output device.

S81: sampling the audio data according to the target sampling precision.

S82: converting the sampled audio data into audio data in the target audio format.

S83: writing the converted audio data into the audio driver layer.

In this embodiment, the audio hardware interface layer may sample the audio data according to the target sampling precision, and then write the sampled audio data into the audio driver layer. When the audio data in the audio driver layer is recorded in the second audio hardware interface layer later, the audio data is also sampled according to the target sampling precision, so as to ensure that the audio data is written and recorded using the same sampling precision to avoid the problem of abnormal play of the sound.

Further, in this embodiment, the sampled audio data is converted into the audio data in the target audio format, thereby ensuring that the audio data written into the audio driver layer can be recognized by the external audio output device.

In this embodiment, the first audio hardware interface layer can write the audio data into the audio driver layer according to the recording format in the process of writing the audio data into the audio driver layer, and the second audio hardware interface layer records the audio data to the audio hardware interface layer of the external audio output device according to the recording format in the subsequent process of recording the audio data, thereby ensuring that the same recording format is used for the audio data in the writing and recording processes, to avoid the abnormal play problem of the sound.

Usually, different external audio output devices support different numbers of sound channels. When the sound channels output from the display apparatus does not match with the sound channels supported by the external audio output device, audio output from the external audio device may appear Chaotic or may not sound.

Figure 9:
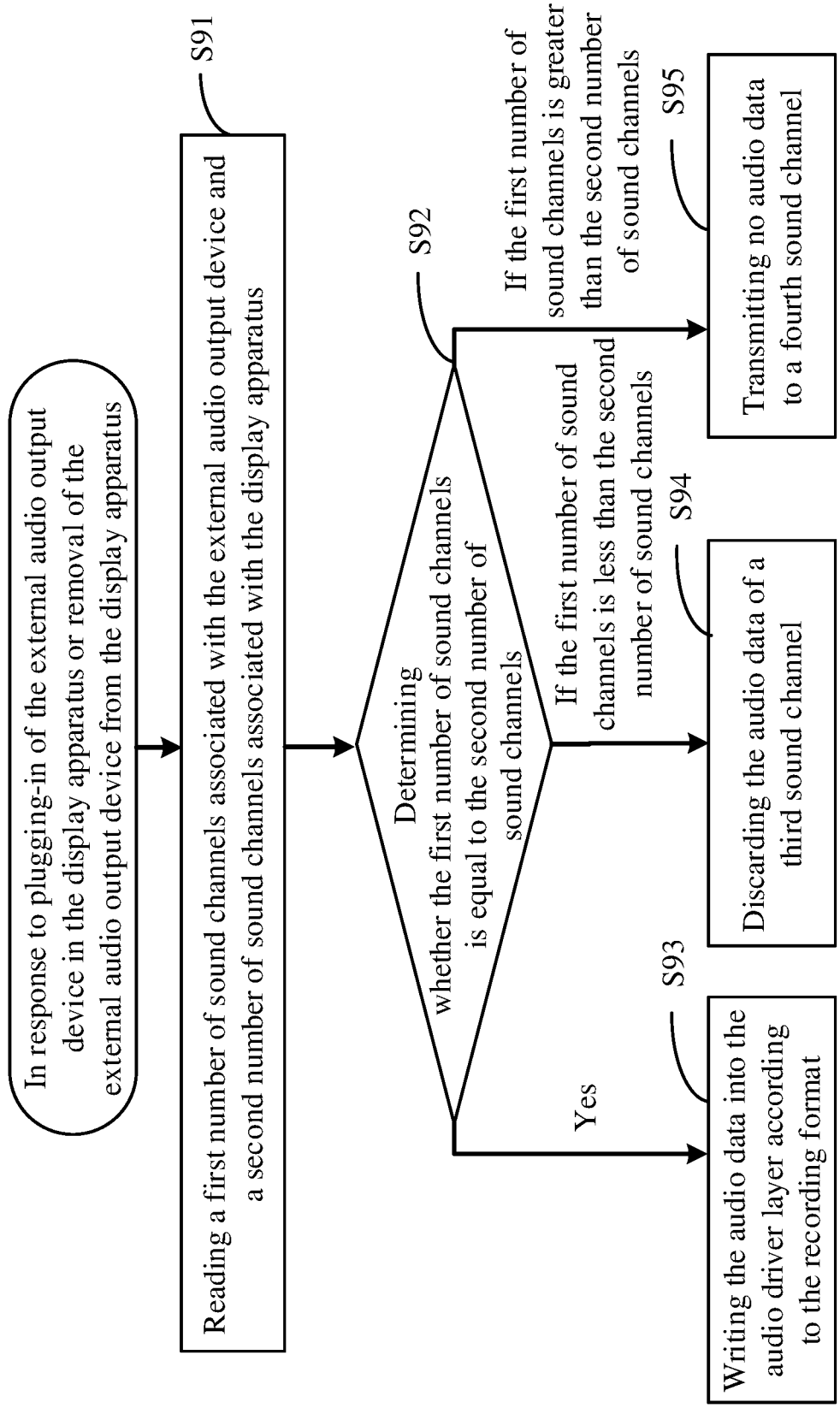
FIG. 9 shows a flowchart of a sound channel switching method according to some embodiments.

In view of the above issues, on the basis of the display apparatus in the above-mentioned embodiment, this embodiment further shows a sound channel switching method, which is applicable to the display apparatus shown in the above-mentioned embodiment. The sound channel switching method will be illustrated below in combination with specific drawings. FIG. 9 shows a flowchart of the sound channel switching method according to some embodiments. On the basis of the above display apparatus, the processor is further configured to perform steps S91 to S95.

The first processor is configured to perform step S91: in response to plugging-in of the external audio output device in the display apparatus or removal of the external audio output device from the display apparatus, reading a first number of sound channels associated with the external audio output device and a second number of sound channels associated with the display apparatus.

In the disclosure, the configuration information further includes the first number of sound channels that is the number of sound channels supported by the external audio output device. The second number of sound channels is the number of sound channels enabled by the display apparatus when the external audio output device is plugged in or removed. The Sound Channel refers to mutually-independent audio signals that are collected or played back at different spatial locations during recording or playing, so the number of sound channels is the number of sound sources during sound collection or the corresponding number of speakers during playback.

S92: determining whether the first number of sound channels is equal to the second number of sound channels.

There are many implementations for determining whether the first number of sound channels is equal to the second number of sound channels.

For example, the first number of sound channels is equal to the second number of sound channels if a difference between the first number of sound channels and the second number of sound channels is 0.

S93: writing the audio data into the audio driver layer according to the recording format in response to the first number of sound channels being equal to the second number of sound channels.

S94: discarding the audio data of a third sound channel in response to the first number of sound channels being less than the second number of sound channels, where the third sound channel is a redundant sound channel in a second set of sound channels compared to a first set of sound channels, the first set of sound channels includes sound channels supported by the external audio output device, and the second set of sound channels includes sound channels enabled by the display apparatus.

The above-mentioned process will be described below in combination with specific examples.

In some embodiments, the first set of sound channels includes {left channel and right channel}, and the first number of sound channels is 2; the second set of sound channels includes {left channel, right channel, center channel, left surround channel, right surround channel and subwoofer channel}, and the second number of sound channels is 6; the third sound channels include: center channel, left surround channel, right surround channel and subwoofer channel. In this embodiment, the first number of sound channels is less than the second number of sound channels, so the display apparatus discards the audio data of the center channel, left surround channel, right surround channel and subwoofer channel.

If the first number of sound channels is less than the second number of sound channels, the display apparatus closes the third sound channel to ensure that the first number of sound channels is equal to the adjusted second number of sound channels.

S95: transmitting no audio data to a fourth sound channel in response to the first number of sound channels being greater than the second number of sound channels, where the fourth sound channel is a redundant sound channel in the first set of sound channels compared to the second set of sound channels.

The above-mentioned process will be described below in combination with specific examples.

In some embodiments, the first set of sound channels includes {left channel, right channel, center channel, left surround channel, right surround channel, subwoofer channel, left overhead channel and right overhead channel}, and the first number of sound channels is 8; the second set of sound channels includes {left channel, right channel, center channel, left surround channel, right surround channel and subwoofer channel}, and the second number of sound channels is 6; the fourth sound channels include: left overhead channel and right overhead channel. In this embodiment, the first number of sound channels is greater than the second number of sound channels, so the display apparatus transmits no audio data to the left overhead channel and right overhead channel of the external audio output device and only transmits the audio data to the left channel, right channel, center channel, left surround channel, right surround channel and subwoofer channel of the external audio output device in the audio data transmission process.

The audio data in the embodiments is roughly divided into three categories. The transmission process of the audio data in the playing process will be described below with reference to the specific drawings.

Figure 10:
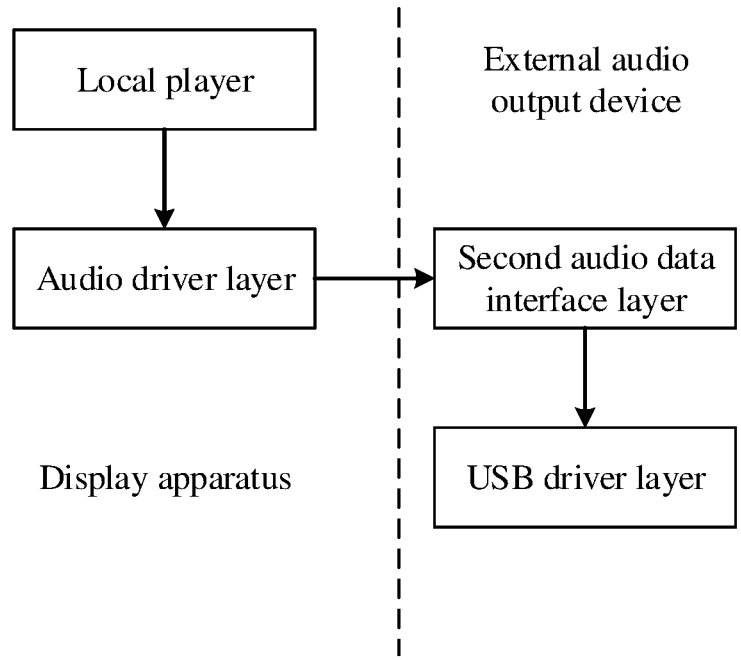
FIG. 10 shows a flowchart of playing the local audio data according to some embodiments.

FIG. 10 shows a flowchart of playing the local audio data according to some embodiments.

It can be seen that, for the local audio data, the local player directly writes the audio data into the audio driver layer. The second audio data interface layer records the audio data in the audio driver layer to the USB driver layer of the external audio output device according to the recording format.

Figure 11:
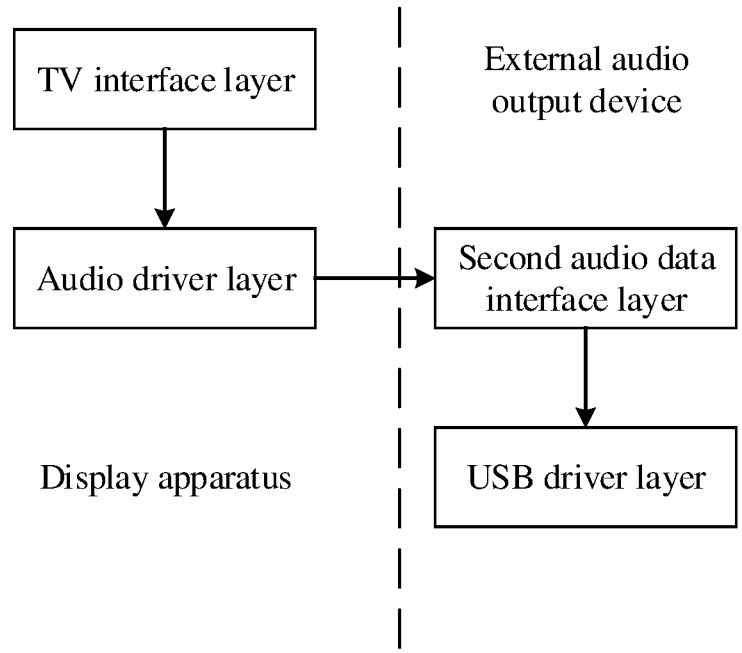
FIG. 11 shows a flowchart of playing the live audio data according to some embodiments.

FIG. 11 shows a flowchart of playing the live broadcasting audio data according to some embodiments.

The live broadcasting audio data may include but not limited to: DTV (Digital Television) audio data, ATV audio data, HDMI (High Definition Multimedia Interface) audio data, and other types of audio data. Such audio data is directly written into the audio driver layer through the TV interface layer of the display apparatus. The second audio data interface layer records the audio data in the audio driver layer to the USB driver layer of the external audio output device according to the recording format.

Figure 12:
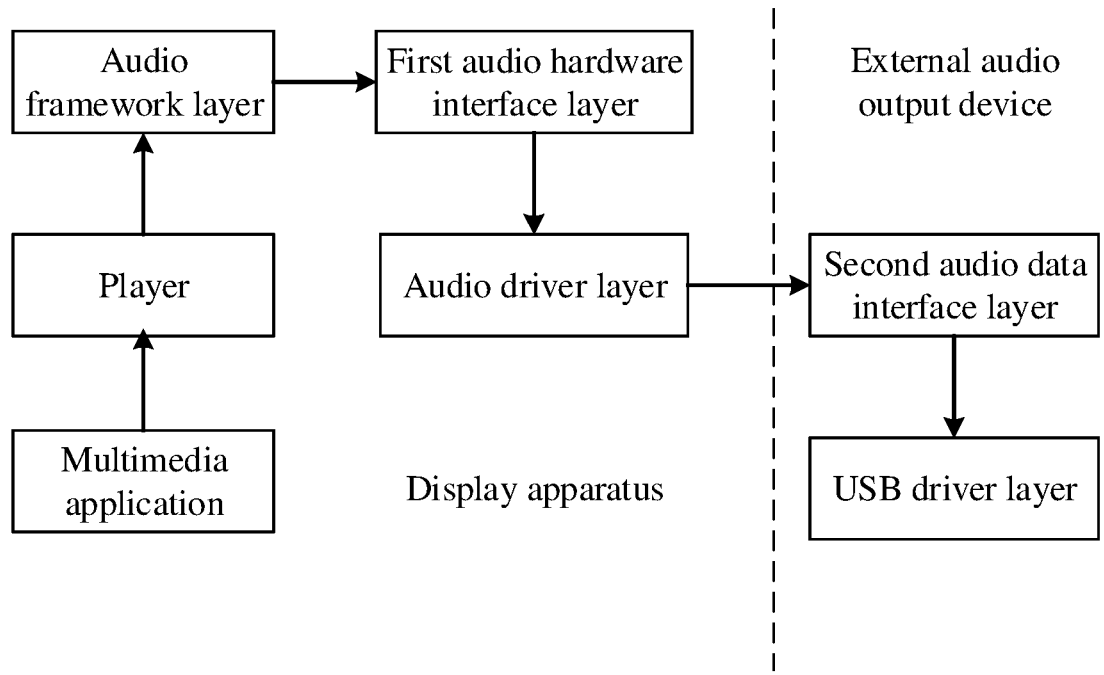
FIG. 12 shows a flowchart of playing the network audio data according to some embodiments.

FIG. 12 shows a flowchart of playing the network audio data according to some embodiments.

The network audio data may include but not limited to: Netflix audio data, Youtube audio data, etc. Such audio data may go through: multimedia application, player, buffer of audio framework layer (also referred to as buffer area in this embodiment); and the audio data in the buffer area is written into the audio driver layer through the first audio hardware interface layer. The second audio data interface layer records the audio data in the audio driver layer to the USB driver layer of the external audio output device according to the recording format.

For the network audio data, the audio data, after the buffer via audio framework layer, is written into the audio driver layer through the first audio hardware interface layer. The first audio hardware interface layer may adjust the writing process of the audio data from the buffer area to the audio driver layer, thereby ensuring that the writing format used by the first audio hardware interface layer in the process of writing the audio data into the audio driver layer is consistent with the recording format used by the second audio hardware interface layer to record the audio data from the audio driver layer.

Figure 13:
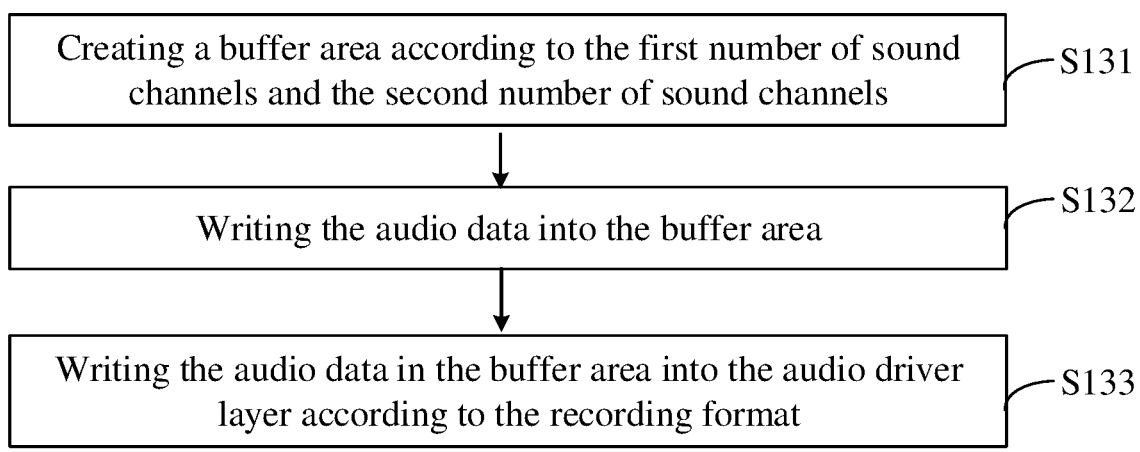
FIG. 13 shows a flowchart of a method for writing audio data according to some embodiments.

In order to achieve the above purpose, embodiments show a method for writing audio data. The method for writing audio data will be described below with reference to specific drawings. FIG. 13 shows a flowchart of a method for writing audio data according to some embodiments. The method of this embodiment is applicable to the display apparatus of the above embodiments, and is configured to perform steps S131 to S133 on the basis of the display apparatus of the above embodiments.

S131: creating a buffer area according to the first number of sound channels and the second number of sound channels.

In some embodiments, the second set of sound channels includes {left channel, right channel, center channel, left surround channel, right surround channel and subwoofer channel}; where the third sound channels include: center channel, left surround channel, right surround channel and subwoofer channel.

An implementation for creating the buffer area according to the first number of sound channels and the second number of sound channels may be: size of buffer area=size of audio data for this time play*second number of sound channels/first number of sound channels. For example, the first number of sound channels is 2, the second number of sound channels is 6, and the size of buffer area=size of audio data*6/2.

If the first number of sound channels is greater than the second number of sound channels, the second number of sound channels is equal to the third number of sound channels because no sound channel is closed.

An implementation for creating the buffer area according to the first number of sound channels and the second number of sound channels may be: size of buffer area=size of audio data this time*second number of sound channels/first number of sound channels. For example, the first number of sound channels is 6, the second number of sound channels is 2, and the size of buffer area=size of audio data this time*2/6.

S132: writing the audio data into the buffer area.

In some embodiments, the size of data written into the buffer area=target sampling rate/1000*quantity of the third sound channels*target sampling precision/8*estimated playing duration.

S133: writing the audio data in the buffer area into the audio driver layer according to the recording format.

In some embodiments, if the external audio output device is disconnected from the display apparatus, it is undoubtedly a waste of computing resources of the processor to continue writing the audio data to the audio driver layer. In order to avoid the above-mentioned problem, this embodiment shows a method for writing audio data. In the method, before writing the audio data into the audio driver layer, the processor needs to read the connection state of the external audio output device and then determine whether to write the audio data into the audio driver layer according to the connection state. The method for writing audio data in this embodiment will be described below in combination with drawings.

Figure 14:
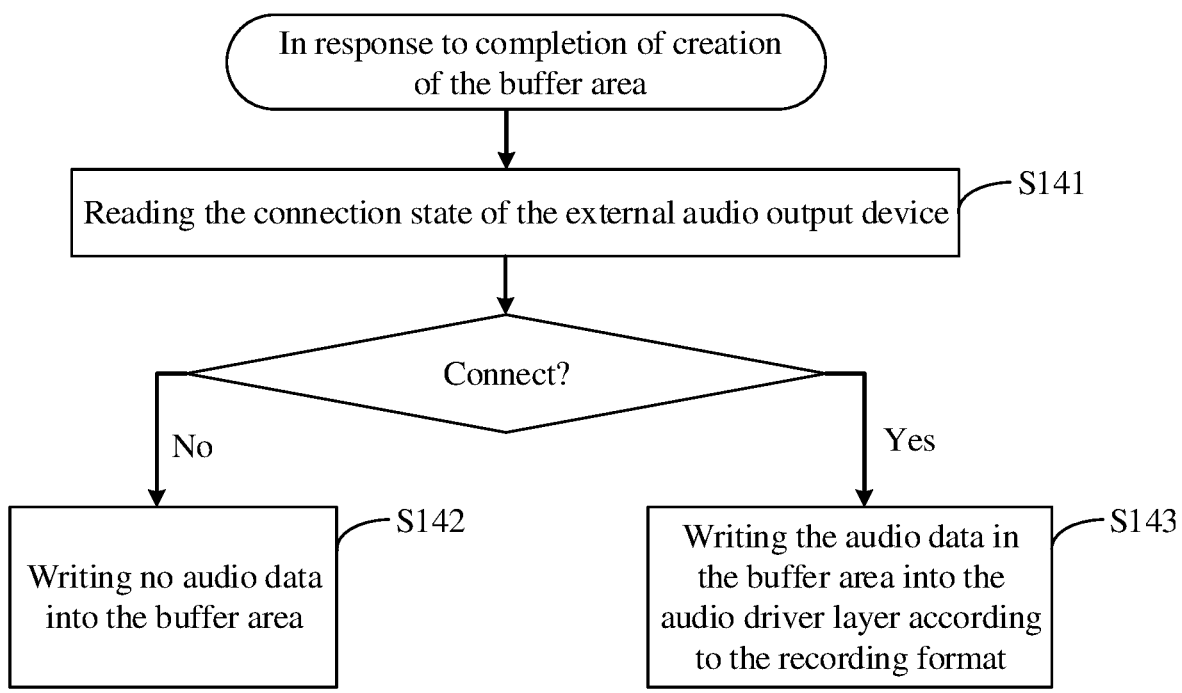
FIG. 14 shows a flowchart of a method for writing audio data according to some embodiments.

FIG. 14 shows a flowchart of a method for writing audio data according to some embodiments. This method is applicable to the display apparatus of the above embodiments, wherein the processor is further configured to perform steps S141 to S143.

S141: reading the connection state of the external audio output device in response to completion of creation of the buffer area.

Here, the connection state may be indicated by an identification bit. When the external audio output device is connected with the display apparatus, the identification bit of the external audio output device may be set as a first identification bit; when the external audio output device is disconnected from the display apparatus, the identification bit of the external audio output device may be set as a second identification bit different from the first identification bit. This embodiment does not limit the styles of the first identification bit and the second identification bit, and any style that can distinguish the first identification bit from the second identification bit can be applied to this embodiment.

When the processor reads the first identification bit, the processor determines the connection state as being connected; and when the processor reads the second identification bit, the processor determines the connection state as being disconnected.

S142: writing no audio data into the buffer area in response to the connection state being disconnected state.

S143: writing the audio data in the buffer area into the audio driver layer according to the recording format in response to the connection state being connected state.

In this embodiment, before writing the audio data into the audio driver layer, the processor needs to read the connection state of the external audio output device and then determine whether to write the audio data into the audio driver layer according to the connection state, to avoid the waste of computing resources of the processor.

In some embodiments, if the audio data has not been played, it is undoubtedly a waste of computing resources of the processor to continue writing the audio data into the audio driver layer. In order to avoid the above-mentioned problem, this embodiment shows a method for writing audio data. In the method, before writing the audio data into the audio driver layer, the processor reads the playing state of the audio data and then determines whether to write the audio data into the audio driver layer according to the playing state. The method for writing audio data provided in this embodiment will be described below in combination with drawings.

Figure 15:
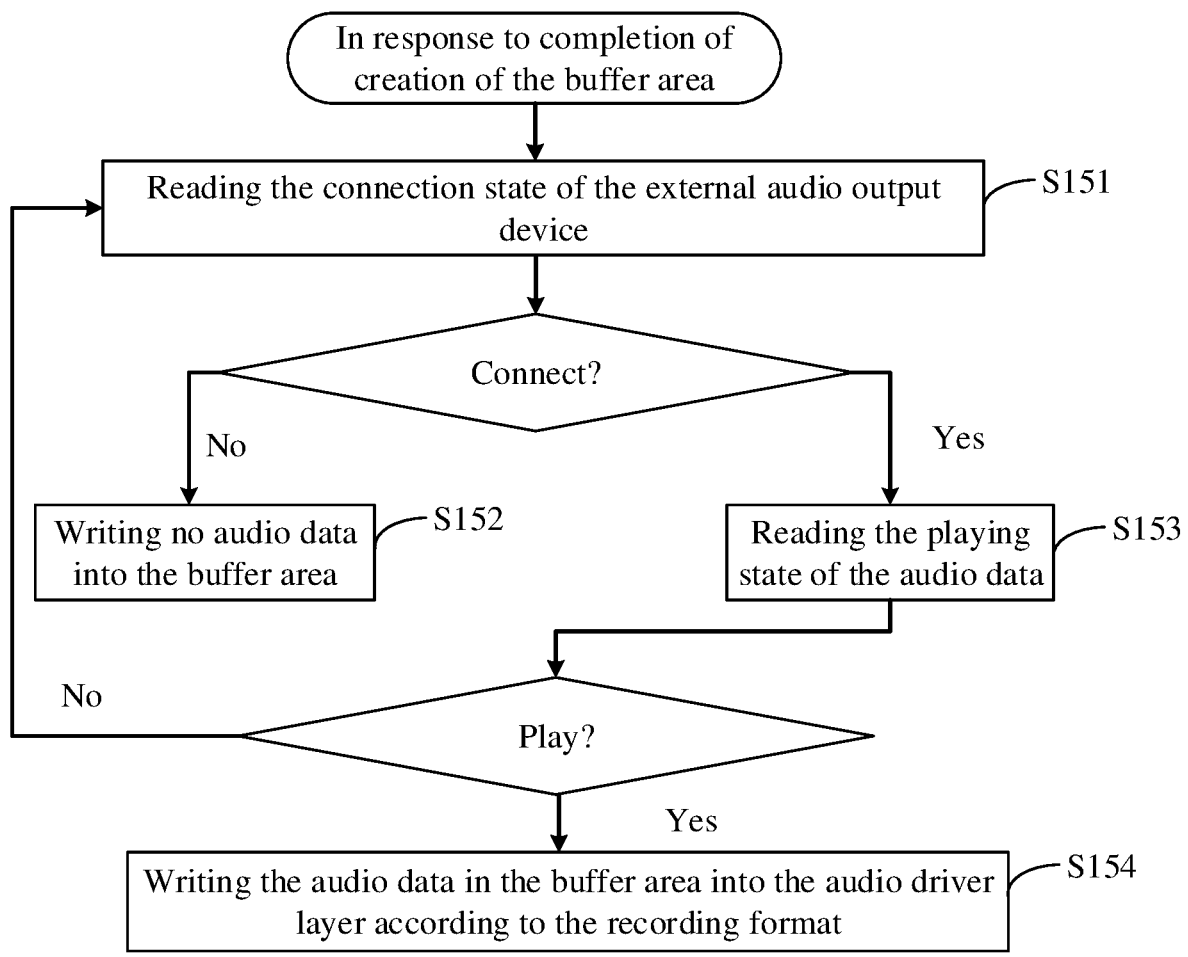
FIG. 15 shows a flowchart of a method for writing audio data according to some embodiments.

FIG. 15 shows a flowchart of the method for writing audio data according to an embodiment of the disclosure. This method is applicable to the display apparatus of the above embodiments, wherein the processor is further configured to perform steps S151 to S154.

S151: reading the connection state of the external audio output device in response to completion of creation of the buffer area.

S152: writing no audio data into the buffer area in response to the connection state being disconnected state.

S153: reading the playing state of the audio data in response to the connection state being connected state.

Here, the playing state may be indicated by an identification bit. When the audio data is being played, the identification bit of the audio data is a third identification bit; when the audio data has not been played, the identification bit of the audio data is a fourth identification bit. This embodiment does not limit the styles of the third identification bit and the fourth identification bit, and any style that can distinguish the third identification bit from the fourth identification bit can be applied to this embodiment. The processor can determine the playing state of the audio data by reading the identification bit of the audio data.

When the processor reads the third identification bit, and determines that the playing state is playing; and when the processor reads the fourth identification bit, the processor determines that the playing state is not play.

In response to the playing state being not play, the flow goes to S151 to read the connection state of the external audio output device.

In response to the playing state being playing, the flow goes to S154 to write the audio data in the buffer area into the audio driver layer according to the recording format.

In this embodiment, before writing the audio data into the audio driver layer, the processor needs to read the playing state of the audio data and then determine whether to write the audio data into the audio driver layer according to the playing state, to avoid the waste of computing resources of the processor in the display apparatus.

In some embodiments, if there is no audio data in the buffer area, it is undoubtedly a waste of computing resources of the processor to continue writing the audio data into the audio driver layer. In order to avoid the above-mentioned problem, this embodiment shows a method for writing audio data. In the method, before writing the audio data into the audio driver layer, the processor traverses the buffer area and then determines whether to write the audio data into the audio driver layer according to whether the audio data is stored in the buffer area. The method for writing audio data will be described below in combination with drawings.

Figure 16:
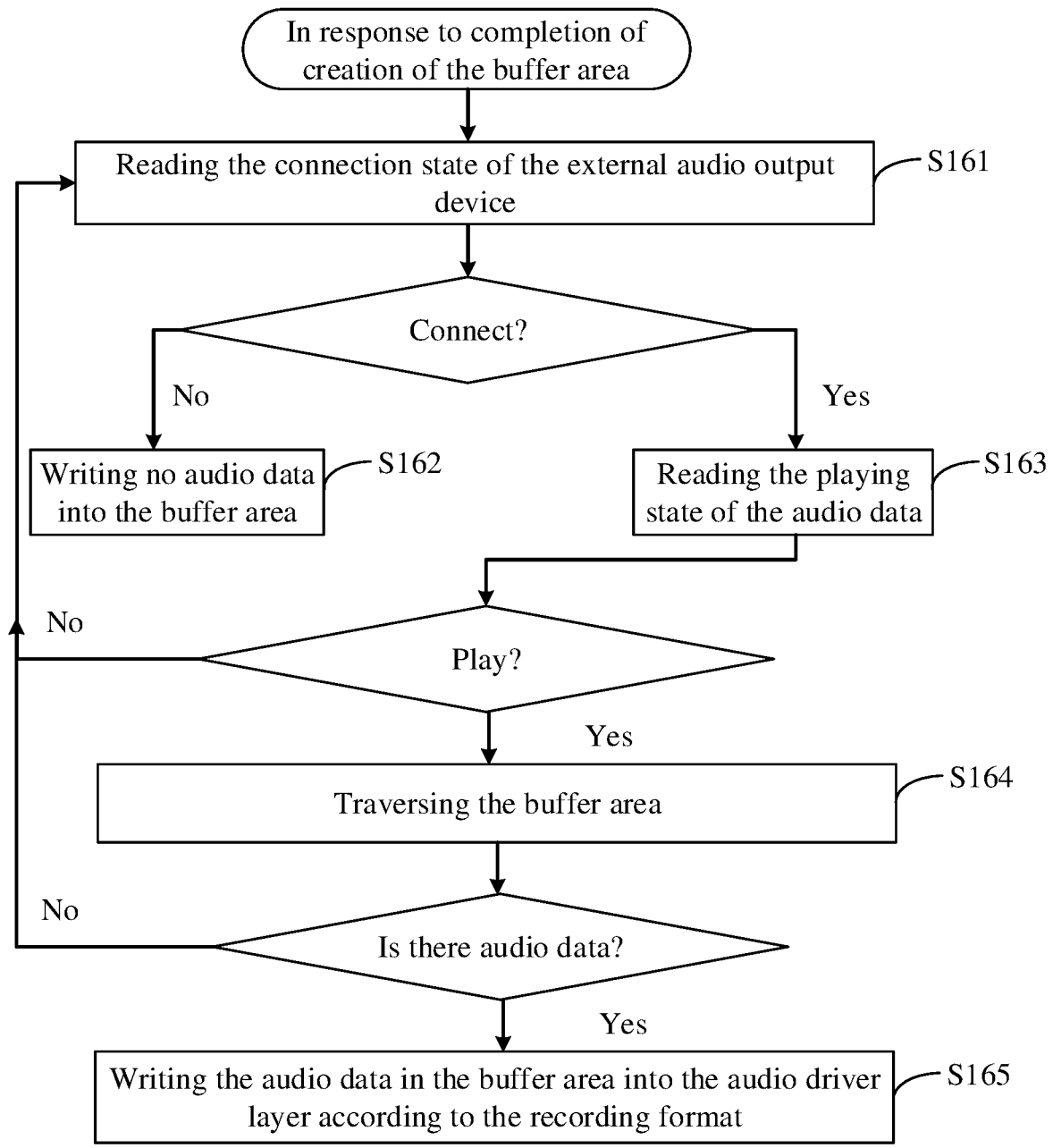
FIG. 16 shows a flowchart of a method for writing audio data according to some embodiments.

FIG. 16 shows a flowchart of a method for writing audio data according to some embodiments. This method is applicable to the display apparatus of the above embodiments, wherein the processor is further configured to perform steps S161 to S165.

S161: reading the connection state of the external audio output device in response to completion of creation of the buffer area.

S162: writing no audio data into the buffer area in response to the connection state being disconnected state.

S163: reading the playing state of the audio data in response to the connection state being connected state.

In response to the playing state being not play, the flow goes to S161 to read the connection state of the external audio output device.

In response to the playing state being playing, traversing the buffer area (S164).

In response to no audio data being stored in the buffer area, reading the connection state of the external audio output device (step S161 is executed).

In response to the buffer area storing the audio data, writing the audio data in the buffer area into the audio driver layer according to the recording format (S165).

In this embodiment, before writing the audio data into the audio driver layer, the processor traverses the buffer area and then determines whether to write the audio data into the audio driver layer according to whether the audio data is stored in the buffer area, so as to achieve the purpose of avoiding the waste of computing resources of the processor.

Usually, different external audio output devices support different numbers of sound channels. When the sound channels output from the display apparatus does not match with the sound channels supported by the external audio output device, audio output from the external audio device may appear chaotic or may not sound.

In view of the above issues, an embodiment of the disclosure provides a display apparatus, including at least a processor, a memory and a display, where the structure of the processor can refer to the above-mentioned embodiments. The working process of the display apparatus will be described below in combination with specific drawings.

Figure 17:
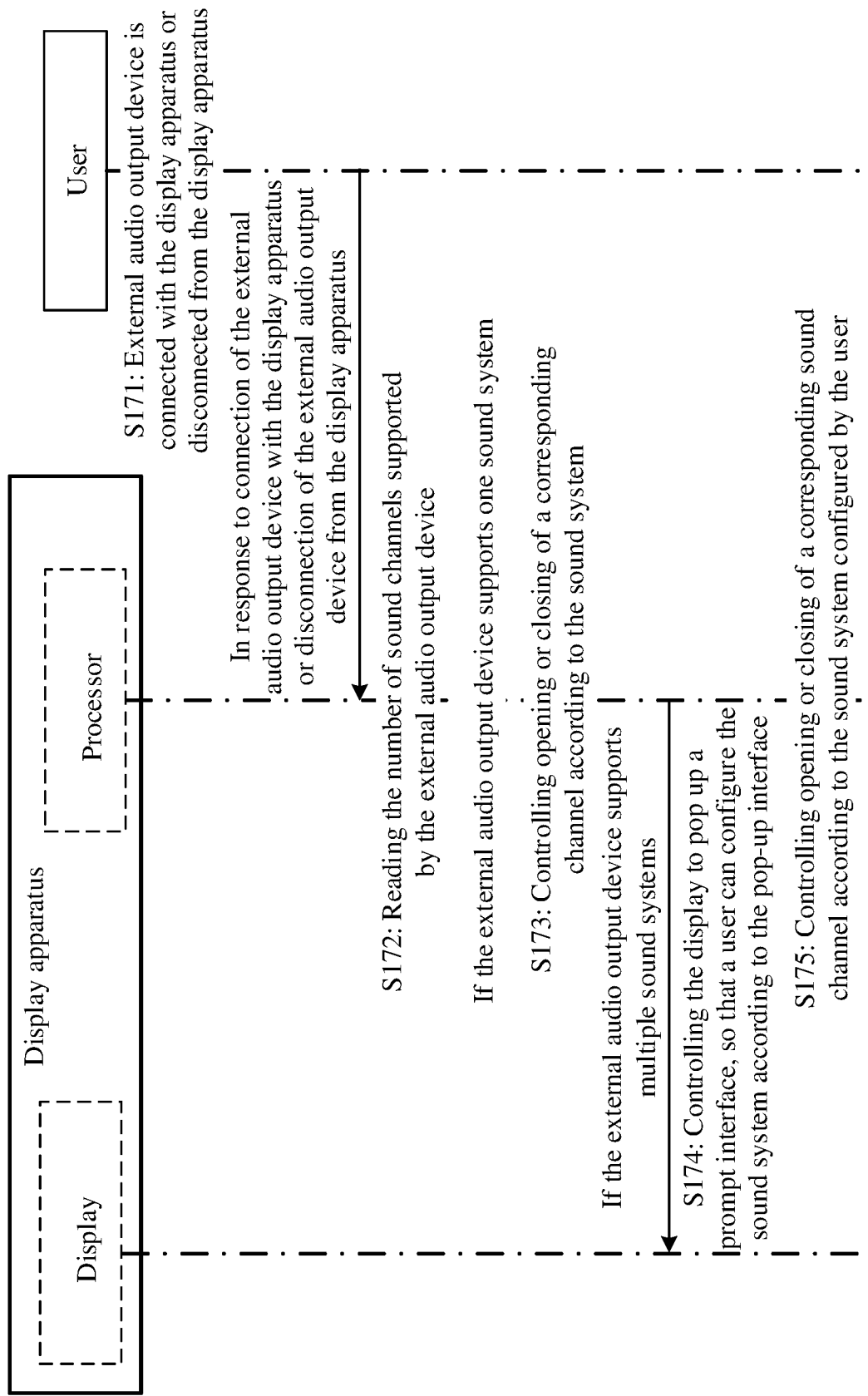
FIG. 17 shows a flowchart for illustrating interaction of a display apparatus with a user according to some embodiments.

FIG. 17 shows a flowchart for illustrating interaction of the display apparatus with a user according to some embodiments.

S171: external audio output device is connected with the display apparatus or disconnected from the display apparatus.

The external audio output device can be connected with the display apparatus by plugging in the display apparatus, and disconnected from the display apparatus by removing from the display apparatus.

The processor is configured to execute steps S172 to S175.

S172: reading the number of sound channels supported by the external audio output device in response to connection of the external audio output device with the display apparatus or disconnection of the external audio output device from the display apparatus.

For example, 2 sound channels are commonly referred to as stereo sound, including left and right channels. 5.1 surround sound system includes left channel, right channel, center channel, left surround channel, right surround channel and subwoofer channel 5.1.2 surround sound system includes left channel, right channel, center channel, left surround channel, right surround channel, subwoofer channel, upper left channel and upper right channel.

In the disclosure, some external audio output devices support one sound system; and some external audio output devices support multiple sound systems.

In this embodiment, the correspondence between the sound system supported by an external audio output device and the external audio output device may be stored in advance. In response to plugging-in or removal of the external audio output device, the processor may read the sound system supported by the external audio output device through the above correspondence.

If the external audio output device supports one sound system, the flow goes to step S173 to control opening or closing of a corresponding channel according to the sound system.

For example, if the external audio output device only supports 2 sound channels, the processor sets the states of the left channel and the right channel to the on state, and sets the states of other sound channels to the off state. If the external audio output device only supports 5.1 sound system, the processor sets the states of the left channel, right channel, center channel, left surround channel, right surround channel and subwoofer channel to the on state, and sets the states of other sound channels to the off state.

If the external audio output device supports multiple sound systems, the flow goes to step S174 to control the display to pop up a prompt interface, so that a user can configure the number of sound channels according to the pop-up interface.

Figure 18:
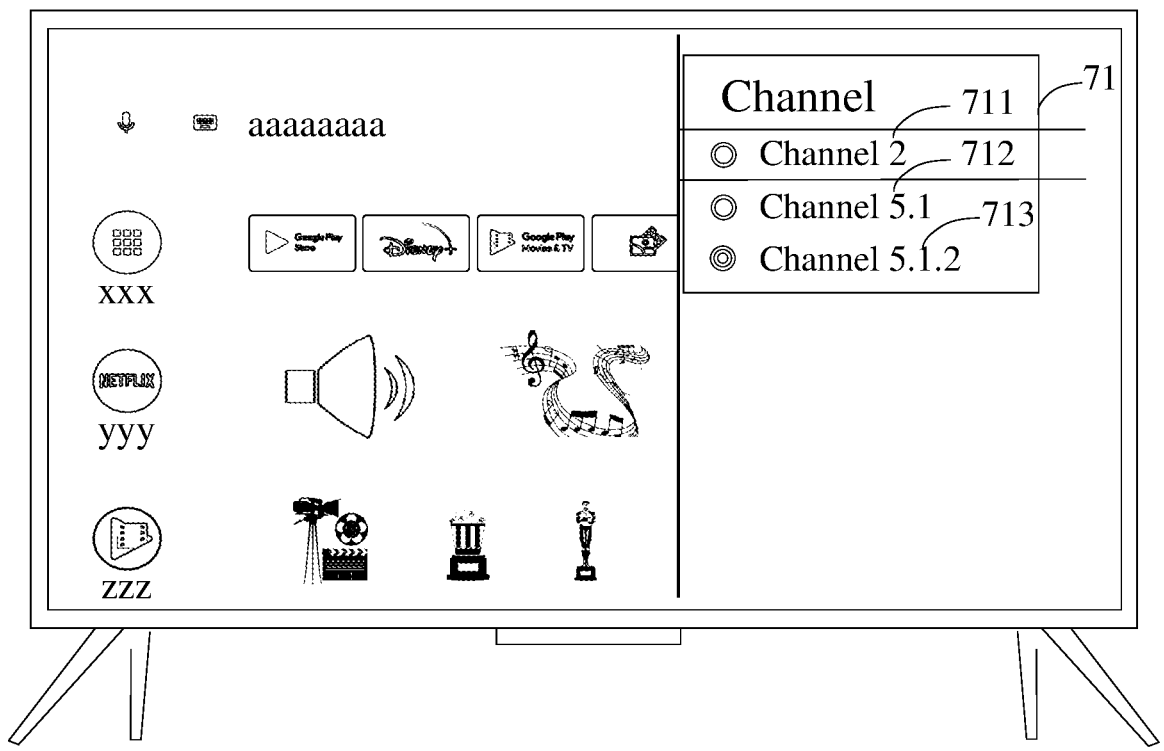
FIG. 18 shows a schematic diagram of a display apparatus according to some embodiments.

The display content of the prompt interface will be described below in combination with specific drawings. FIG. 18 shows a schematic diagram of a display apparatus according to some embodiments, where a display of the display apparatus shows a prompt interface 71. The prompt interface includes at least one channel selection control (711, 712, 713). In response to the user's selection of a channel selection control (711, 712, 713), the configuration of the sound system is completed.

S175: controlling opening or closing of a corresponding sound channel according to the sound system configured by the user, so that output sound channels of the display apparatus match with sound channels supported by the external audio output device.

In some embodiments, the sound system configured by the user is not the sound system supported by the external audio output device. In this case, if the sound channels are turned on or off according to the sound system configured by the user, audio output from the external audio device may appear chaotic or may not sound.

Figure 19:
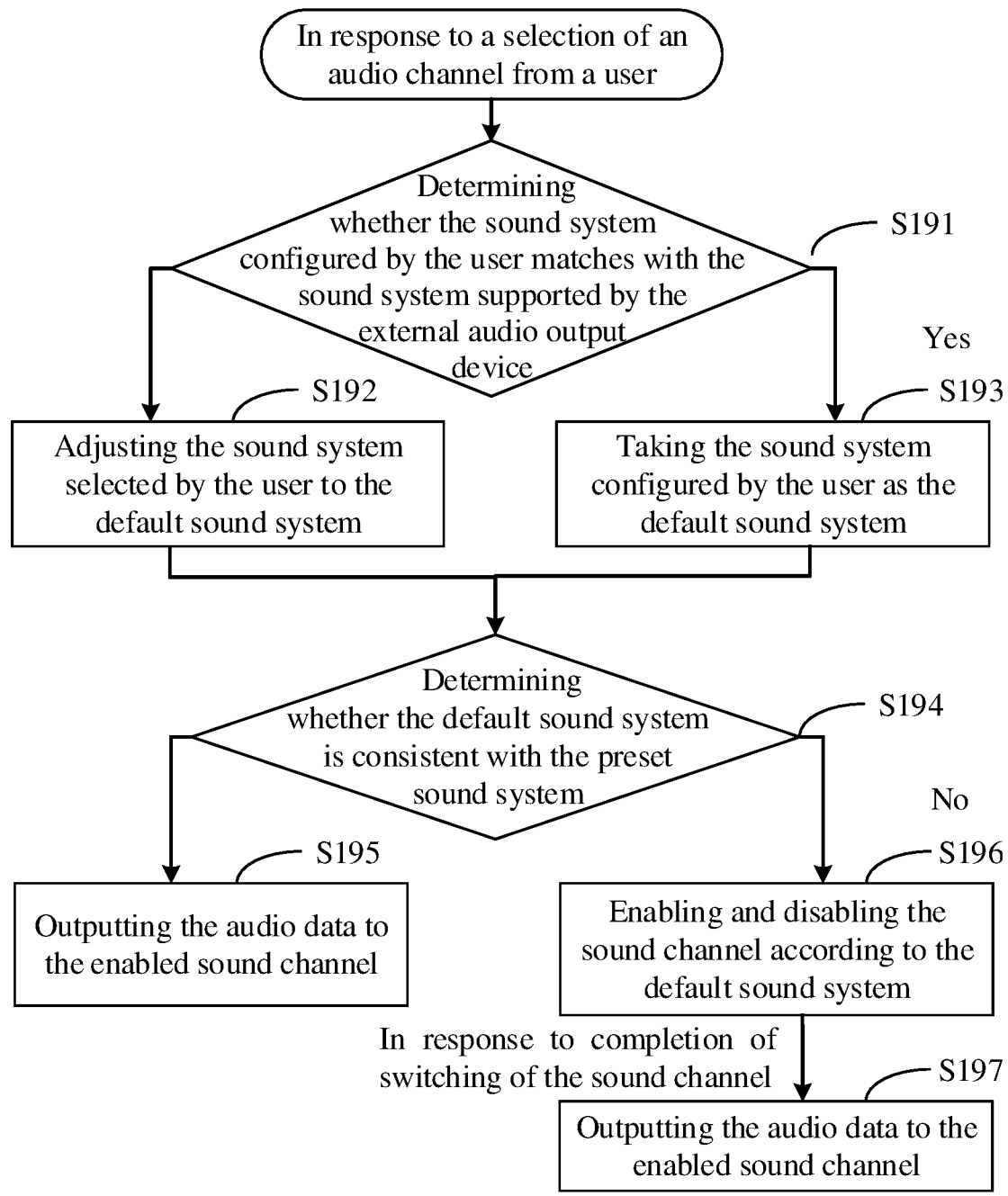
FIG. 19 shows a flowchart of a sound channel switching method according to some embodiments.

In view of the above issues, this embodiment further shows a sound channel switching method, which will be described below with reference to specific drawings. FIG. 19 shows a flowchart of a sound channel switching method according to some embodiments. On the basis of the above display apparatus, the processor is further configured to perform steps S191 to S197.

S191: in response to a selection of an audio channel from a user, determining whether the sound system configured by the user matches with the sound system supported by the external audio output device.

Determining whether the sound system configured by the user matches with the sound system supported by the external audio output device may comprise: determining whether the sound system configured by the user is one of the sound systems supported by the external audio output device; in response to the sound system configured by the user being one of the sound systems supported by the external audio output device, the sound system configured by the user matches with the sound system supported by the external audio output device; in response to the sound system configured by the user being not one of the sound systems supported by the external audio output device, the sound system configured by the user does not match with the sound system supported by the external audio output device.

S192: adjusting the sound system selected by the user to the default sound system in response to that the sound system configured by the user does not match with the sound system supported by the external audio output device, where the default sound system is one of the sound systems supported by the external audio output device.

In some embodiments, the sound system supported by the external audio output device is 2 sound channels and 5.1 sound system, and the sound system configured by the user for the external audio output device is 5.1.2 sound system. In this case, the processor can adjust 5.1.2 sound system to the default sound system.

S193: taking the sound system configured by the user as the default sound system in response to the sound system configured by the user matching with the sound system supported by the external audio output device.

The processor can directly enable or disable the sound channel according to the default sound system.

There are multiple implementations for switching the on or off state of the sound channel according to the default sound system. For example: the processor can firstly disables all sound channels, and then enables the sound channels corresponding to the default sound system. For example, in response to confirming that the default sound system is 2 sound channels, the processor disables all currently enabled sound channels, and then enables the left and right channels.

For another example, in order to reduce the data processing amount of the processor, the processor may determine whether to switch sound channels by determining whether the default system matches with the preset sound system.

S194: determining whether the default sound system is consistent with the preset sound system.

In the disclosure, the preset sound system is the default sound system corresponding to the external audio output device immediately previously connected with the display apparatus. For example, the default sound system corresponding to the previous external audio output device connected with the display apparatus is 5.1.2 sound system, then the preset sound system is 5.1.2 sound system in the application scenario of connecting the external audio output device this time.

In response to the default sound system being consistent with the preset sound system, the audio data is output to the enabled sound channel (S195).

In response to the default sound system being consistent with the preset sound system, it indicates that the number of sound channels currently enabled by the display apparatus is consistent with the number of sound channels supported by the external audio output device, so there is no need to switch the states of the sound channels, and the audio data can be output directly to the enabled sound channels.

In response to being inconsistent, the sound channel is enabled or disabled according to the default sound system (S196).

In response to the default sound system being inconsistent with the preset sound system, it indicates that the number of sound channels currently enabled by the display apparatus is inconsistent with the number of sound channels supported by the external audio output device. In this case, there is a need to enable or disable of the sound channel according to the default sound system. For the implementation of enabling and disabling the sound channel according to the default sound system, reference may be made to the above-mentioned embodiments.

In response to completion of enabling and disabling of the sound channel, the audio data is output to the enabled sound channel (S197).

It can be seen that the display apparatus in the embodiments of the disclosure can adjust the sound system configured by the user when the sound system configured by the user is not a sound system supported by the external audio output device, so that the sound system configured by the user matches with the sound system supported by the external audio output device, so as to avoid the problem that the audio output by the external audio output device may appear chaotic or may not sound.

Usually, in the process of switching sound channels, the audio driver service will output a popping sound. In this case, if the external audio output device reads the audio data from the processor, the external audio output device will play the popping sound, affecting the user experience. In view of the above issues, this embodiment further shows a sound channel switching method based on the display apparatus of the above embodiments. The sound channel switching method will be described below with reference to specific drawings.

Figure 20:
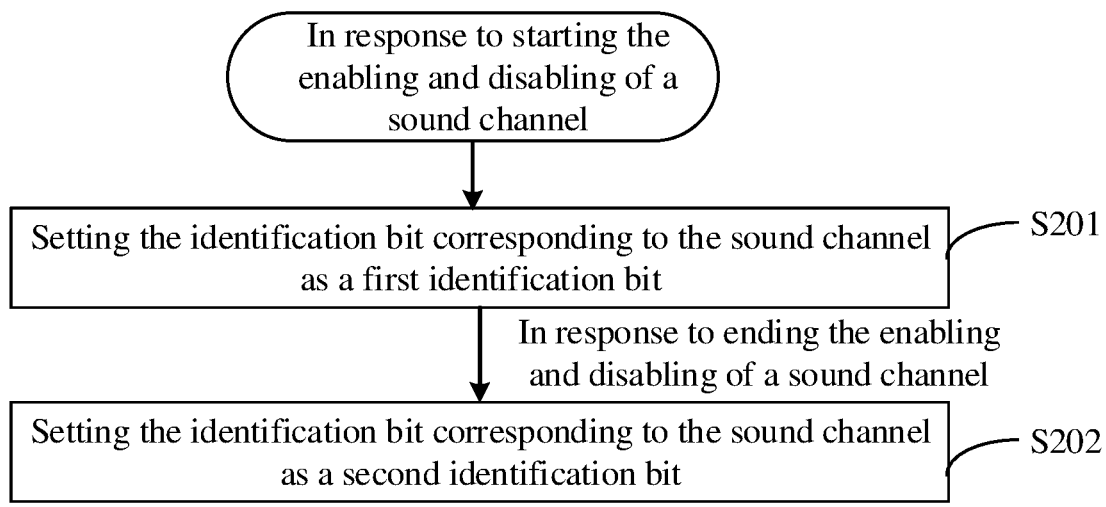
FIG. 20 shows a flowchart of a sound channel switching method according to some embodiments.

FIG. 20 shows a flowchart of a sound channel switching method according to some embodiments. On the basis of the above display apparatus, the processor is further configured to perform steps S201 to S202.

S201: in response to starting the enabling and disabling of a sound channel, setting the identification bit corresponding to the sound channel as a first identification bit, where the external audio output device in connection with the sound channel does not obtain audio data from the sound channel with the first identification bit.

The first identification bit may be a letter, a number, a character or a combination thereof.

S202: in response to ending the enabling and disabling of a sound channel, setting the identification bit corresponding to the sound channel as a second identification bit, where the external audio output device in connection with the sound channel obtains audio data from the sound channel with the second identification bit.

In the display apparatus of the embodiments of the disclosure, during the process of switching the sound channel from the on state to the off state or from the off state to the on state, the processor can switch the value of the identification bit corresponding to the sound channel to the first identification value, so as to disable the external audio output device in connection with the sound channel to obtain audio data from the sound channel, thereby preventing the popping sound output from the audio driver service from being played through the external audio output device during the process of switching the sound channel.

Usually, the audio data received by the processor is transmitted to the external audio output device through an audio stream path. Different external audio output devices correspond to different audio stream paths. If the audio stream path does not match with the external audio output device, the audio output by the external audio output device may appear chaotic or may not sound.

Figure 21:
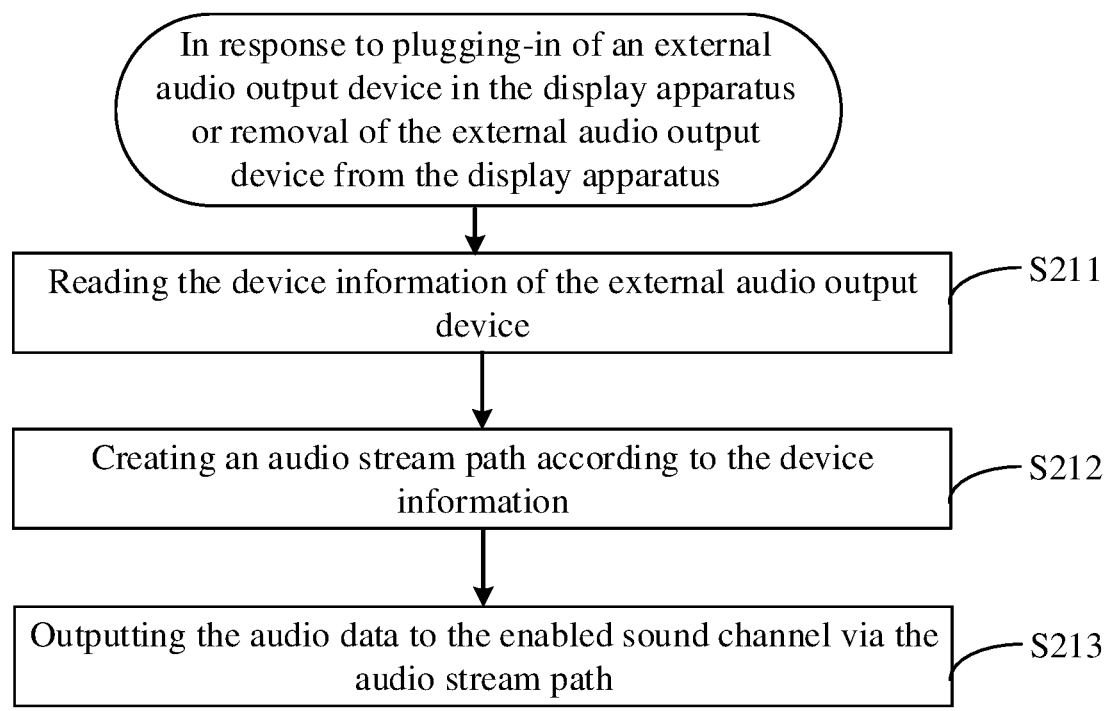
FIG. 21 shows a flowchart of an audio data transmission method according to some embodiments.

In view of the above issues, this embodiment further shows an audio data transmission method, which will be described below with reference to specific drawings. FIG. 21 shows a flowchart of an audio data transmission method according to some embodiments. On the basis of the above display apparatus, the processor is further configured to perform steps S211 to S213.

S211: reading the device information of an external audio output device in response to plugging-in of an external audio output device in the display apparatus or removal of the external audio output device from the display apparatus.

The device information in this embodiment includes at least the connection state of the external audio output device and the identity of the external audio output device. The connection states include a connected state and a disconnected state. The identity may be but not limited to the ID of the device or the name of the device, and any identifier that can uniquely identify the device may be used as a device identifier.

S212: creating an audio stream path according to the device information.

There are many implementations for creating an audio stream path according to the device information. An implementation of creating the audio stream path will be described below with reference to specific drawings.

Figure 22:
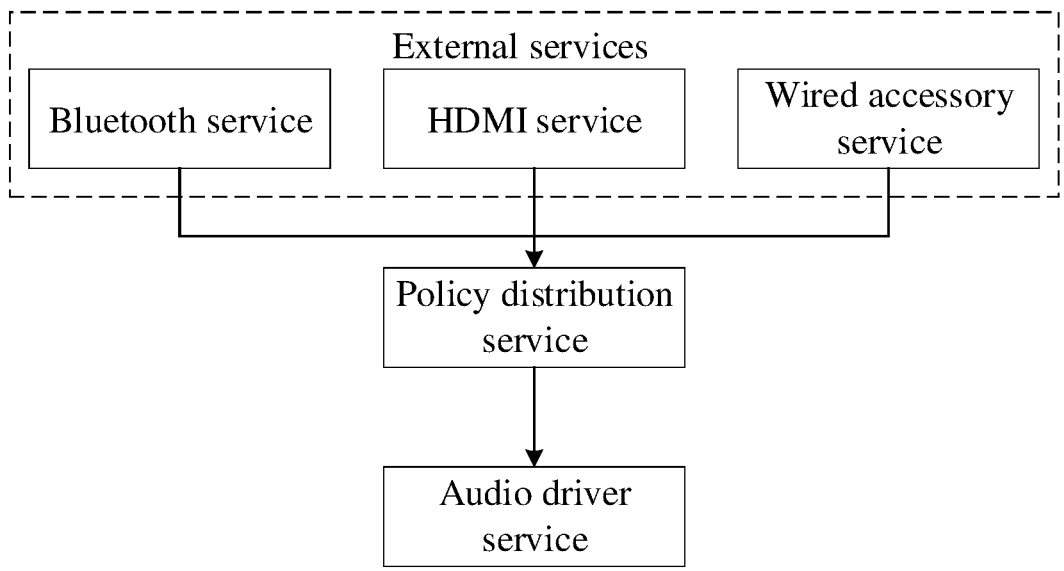
FIG. 22 shows a structural block diagram of a processor according to some embodiments.
Figure 23:
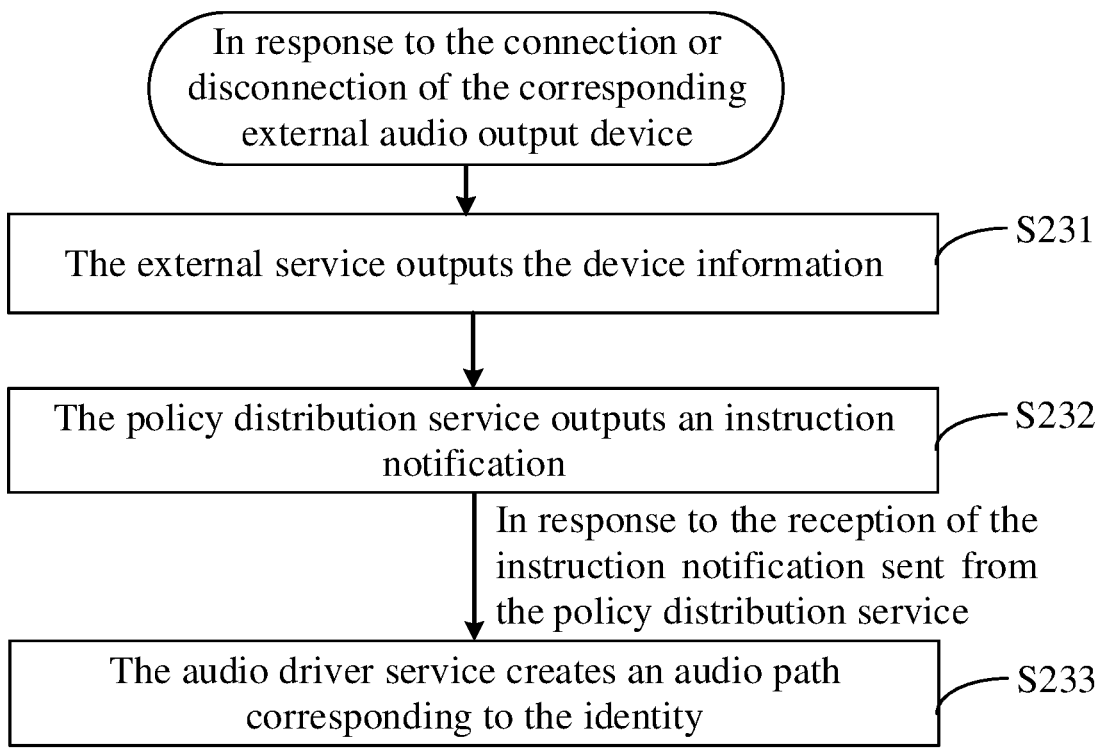
FIG. 23 shows a flowchart of an implementation of creating an audio stream path according to some embodiments.

FIG. 22 shows a structural block diagram of a processor according to some embodiments. It can be seen that the processor is further configured to execute a policy distribution service, an audio driver service and at least one external service. FIG. 23 shows a flowchart of an implementation of creating an audio stream path according to some embodiments.

The external service is used for outputting the device information in response to the connection or disconnection of the corresponding external audio output device in S231.

The policy distribution service is used to for outputting an instruction notification in response to the reception of the device information in S232, where the instruction notification includes at least the connection state of the external audio output device and the identity of the external audio output device.

The audio driver service is used for creating an audio path corresponding to the identity in response to the connection state being the connected state and the reception of the instruction notification sent from the policy distribution service in S233.

In the disclosure, if the connection state output via the policy distribution service is the connected state, it indicates that a new external audio output device is connected; and if the connection state output via the policy distribution service is the disconnected state, it indicates that the external audio output device is removed.

When a new external audio output device is plugged in, the audio path needs to be reconstructed so that the reconstructed audio path matches with the external audio output device that is newly connected. Therefore, in this embodiment, if the connection state is the connected state, an audio path corresponding to the identity is created, where the identity uniquely identifies the external audio output device, so the audio path created based on the identity matches with the external audio output device.

Usually, when the external audio output device is an ARC device and when the ARC device is plugged into the display apparatus, the ARC device will report the device information multiple times, so that the policy distribution service receives the device information message multiple times when the external audio output device is plugged in once. In some scenarios, the policy distribution service may receive multiple pieces of identical device information, which may be generated by multiple devices. In order to avoid this issue, this embodiment further provides a display apparatus, where the processor of the display apparatus is further configured to execute an audio service, and the audio service is used for filtering the repeated device information. The working process of the audio service will be described below in combination with specific drawings.

Figure 24:
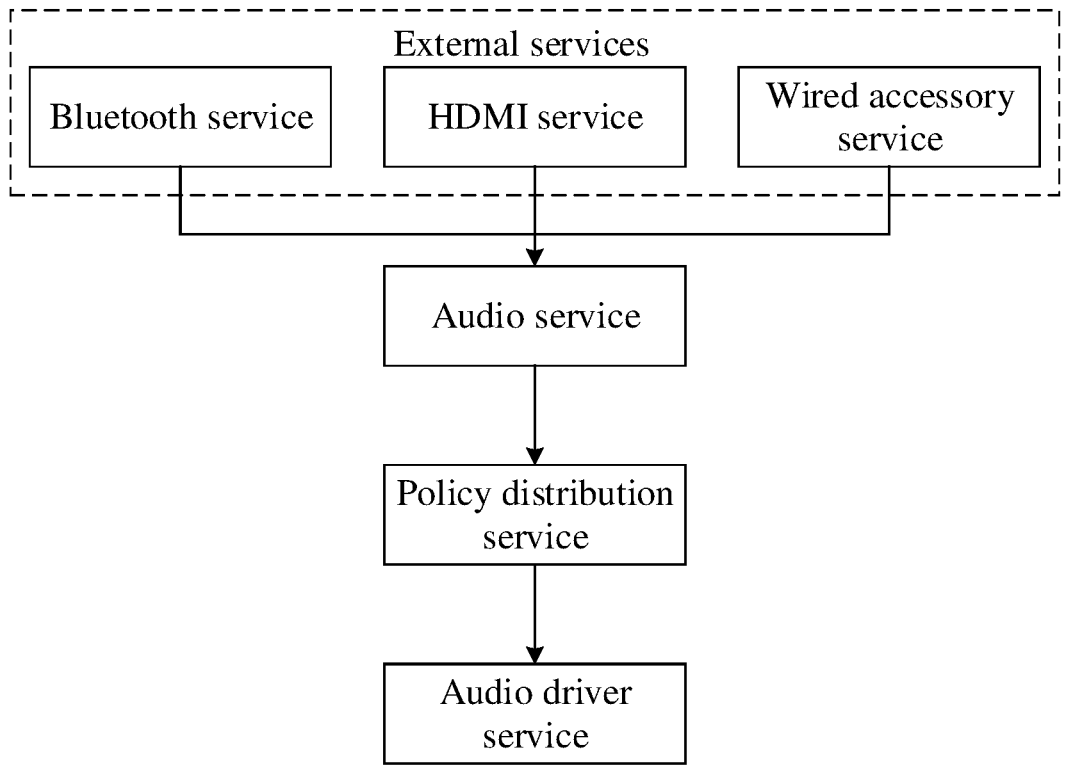
FIG. 24 shows a structural block diagram of a processor according to some embodiments.
Figure 25:
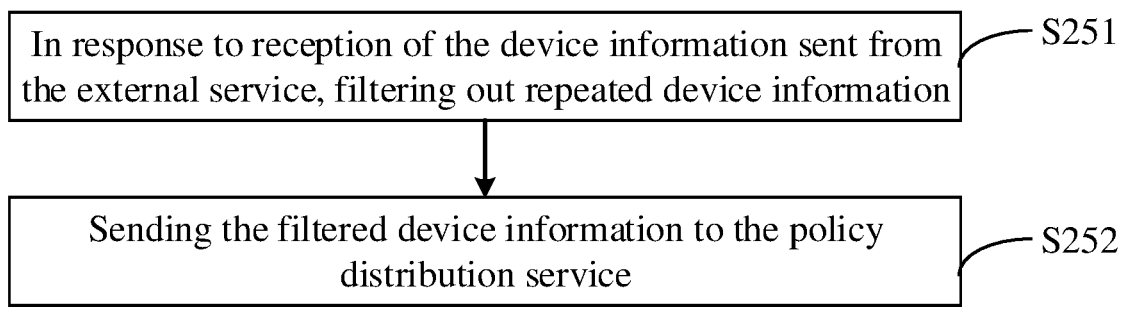
FIG. 25 shows a flowchart of a method for filtering device information according to some embodiments.

FIG. 24 shows a structural block diagram of a processor according to some embodiments. It can be seen that the processor is further configured to execute a policy distribution service, an audio driver service, an audio service and at least one external service. FIG. 25 shows a method flowchart of filtering device information according to some embodiments. It can be seen that the audio service is used to perform steps S251 to S252.

S251: in response to reception of the device information sent from the external service, filtering out repeated device information which is a repetition of the device information.

The filtering of the repeated device information from the device information received from the external service may include: the audio service stores many pieces of device information received; and in response to two pieces of device information received within the preset time being the same, the audio service deletes one of them. The preset time may be set according to requirements, and for example, may be 3 s.

S252: sending the filtered device information to the policy distribution service.

The audio service of the display apparatus in this embodiment can filter the same device information received within the preset time, and then send the filtered device information to the policy distribution service, so that the policy distribution service stores only one piece of device information when one external audio output device is plugged in or out.

Usually the audio stream path is affected by the audio stream type of the media resource currently played by the player. In order to ensure that the audio stream path created by the audio driver service can match with the audio stream type of the media resource currently played by the player, the audio driver service can create an audio path based on the audio stream type of the currently played media resource supported by the external audio output device.

Figure 26:
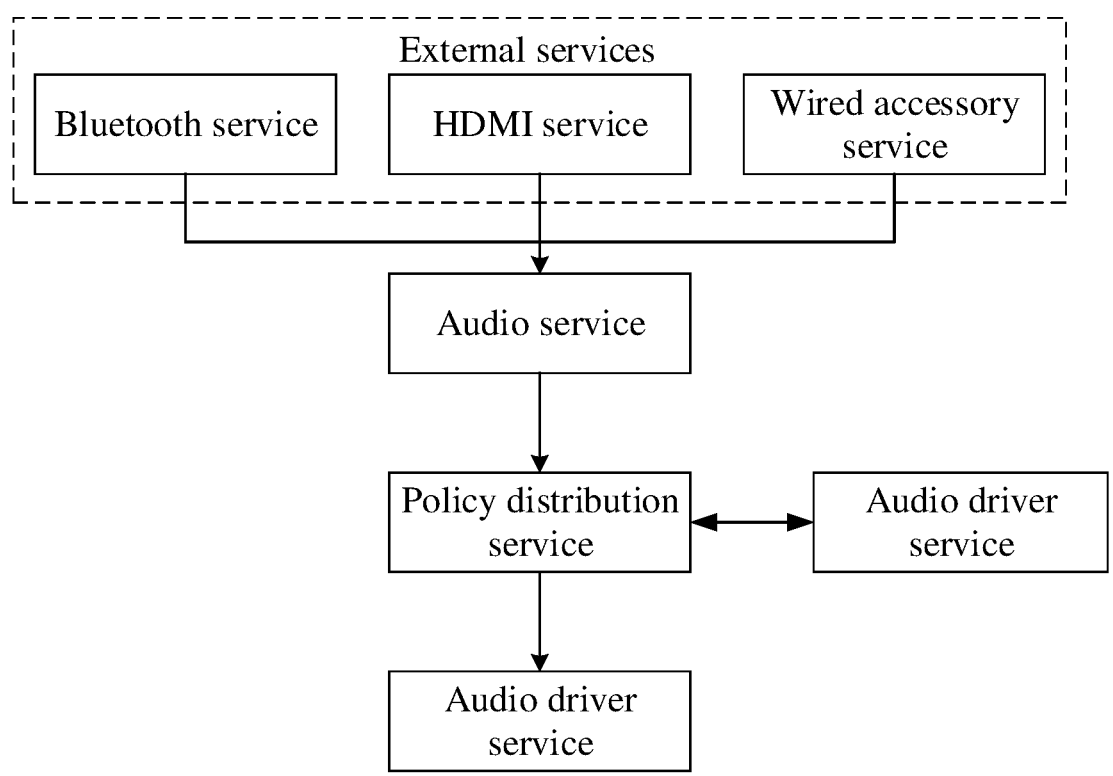
FIG. 26 shows a structure block diagram of a processor according to some embodiments.
Figure 27:
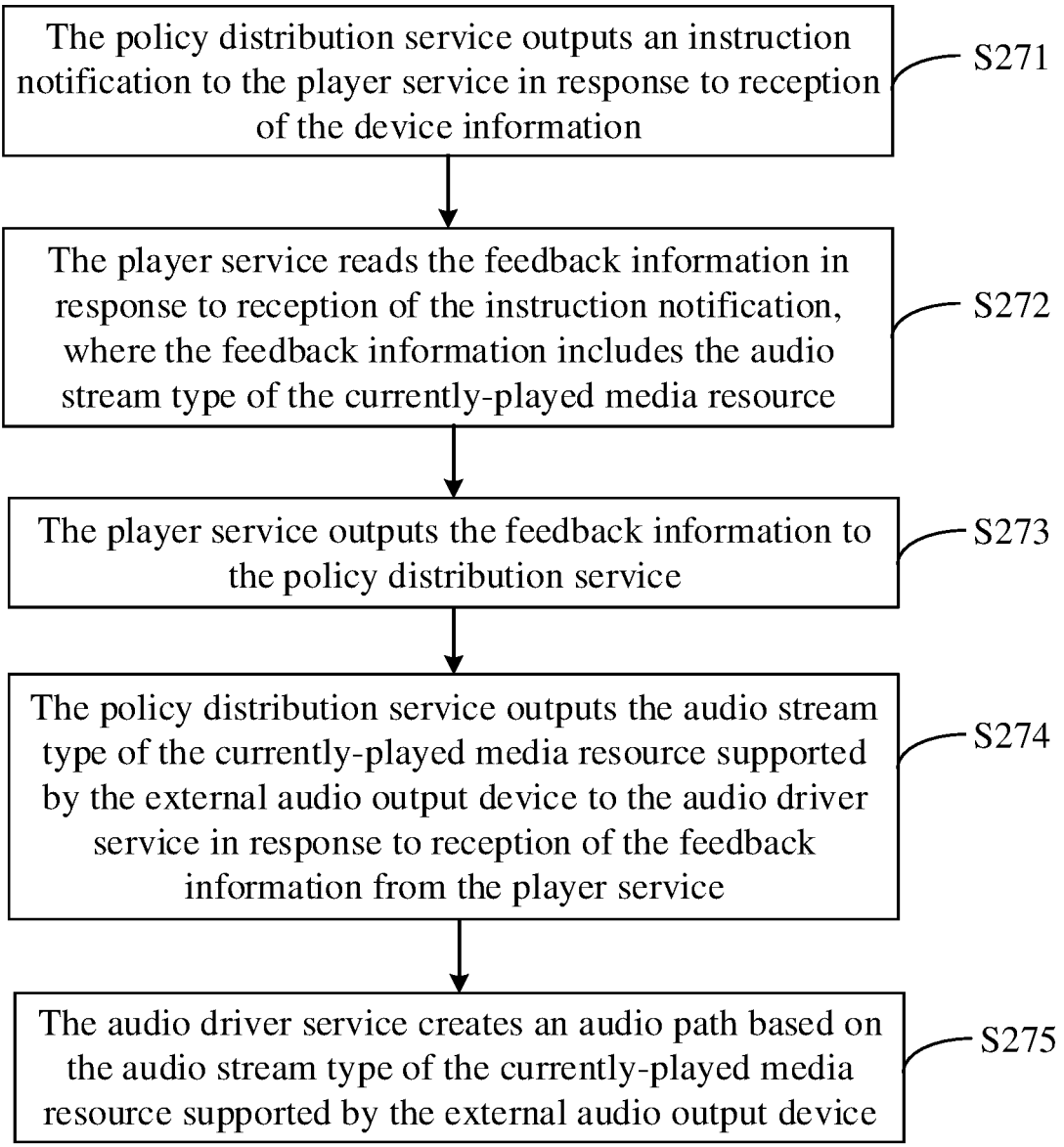
FIG. 27 shows a flowchart of a method of creating an audio path according to some embodiments.

The process of creating an audio path will be described below in combination with specific drawings. FIG. 26 shows a structural block diagram of a processor according to some embodiments. It can be seen that the processor is further configured to execute a policy distribution service, an audio driver service, an audio service, a player service and at least one external service. FIG. 27 shows a flowchart of a method of creating an audio path according to some embodiments, including steps S271 to S275.

S271: the policy distribution service outputs an instruction notification to the player service in response to reception of the device information, where the instruction notification is used to notify the player that an external audio output device is plugged in.

S272: the player service reads feedback information in response to reception of the instruction notification, where the feedback information includes the audio stream type of the currently-played media resource.

S273: the player service outputs the feedback information to the policy distribution service.

S274: the policy distribution service outputs the audio stream type of the currently-played media resource supported by the external audio output device to the audio driver service, in response to reception of the feedback information from the player service.

In this embodiment, the policy distribution service stores the device information of the external audio output device, and the device information includes audio stream types supported by the external audio output device. In response to reception of the audio stream type of the currently-played media resource sent from the player service, the processor may select the audio stream type of the currently-played media resource supported by the external audio output device from the audio stream types supported by the external audio output device.

For example, the audio stream types supported by the external audio output device include: audio stream type A, audio stream type B, and audio stream type C. The audio stream types of the currently-played media resource include audio stream type C, audio stream type D and audio stream type E, so the audio stream type C is the audio stream type of the currently-played media resource supported by the external audio output device.

S275: the audio driver service creates an audio path based on the audio stream type of the currently-played media resource supported by the external audio output device.

In this embodiment, the audio driver service can create an audio path based on the audio stream type of the currently-played media resource supported by the external audio output device, thereby ensuring that the created audio path matches with both the external audio output device and the audio stream type of the currently-played media resource.

Figure 28:
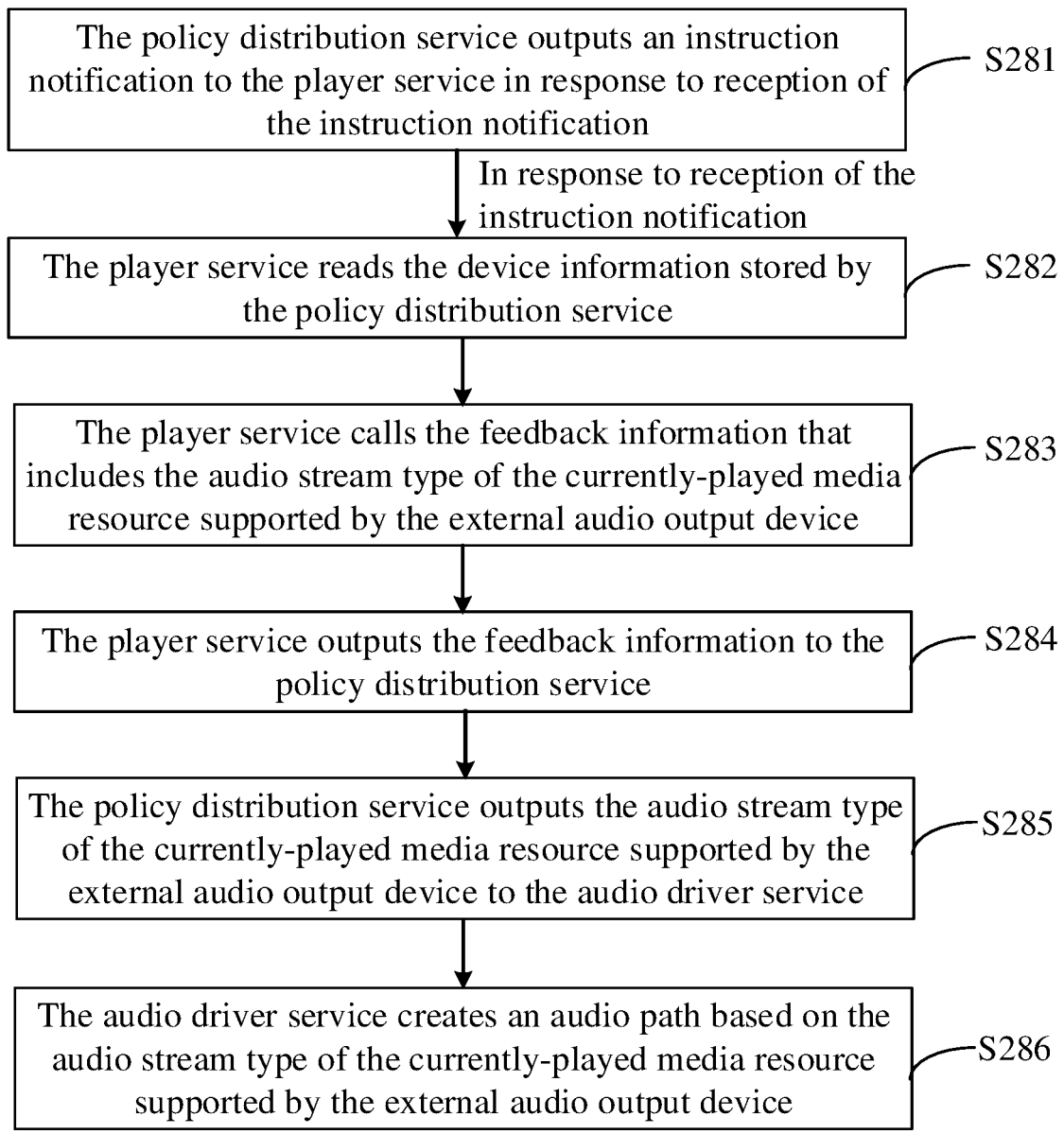
FIG. 28 shows a flowchart of a method of creating an audio path according to some embodiments.

FIG. 28 shows a flowchart of a method of creating an audio path according to some embodiments, including steps S281 to S286.

S281: the policy distribution service outputs an instruction notification to the player service in response to reception of the instruction notification, where the instruction notification is used to notify the player that an external audio output device is plugged in.

S282: the player service reads the device information stored by the policy distribution service in response to reception of the instruction notification.

S283: the player service calls the feedback information that includes the audio stream type of the currently-played media resource supported by the external audio output device.

S284: the player service outputs the feedback information to the policy distribution service.

S285: the policy distribution service outputs the audio stream type of the currently-played media resource supported by the external audio output device to the audio driver service, in response to reception of the feedback information sent from the player service.

S286: the audio driver service creates an audio path based on the audio stream type of the currently-played media resource supported by the external audio output device.

In this embodiment, the audio driver service can create an audio path based on the audio stream type of the currently-played media resource supported by the external audio output device, thereby ensuring that the created audio path matches with both the external audio output device and the audio stream type of the currently-played media resource.

It should be noted that the embodiments only exemplarily show several methods of creating the audio path, and the methods of creating the audio stream path may be, but not limited to, the above methods in other embodiments.

S213: outputting the audio data to the enabled sound channel via the audio stream path.

The audio states of an external audio output device, for example, the power amplifier device 500, may include mute and unmute. The mute state indicates that the volume of the audio output from the power amplifier device 500 is zero; and the unmute state indicates that the audio output from the power amplifier device 500 has a certain volume. The audio state of the power amplifier device 500 can be controlled or changed by the user.

After the display apparatus 200 and the external power amplifier device 500 are connected or have been connected through ARC (Audio Return Channel), the user can use the remote control to manually adjust the volume of the external power amplifier device 500 or mute the external power amplifier device 500. Normally, the external power amplifier device 500 will actively report the current audio state (for example, volume value or mute state, etc.) of the power amplifier device 500 to the display apparatus 200 by sending a CEC (Consumer Electronics Control) instruction. The display apparatus 200 will display the audio state, thereby informing the user of the audio state of the currently-connected external power amplifier device 500.

However, some current power amplifier devices 500 do not actively report the audio state to the display apparatus 200 through CEC instructions due to their own configuration reasons. This situation will affect the user's understanding of the audio state of the power amplifier device 500, and the audio state of the power amplifier device 500 cannot be adjusted more accurately, thereby affecting the user's experience of using the display apparatus 200 and the power amplifier device 500.

In view of the above issues, some power amplifier devices 500 cannot actively report the audio state to the display apparatus 200, an embodiment of the disclosure provides a display apparatus 200 and a power amplifier device 500.

Figure 29:
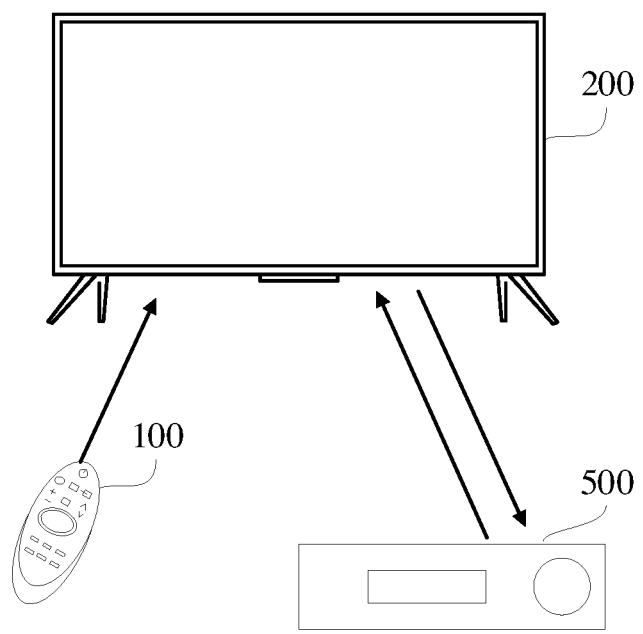
FIG. 29 shows a schematic diagram for illustrating interaction between the display apparatus 200 and the power amplifier device 500 according to some embodiments.

FIG. 29 shows a schematic diagram of interaction between the display apparatus 200 and the power amplifier device 500 according to some embodiments. The power amplifier device 500 may be connected with the display apparatus 200 through the ARC of the display apparatus 200, and output the audio content on the display apparatus 200. As shown in FIG. 29, after the display apparatus 200 is connected with the power amplifier device 500, the display apparatus 200 can also be connected with the control device 100 such as a remote control, so the user can control the display apparatus 200 through the control device 100 and then control the power amplifier device 500.

Figure 30:
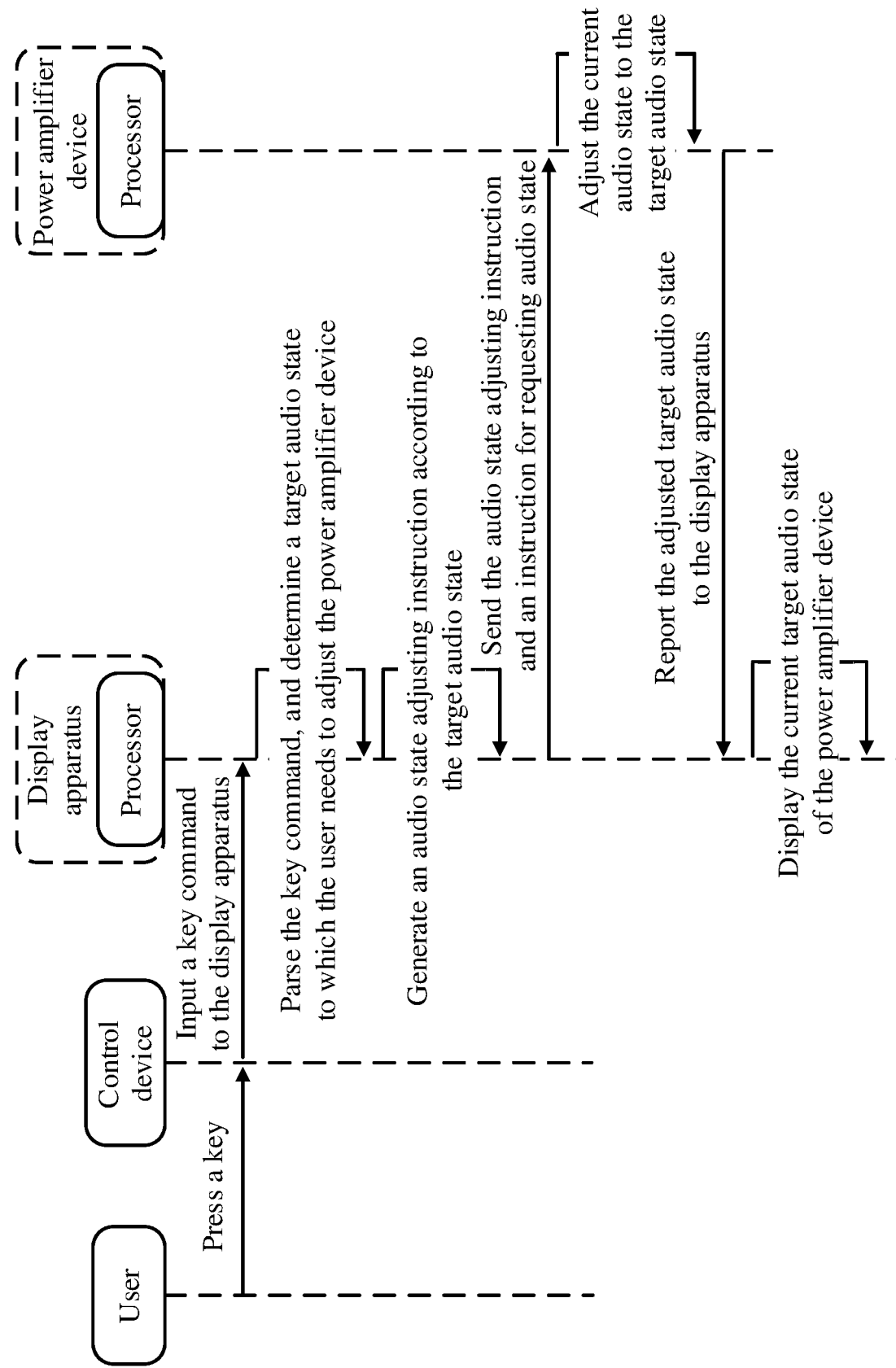
FIG. 30 shows a first schematic flowchart of displaying the audio state of the power amplifier device 500 on the display apparatus according to some embodiments.

The control device 100 usually has a volume key that can increase or decrease the volume, and may also have a mute key that directly sets the volume to zero. As shown in FIG. 30, when the user wants to adjust the audio state of the power amplifier device 290, the user may press a related key on the control device 100 to thereby input a key command to the display apparatus 200. The display apparatus 200 parses the key command after receiving it, and determines a target audio state to which the user needs to adjust the power amplifier device 290; and the display apparatus 200 generates an audio state adjusting instruction according to the target audio state. Then, the display apparatus 200 sends the audio state adjusting instruction to the power amplifier device 290 so that the power amplifier device 290 adjusts the current audio state to the target audio state. Meanwhile, the display apparatus 200 also sends an instruction for requesting audio state to the power amplifier device 290, to request the power amplifier device 290 to report the adjusted target audio state to the display apparatus 200, so that the display apparatus 200 can show the current target audio state of the power amplifier device 290.

In the above-mentioned process where the display apparatus 200 displays the current target audio state of the power amplifier device 290, the processor 250 of the display apparatus 200 may be configured to: firstly receive a key command for adjusting the audio state of the power amplifier device 500 input from the user via the control device 100, then parse the key command to obtain a target audio state to which the power amplifier device 290 needs to be adjusted, then send an instruction for requesting audio state and an audio state adjusting instruction for adjusting the audio state to the power amplifier device 290, and finally receive and display the target audio state returned by the power amplifier device 290.

As can be seen, even if some power amplifier devices 290 currently do not actively report their own audio states to the display apparatus 200, the display apparatus 200 in the embodiment of the disclosure may also actively send the instruction for requesting audio state to these power amplifier devices 290 to request these power amplifier devices 290 to report the adjusted target audio states to the display apparatus 200 after receiving the key command from the user to operate the power amplifier device 290, thereby avoiding the problem that the display apparatus 200 cannot display the audio states of some power amplifier devices 290 caused by the failure of the power amplifier devices 290 to report the audio states, and also ensuring that the user can know the current audio states of the power amplifier devices 290 in time.

As described in the foregoing embodiments, the audio states of the display apparatus 200 include a volume adjustment state with a volume value and a mute state.

Figure 31:
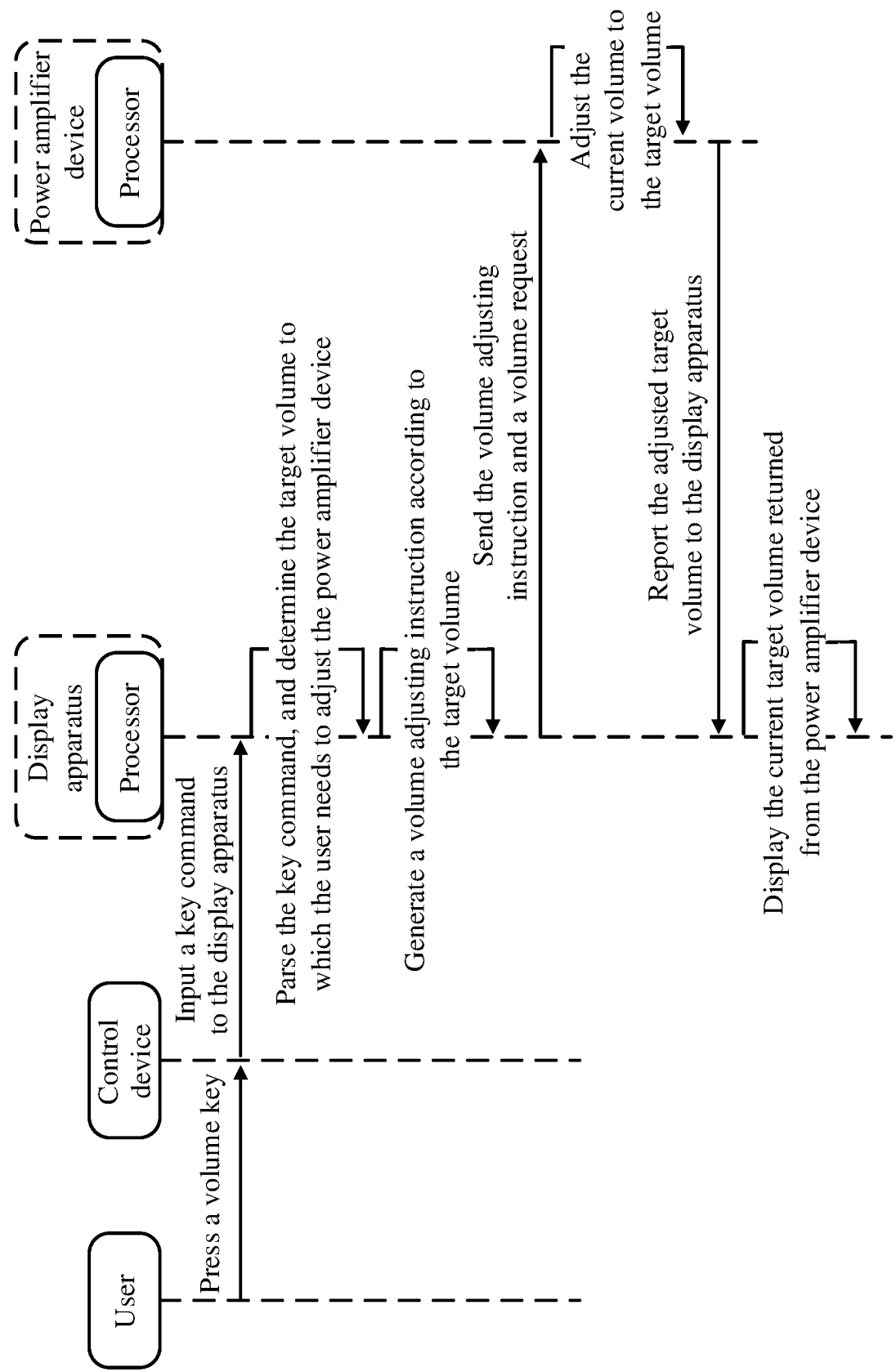
FIG. 31 shows a second schematic flowchart of displaying the audio state of the power amplifier device 500 on the display apparatus according to some embodiments.

FIG. 31 shows a second schematic flowchart where the display apparatus 200 displays the audio state of the power amplifier device 500 according to some embodiments. As shown in FIG. 31, when the user uses the control device 100 to adjust the volume of the display apparatus 200, the user can press a volume key on the control device 100, such as volume "+" or volume "−" on the remote control. In this case, the control device 100 will send a key command to press the volume key to the display apparatus 200. After receiving the command, the display apparatus 200 parses a target volume for adjustment, for example, increasing or decreasing the volume by 10 values, etc. Then, the display apparatus 200 generates a volume adjusting instruction based on the target volume and sends it to the power amplifier device 500, to control the power amplifier device 500 to adjust the current volume to the target volume; meanwhile, in order to enable the power amplifier device 500 to report the adjusted volume to the display apparatus 200 in time, the display apparatus 200 also sends a volume request to the power amplifier device 500, to request the power amplifier device 500 to return the target volume to the display apparatus 200 after adjusting the volume value. Furthermore, the display apparatus 200 can display according to the current target volume provided by the power amplifier device 500, which is convenient for the user to view and understand the current volume of the power amplifier device 500.

Usually, the time for the user to press the volume key once is very short, about a few tenths of a second or a few milliseconds, and each press of the volume key can indicate that the volume is controlled to increase or decrease by one stepsize. However, in some embodiments, in order to adjust the volume more quickly, the user will press and hold the volume key. The adjustment of the volume is generally related to the length of time the user presses the volume key. The longer the volume key is pressed, the greater the value of the target volume to be adjusted. For example, if the user presses the volume "+" key for 2 seconds, the corresponding target volume may be required to increase by 20 volume stepsizes; or, if the user presses the volume "−" key for 1 second, the corresponding target volume may be required to decrease by 10 volume stepsizes.

In the above case where the user adjusts the volume of the power amplifier device 500 through the volume key of the control device 100, the processor 250 of the display apparatus 200 may be configured to: firstly parse a key command to obtain a target volume to which the power amplifier device 500 needs to be adjusted, where the key command is input by pressing a volume key on the control device 100, then send a volume request and a volume adjusting instruction for adjusting the volume to the power amplifier device 500, and finally, receive the adjusted target volume returned from the power amplifier device 500.

Figure 32:
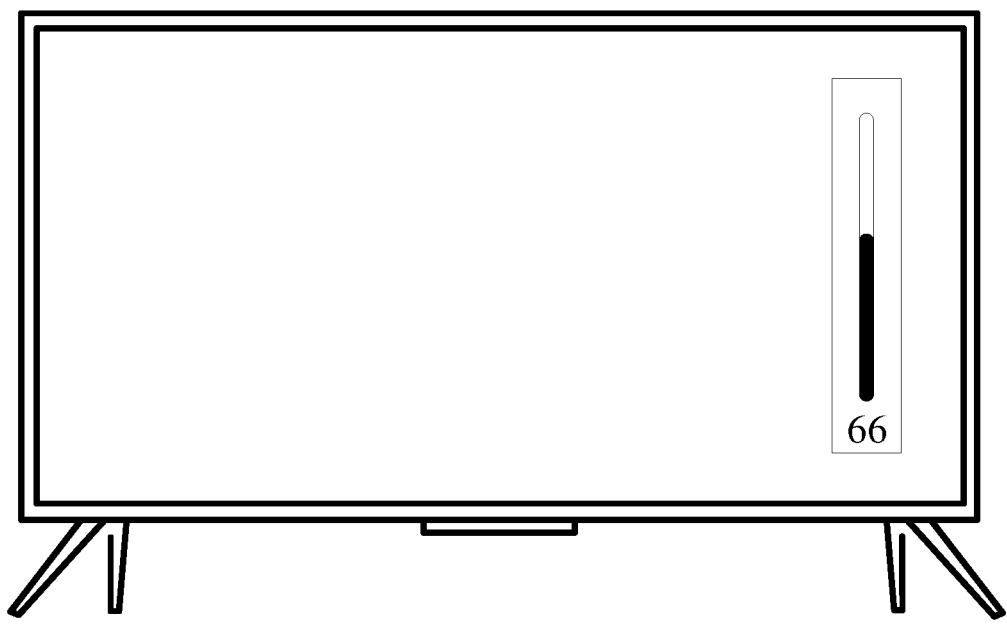
FIG. 32 shows a first schematic diagram of a user interface on the display apparatus 200 according to some embodiments.

FIG. 32 shows a first schematic diagram of a user interface of the display apparatus 200 according to some embodiments.

In some embodiments, in order to facilitate the user to view the adjusted target volume of the power amplifier device 500, the display apparatus 200 displays the specific target volume on the user interface after receiving the target volume returned from the power amplifier device 500. As shown in FIG. 32, the target volume can be displayed on the user interface in the form of a volume bar, and the volume bar comprises a particular portion for indicating the size of the target volume. Meanwhile, in order to enable the user to understand the specific value of the target volume, as shown in FIG. 32, the display apparatus 200 also correspondingly displays the specific value of the current target volume, such as 30, 50, etc., below the volume bar.

In the above process of displaying the target volume, the processor 250 of the display apparatus 200 may further be configured to: firstly receive the adjusted target volume returned from the power amplifier device 500, and then display the target volume on the user interface of the display apparatus 200 in the form of a volume bar.

Figure 33:
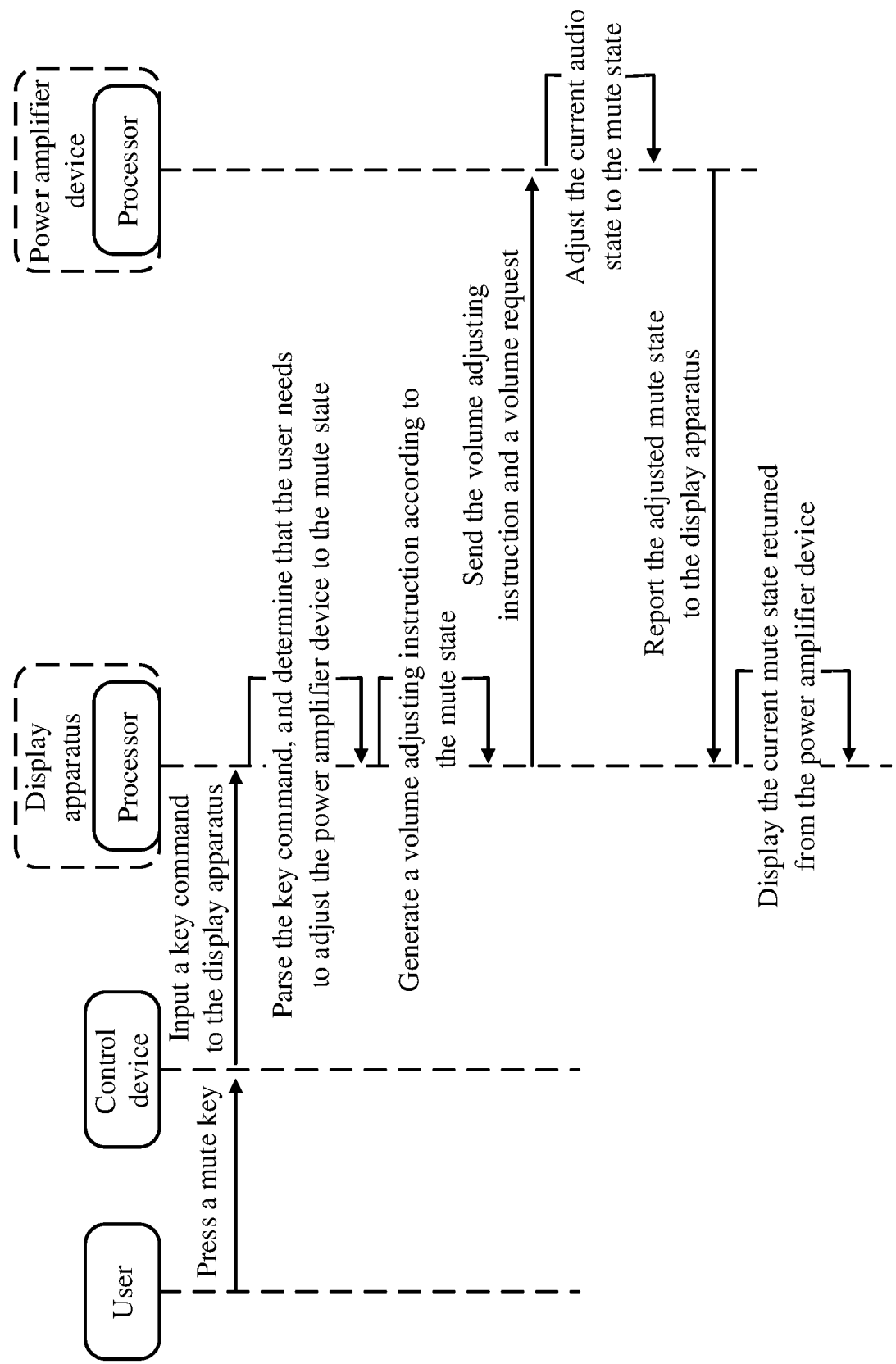
FIG. 33 shows is a third schematic flowchart of displaying the audio state of the power amplifier device 500 on the display apparatus according to some embodiments.

FIG. 33 shows a third schematic flowchart of displaying the audio state of the power amplifier device 500 on the display apparatus according to some embodiments. As shown in FIG. 33, when the user uses the control device 100 to control the power amplifier device 500 to mute, the user can press the mute key on the power amplifier device 500. In this case, the control device 100 will send a key command to press the mute key to the display apparatus 200. After receiving the command, the display apparatus 200 parses that the power amplifier device 500 needs to be adjusted to the mute state, that is, the volume value is zero. Then, the display apparatus 200 generates a volume adjusting instruction based on the mute state and sends it to the power amplifier device 500 to control the power amplifier device 500 to adjust the current audio state to the mute state; meanwhile, in order to enable the power amplifier device 500 to report the adjusted mute state to the display apparatus 200 in time, the display apparatus 200 also needs to send a volume request to the power amplifier device 500, to request the power amplifier device 500 to return the current mute state to the display apparatus 200 after adjusting the audio state. Furthermore, the display apparatus 200 can display according to the current mute state provided by the power amplifier device 500, which is convenient for the user to view and understand the current audio state of the power amplifier device 500.

In the above case where the user adjusts the audio state of the power amplifier device 500 through the mute key on the control device 100, the processor 250 of the display apparatus 200 may also be configured to: firstly parse a key command to determine that the power amplifier device 500 needs to be adjusted to the mute state, wherein the key command is input by pressing the mute key of the control device 100, and then send a volume request and a volume adjusting instruction for adjusting the volume to the power amplifier device 500, where the volume adjusting instruction is used to adjust the current audio state of the power amplifier device 500 to the mute state.

Figure 34:
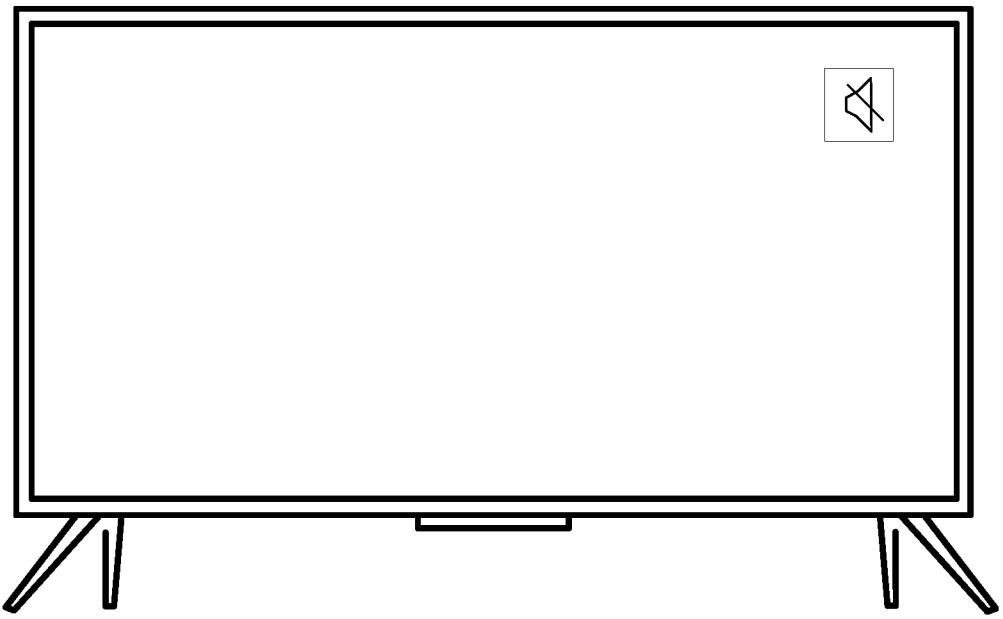
FIG. 34 shows a second schematic diagram of a user interface on the display apparatus 200 according to some embodiments.

FIG. 34 shows a second schematic diagram of a user interface of the display apparatus 200 according to some embodiments.

In some embodiments, in order to facilitate the user to view the adjusted audio state of the power amplifier device 500, the display apparatus 200 needs to display a mute identifier on the user interface after receiving the mute state returned from the power amplifier device 500. As shown in FIG. 34, the mute state can be displayed on the user interface in the form of a mute sign.

In the above process of displaying the mute state, the processor 250 of the display apparatus 200 may also be configured to: firstly receive the adjusted mute state returned from the power amplifier device 500, and then display the mute state on the user interface of the display apparatus 200 in the form of a mute identifier.

Furthermore, when the user uses the volume key on the control device 100 to control the volume of the power amplifier device 500, if the volume "−" key is pressed in such a way that the volume of the power amplifier device 500 is reduced to zero, then the display apparatus 200 can directly display the mute identifier as shown in FIG. 34 on the user interface after receiving the current target volume of the power amplifier device 500.

In an embodiment of the disclosure, no matter whether the power amplifier device 500 has been configured to actively report the audio state to the display apparatus 200, the display apparatus 200 can send an audio state adjusting instruction and an instruction for requesting audio state to the power amplifier device 500 after the power amplifier device 500 is connected with the display apparatus 200 through ARC and the user controls the audio state of the power amplifier device 500 through the control device 100, where the audio state adjusting instruction is used to control the power amplifier device 500 to adjust the current audio state to the target audio state; and the instruction for requesting audio state is used to request the power amplifier device 500 to actively send the adjusted target audio state back to the display apparatus 200. In this way, the display apparatus 200 can display the current target audio state of the power amplifier device 500 for the user. It can be seen that the display apparatus 200 in the embodiment of the disclosure can further control the power amplifier device 500 to actively report the audio state according to the user's command, so as to avoid the problem that some power amplifier devices 500 will not actively report the audio states to affect the user experience.

Figure 35:
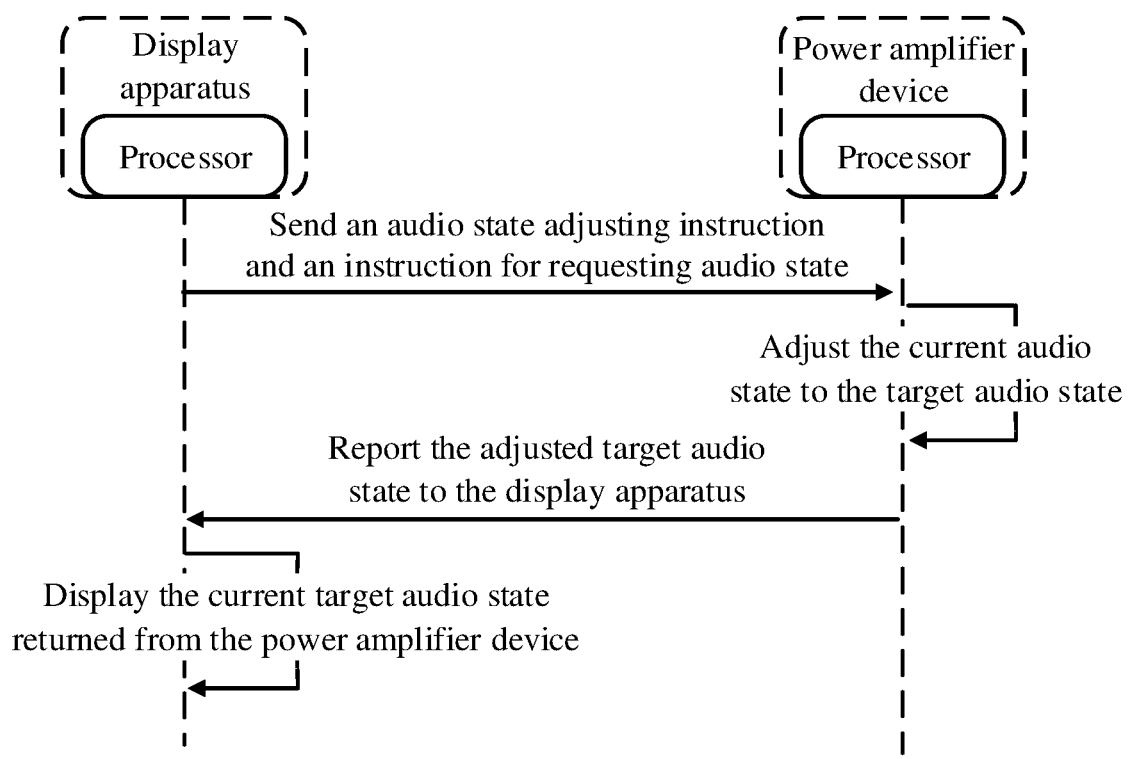
FIG. 35 shows a processing flow of the power amplifier device 500 according to some embodiments.

FIG. 35 shows a schematic diagram of a processing flow of the power amplifier device 500 according to some embodiments.

In view of the above issue, some power amplifier devices 500 cannot actively report the audio states to the display apparatus 200, the power amplifier device 500 in the embodiments of the disclosure, as shown in FIG. 35, can also adjust the current audio state to the target audio state according to the audio state adjusting instruction sent from the display apparatus 200. Moreover, the power amplifier device 500 may also report the adjusted target audio state to the display apparatus 200 according to the instruction for requesting audio state sent from the display apparatus 200.

For example, the audio state adjusting instruction sent from the display apparatus 200 to the power amplifier device 500 indicates that the volume of the power amplifier device 500 needs to be increased to the target volume 50. Then the power amplifier device 500 adjusts the current volume 20 to the target volume 50, and then reports the target volume 50 to the display apparatus 200.

Alternatively, the audio state adjusting instruction sent from the display apparatus 200 to the power amplifier device 500 indicates that the volume of the power amplifier device 500 needs to be decreased to the target volume 10. Then the power amplifier device 200 adjusts the current volume 40 to the target volume 10, and then reports the target volume 10 to the display apparatus 200.

In the above-mentioned process in which the power amplifier device 500 adjusts the audio state and reports the audio state, the processor of the power amplifier device 500 may be configured to: receive an instruction for requesting audio state sent from the display apparatus 200 and an audio state adjusting instruction for adjusting the audio state, adjust the current audio state to the target audio state according to the audio state adjusting instruction, and send the target audio state back to the display apparatus 200 in response to the instruction for requesting audio state.

As described above, the display apparatus 200 may send an audio state adjusting instruction for adjusting the volume to the power amplifier device 500, and may also send an audio state adjusting instruction for adjusting the mute state to the power amplifier device 500.

In the case that the audio state adjusting instruction is used to control the volume of the power amplifier device 500, the processor of the power amplifier device 500 may also be configured to: adjust the current volume of the power amplifier device 500 to the target volume in response to the audio state adjusting instruction, and send the adjusted target volume back to the display apparatus 200 according to the instruction for requesting audio state.

And, in the case that the audio state adjusting instruction is used to control the power amplifier device 500 to mute, the processor of the power amplifier device 500 may also be configured to: adjust the current audio state of the power amplifier device 500 to the mute state in response to the audio state adjusting instruction, and send the adjusted mute state back to the display apparatus 200 according to the instruction for requesting audio state.

In an embodiment of the disclosure, the power amplifier device 500 and the display apparatus 200 are connected via ARC. After the connection, no matter whether the power amplifier device 500 can actively report its own audio state to the display apparatus 200, the display apparatus 200 will send an instruction for requesting audio state to the power amplifier device 500, so that the power amplifier device 500 will return the adjusted target audio state to the display apparatus 200, thereby avoiding the problem that some power amplifier devices 500 will not actively report the audio states.

In an embodiment of the disclosure, the communication process between the display apparatus 200 and the power amplifier device 500 is implemented based on a CEC (Consumer Electronics Control) instruction. That is, the display apparatus 200 can control the behavior (such as volume adjustment, mute, power on from standby, etc.) of the power amplifier device 500 by sending a CEC instruction, and the power amplifier device 500 can also report its own audio state to the display apparatus 200 by sending a CEC instruction.

When the display apparatus 200 communicates with the power amplifier device 500 based on the CEC instruction, the process of sending instructions from the display apparatus to the power amplifier device 500 is as follows.

Firstly, after the user presses a key on the control device 100, the display apparatus 200 sends an instruction for indicating that the user presses the key, such as 0x44 instruction, to the power amplifier device 500. This instruction carries a parameter, such as 0x41, 0x42, 0x43, etc. where the 0x44 instruction is used to indicate that the user presses a key on the control device 100; the parameter 0x41 indicates the volume "+" key, the parameter 0x42 indicates the volume "−" key, and the parameter 0x43 indicates the mute key.

Then, after the user releases the key on the control device 100, the display apparatus 200 sends an instruction that the user releases the key, such as 0x45 instruction, and an instruction for requesting audio state, such as 0x71 instruction, to the power amplifier device 500, where the 0x45 instruction indicates that the user releases the key on the control device 100; and the 0x71 instruction indicates that the display apparatus 200 requests the power amplifier device 500 to report the audio state such as volume value or mute state.

Finally, the power amplifier device 500 sends the audio state to the display apparatus 200, for example, the audio state is indicated by the 0x7A instruction, which carries a parameter, where the highest bit (bit7) indicates the mute state of the power amplifier device 500, and bit0-bit6 indicate the volume value of the power amplifier device 500, and the volume value is a UI value between 0 and 100 to which the power amplifier device 500 maps the audio signal gain. The display apparatus 200 displays the UI value on the user interface after receiving it.

Figure 36:
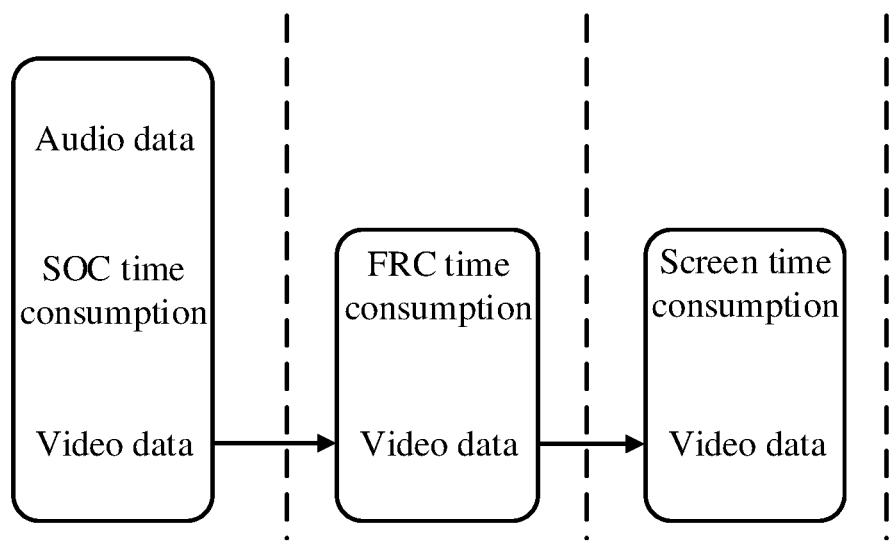
FIG. 36 shows a schematic diagram of processing the video data and audio data in the display apparatus 200 according to some embodiments.

The audio data and video data of a movie source in the display apparatus 200 can only be played on the display apparatus 200 after going through respective processing flows. However, as shown in FIG. 36, when the video data is processed, there are three stages of time consumption, namely SoC (System on Chip) time consumption, FRC (Frame Rate Conversion) time consumption and screen time consumption; and when the audio data is processed, there is a stage of SoC time consumption. Furthermore, the resolutions of video data from various video sources are different, which will also affect the time consumption in processing the video data.

It can be seen that the overall processing flow of the video data takes longer than the processing flow of the audio data. Then, in the display apparatus 200, it usually occurs that: after the audio data is processed and starts to play, the video data has not completed processed; or, after the video data is processed, the audio data has been played for a period of time. These situations will cause the problem of asynchronous sound, for example, audio is heard without visuals or audio doesn't match up with visuals, when the movie source is played.

Figure 37:
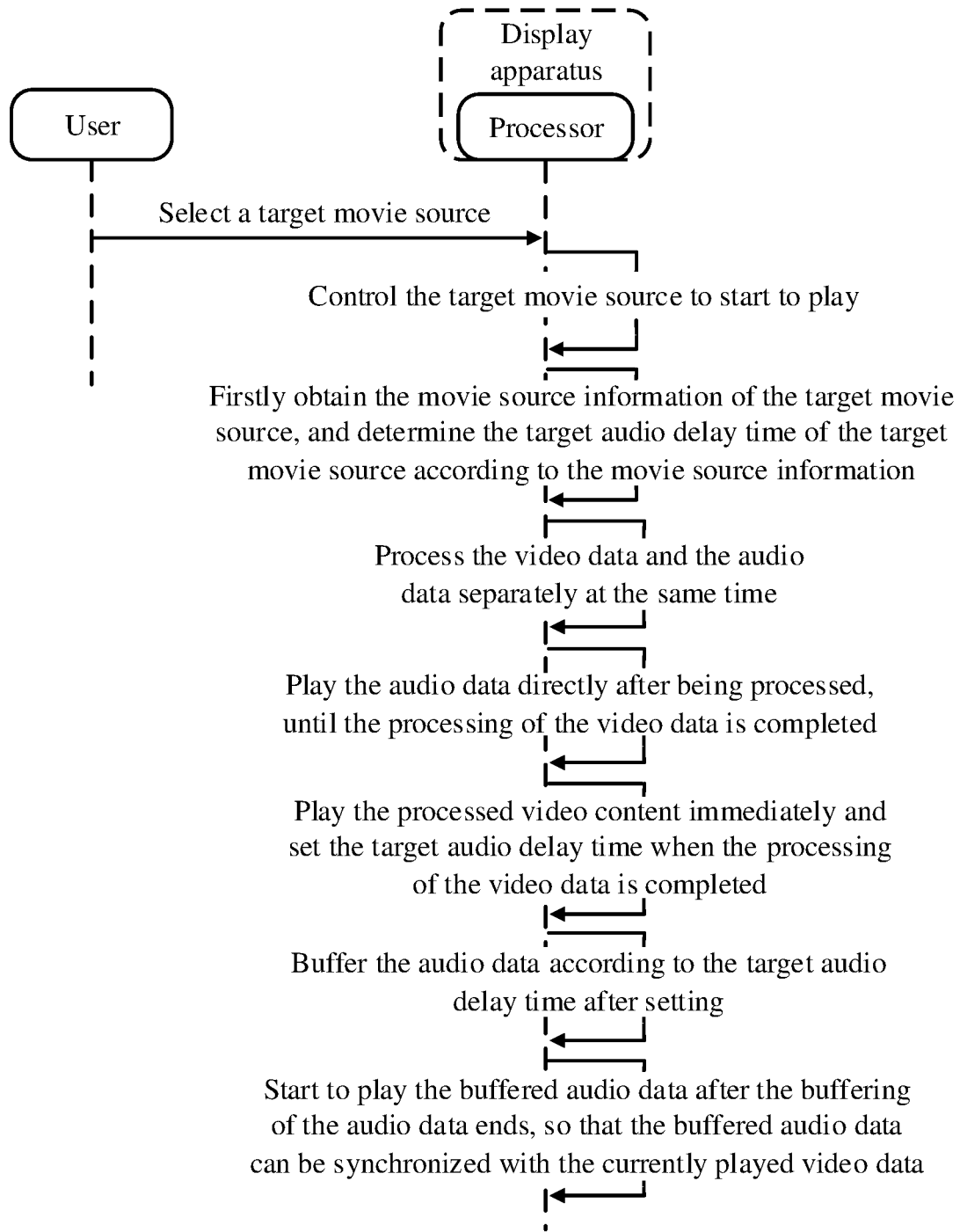
FIG. 37 shows a first schematic flowchart of implementing sound and picture synchronization on the display apparatus according to some embodiments.

In view of asynchronous sound issue, an embodiment of the disclosure provides a display apparatus 200. As shown in FIG. 37, after the user selects a target movie source on the display apparatus 200, and when the target movie source starts to play, the display apparatus 200 firstly obtains the movie source information of the target movie source, and determines the target audio delay time of the target movie source according to the movie source information. Then, the video data and the audio data are processed separately at the same time. Since the processing speed of the audio data is fast, the audio data can be played directly after being processed. During this process until the processing of the video data is completed, in order to avoid the situation that audio is heard without visuals on the display apparatus 200, the volume of the played audio data must be zero, that is, in the mute state.

As shown in FIG. 37, after the processing of the video data is completed, the display apparatus 200 will play the processed video content immediately and set the target audio delay time at the same time. After setting, the audio data is buffered according to the target audio delay time. Before buffering the audio data, the display apparatus 200 has played the audio data for a period of time. Therefore, when buffering the audio data, the buffering does not start from the beginning of the audio track of the target movie source, but from the position of the audio track where the playback of the audio data is interrupted by the start of buffering.

As shown in FIG. 37, after the buffering of the audio data ends, the display apparatus 200 starts to play the buffered audio data. Since the audio data has been played for a period of time during the processing of the video data, and the video data has also been played for a period of time during the buffering process of the audio data, it is only necessary to set the two periods of time to be identical. After the buffering of the audio data ends, the display apparatus 200 plays the video data and audio data simultaneously to achieve synchronous sound.

In an embodiment of the disclosure, the audio data playing time during the processing of the video data is the target audio delay time, so the two identical periods of time described above can be set as the target audio delay time.

In the above-mentioned process of keeping the sound and picture synchronization of the movie source, the processor 250 of the display apparatus 200 may be configured to: firstly determine the target audio delay time of the target movie source according to the movie source information of the target movie source when the target movie source starts to play; then process the video data and the audio data simultaneously, and play the audio data during the processing of the video data after completing the audio data processing; then control the video data to play after the processing of the video data ends, set the target audio delay time after the video data starts to play, and after setting the target audio delay time, start buffering the audio data beginning from the interruption of the audio data, where the duration of the buffering is the duration of the target audio delay time; and finally play the buffered audio data when the audio data has been buffered, so that the buffered audio data can be synchronized with the currently played video data.

Figure 38:
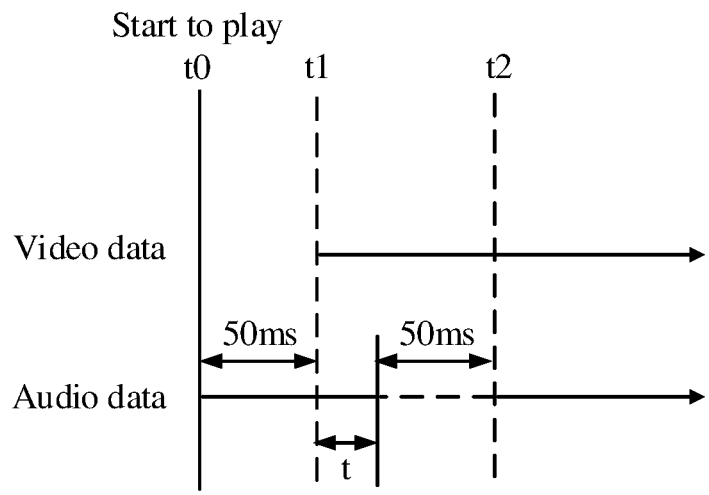
FIG. 38 shows a first schematic diagram for implementing synchronization of sound and picture according to some embodiments.

FIG. 38 is a first schematic diagram of a sound and picture synchronization process according to some embodiments. As shown in FIG. 38, the display apparatus 200 obtains a target audio delay time of 50 ms after the target movie source starts to play, that is, the audio data processing is 50 ms faster than the video data processing. As shown in FIG. 38, the processing of the audio data takes a short time (negligible here) after the movie source starts to play at moment t0, and the audio data can be output first. The video starts playing when the audio is played for 50 ms. In order to avoid the problem that audio is heard without visuals, the display apparatus 200 will not make sound. At moment t1, that is, after the end of 50 ms, the video data is played, and the display apparatus 200 starts to reset the target audio delay time of the current target movie source to 50 ms. The overall time of the setting process is t. At the end of the time t, the setting of the target audio delay time of the current target movie source is completed, and the audio buffer data starts to be accumulated until the target audio delay time ends, that is, 50 ms from the end of the time t. The accumulation process is shown by the dotted line in FIG. 38. The buffering of the audio data is completed until the time t2, and at this time, the audio data and the video data start to play synchronously and normally.

In FIG. 38, the playback of audio data is interrupted when the time t ends, and then the unplayed audio data is buffered for 50 ms. It can be seen from FIG. 38 that the audio data is played for 50 ms during which the video data is processed, and then the video data is played for 50 ms during which the audio data is buffered. Then, from the moment t2, the video data and audio data are both played from (50+t) ms, to thereby realize the sound and picture synchronization.

However, as shown in FIG. 38, in the above embodiments of realizing the sound and picture synchronization, the display apparatus 200 can realize the sound and picture synchronization from the time t2, and there is still the problem that the sound and picture are out of sync before the time t2.

Moreover, the display apparatus 200 outputs the audio data and sound within the time t for setting the target audio delay time, but outputs no audio data within 50 ms for buffering the audio data, and then outputs the audio data again from the end of 50 ms for buffering. There will be an obvious sound interruption in the whole process, which will also affect the user experience.

Figure 39:
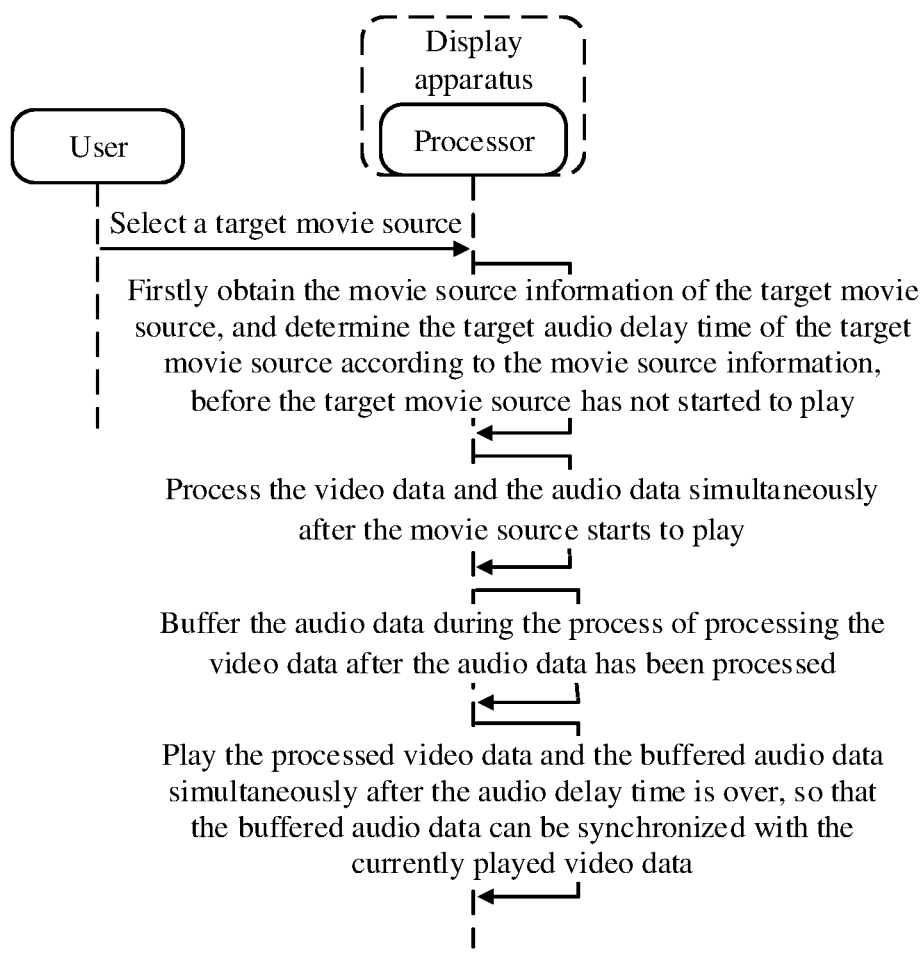
FIG. 39 shows a second schematic flowchart for implementing synchronization of sound and picture in the display apparatus 200 according to some embodiments.

In order to solve sound interruption during the process of realizing the sound and picture synchronization, an embodiment of the disclosure provides another display apparatus 200. As shown in FIG. 39, after the user selects a target movie source and before the target movie source has not started to play, the display apparatus 200 firstly obtains the movie source information of the target movie source, and determines the target audio delay time of the target movie source according to the movie source information. Then, the display apparatus 200 processes the video data and the audio data at the same time after the movie source starts to play. Since the processing speed of the audio data is relatively fast, the display apparatus 200 buffers the audio data during the process of processing the video data after the audio data has been processed. Finally, after the video data processing has been finished, that is, after the audio delay time is over, the display apparatus 200 plays the processed video data and the buffered audio data simultaneously, thereby ensuring that the video data and audio data are played synchronously.

Meanwhile, the display apparatus 200 can also set the target audio delay time before the movie source starts to play, so that the display apparatus 200 can directly process the audio data and video data after the movie source starts to play, and the processing of the audio data will not be interrupted. In this way, the display apparatus 200 can ensure the sound and picture synchronization of the movie source without sound interruption.

In the above-mentioned process of keeping the sound and picture synchronization of the movie source without sound interruption, the processor 250 of the display apparatus 200 may be configured to: firstly determine the target audio delay time of the target movie source according to the movie source information of the target movie source when the target movie source starts to play; and then process the video data and the audio data simultaneously, and buffer the audio data within the target audio delay time, so that the buffered audio data and the processed video data can be played synchronously after the target audio delay time ends.

Figure 40:
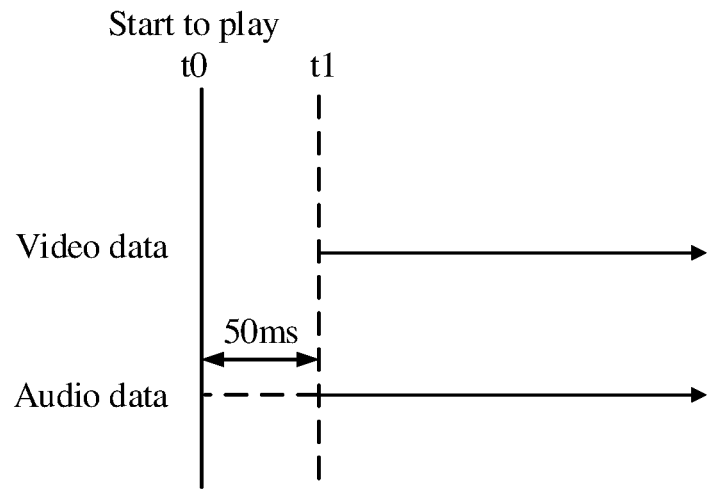
FIG. 40 shows a second schematic diagram for implementing synchronization of sound and picture according to some embodiments.

FIG. 40 shows a second schematic diagram of a sound and picture synchronization process according to some embodiments. As shown in FIG. 40, when the user browses movie sources on the display apparatus 200 but does not select a certain movie source, the display apparatus 200 can obtain the movie source information of the target movie source according to the target movie source browsed by the user, and determine the target audio delay time of the target movie source to be 50 ms according to the movie source information. Then, at moment t0 when the target movie source starts to play, the video data and audio data start to be processed at the same time. Since the processing speed of the audio data is relatively fast, it can be ignored in FIG. 40. After the processing is completed, the audio data starts to be buffered for 50 ms. After the moment t1 at the end of 50 ms of the buffering, the processed video data starts to play, and at the same time, the buffered audio data also starts to play.

As shown in FIG. 40, the processes of processing and playing the video data are both complete, and the processes of processing, buffering and playing the audio data are also complete. The audio data starts to be buffered directly after being processed, and is also played directly from the beginning of audio track. Therefore, from the moment t1, the audio data and the video data can be played synchronously from the beginning of the tracks; and from the moment t1 when they are played synchronously, the audio data will not be interrupted.

The browsing process described in the above embodiments of the disclosure can be understood as a process in which the user browses the thumbnail of movie sources without actually selecting a movie source for playing. For example, the user controls the focus on the display apparatus 200 to land on the thumbnail of each movie source to browse the general image content of the movie source, but does not input a confirmation command to control the display apparatus 200 to simultaneously play the sound content and dynamic video content of the movie source.

The operation of starting to play a movie source in the above embodiments of the disclosure may refer to an operation of the user to control a movie source to play after inputting a selection command or confirmation command when browsing to the movie source.

In some embodiments, in order to facilitate the display apparatus 200 to obtain the movie source information before the target movie source starts to played, the display apparatus 200 may also display all movie sources available for play on the display page in the form of respective thumbnails. In this way, the user can briefly browse the thumbnails of the movie sources on the display page. When browsing, the user can control the focus to move and land on the thumbnail of the movie source by controlling the direction keys on the control device 100 such as a remote control. When the specific movie source content corresponding to a movie source thumbnail is wanted, the user inputs a confirmation command to the display apparatus 200 by pressing a confirmation key on the control device 100 such as a remote control. Then, the display apparatus 200 will start to play the selected target movie source.

Figure 41:
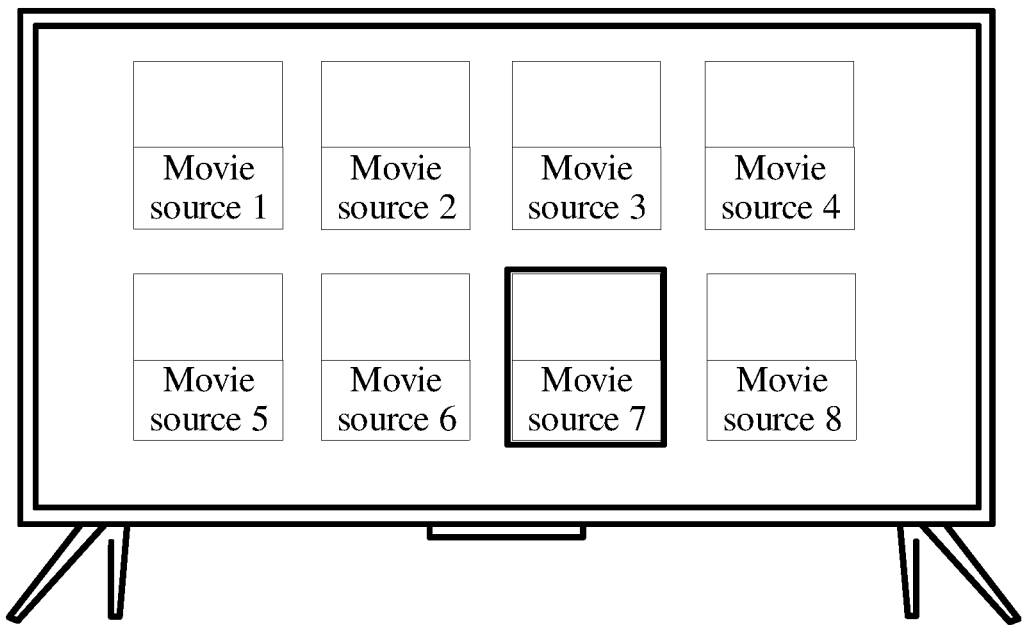
FIG. 41 shows a first schematic diagram of a display interface on the display apparatus 200 according to some embodiments.

FIG. 41 shows a first schematic diagram of a display interface on the display apparatus 200 according to some embodiments. As shown in FIG. 41, several movie source thumbnails may be shown on the display page. When the user places the focus on the third movie source thumbnail in the second row (that is, movie source 7) to browse the content of this movie source, the display apparatus 200 can pre-acquire the movie source information of this movie source and the target delay time corresponding to the movie source information, and then set the target delay time. If the user wants to watch the detail content of this movie source, he can input a confirmation command to the display apparatus 200 to start to play this movie source.

During the above process of displaying the movie source thumbnail, the processor 250 of the display apparatus 200 may also be configured to: extract the first frame images of all the movie sources in the display apparatus 200; display the first frame images of all the movie sources sequentially on the display interface of the display apparatus 200 in the form of movie source thumbnails, where each movie source thumbnail corresponds to one movie source; and detect the position of the focus on the display page, and obtain the resolution information and signal source information of the thumbnail of the target movie source as the movie source information of the target movie source when the focus lands on the thumbnail of a target movie source.

Typically, each frame of an image in a movie source has the same resolution. Therefore, the display apparatus 200 only needs to extract the first frame image of the target movie source, and can determine the resolution of the target movie source according to the resolution of the first frame image.

Since the video data processing time is related to the image processing flow and image resolution, the audio delay time corresponding to different resolutions is also different. The audio delay time determines the amount of the audio data that needs to be buffered. Therefore, when the movie sources with different resolutions are played, it is necessary to obtain the corresponding audio delay time. In some embodiments, not only the resolution of the movie source image will affect the processing time of the video data, but also the source of the movie source, i.e., the signal source information of the movie source, will also affect the processing time of the video data, thereby affecting the audio delay time. In the display apparatus 200, the sources and resolutions of the movie sources may be different, so the signal source of the movie source and the resolution of the movie source may be used together as the movie source information.

Figure 42:
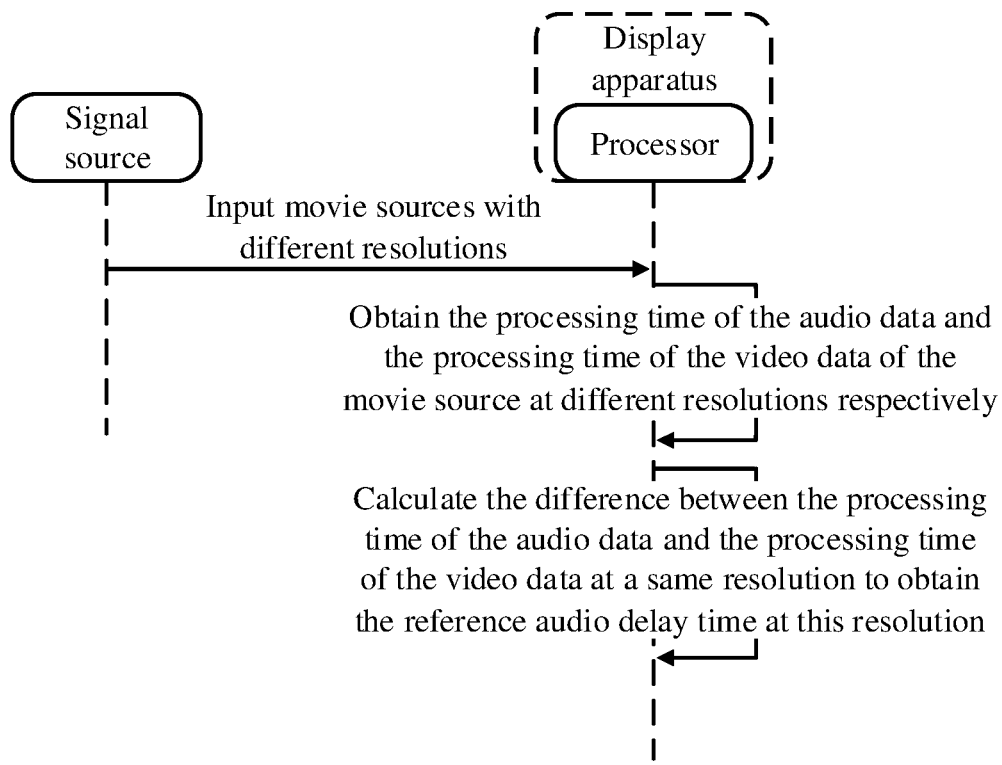
FIG. 42 shows a third schematic flowchart for implementing synchronization of sound and picture in the display apparatus according to some embodiments.

In order to accurately obtain the target audio delay time of the target movie source, as shown in FIG. 42, the reference audio delay times of movie sources provided by different signal sources at different resolutions may also be pre-configured in the display apparatus 200. Then, the display apparatus 200 may respectively determine the corresponding reference audio delay time as the target audio delay time according to the signal source information and the resolution information in the movie source information.

In the display apparatus 200, the signal sources may include ATV (Analog TV), DTV (Digital TV), HDMI (High Definition Multimedia Interface), DMP (Data Management Platform), etc.

In the process of configuring the reference audio delay time, different signal sources respectively provide movie sources with different resolutions, such as 480P, 480I, 576P, 576I, 720P, 720I, 1080P, 1080I, 2160P, etc. When a movie source is played at a resolution, the audio data processing time and the video data processing time of the movie source are respectively obtained, and then the difference between them is calculated to obtain the reference audio delay time of the movie source at this resolution.

The obtained reference audio delay time can be correspondingly stored in the following data table I.

TABLE I

|  | 480P | 480I | 576P | 576I | 720P | 720I | 1080P | 1080I | 2160P |
|---|---|---|---|---|---|---|---|---|---|
| ATV |  |  |  |  |  |  |  |  |  |
| DTV |  |  |  |  |  |  |  |  |  |
| HDMI |  |  |  |  |  |  |  |  |  |
| DMP |  |  |  |  |  |  |  |  |  |
| . . . |  |  |  |  |  |  |  |  |  |

In the above table, the first column on the left represents the information of each signal source, and the first row at the top represents the information of each resolution. After determining the movie source information of the target movie source, the display apparatus 200 may firstly determine the line where the target signal source is located in the above table according to the signal source information, and then determine the reference audio delay time corresponding to the target resolution in the line where the target signal source is located according to the resolution information, where this reference audio delay time is the final determined target audio delay time of the target movie source.

In the above-mentioned process of determining the target audio delay time, the processor 250 of the display apparatus 200 may be configured to: firstly obtain the reference audio delay times of movie sources provided by different signal sources at different resolutions respectively, and then determine the target audio delay time among all the reference audio delay times by using the movie source information of a target movie source.

It can be seen from the above that, in the embodiments of the disclosure, the display apparatus 200 can firstly determine the target movie source selected by the user, then obtain the movie source information of the target movie source, and then obtain the target audio delay time corresponding to the target movie source according to the movie source information. The display apparatus 200 starts to process the video data and audio data of the target movie source at the same time, and the target audio delay time indicates the time for continuing to process the video data after the audio data completes processing. Also, the display apparatus 200 buffers the audio data within the target audio delay time while processing the video data. When the target audio delay time ends, it means that the video data processing is completed. At this time, the display apparatus 200 plays the buffered audio data and the processed video data simultaneously, thereby ensuring that the sound and picture of the target movie source can be kept consistent, and avoiding the problem that the sound and picture are out of sync.

Figure 43:
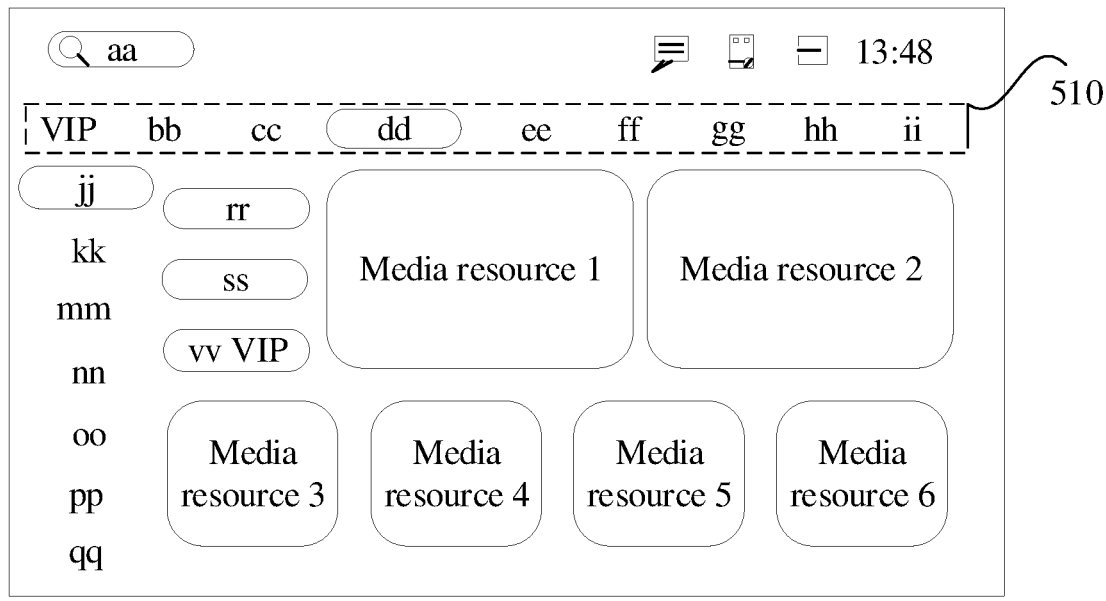
FIG. 43 shows a display diagram of an icon control interface in the display apparatus 200 according to some embodiments.

FIG. 43 shows a display diagram of an icon control interface of an application in the display apparatus 200 according to some embodiments. In some embodiments, the display apparatus can directly enter an interface of a preset video-on-demand application after startup. The interface of the preset video-on-demand application may, as shown in FIG. 43, include a navigation bar 510 and a content display area below the navigation bar 510, where the content displayed in the content display area will change with the selected control in the navigation bar. The application in the application layer may be integrated in the video-on-demand application to be presented through a control in the navigation bar, or may be further displayed after the application control in the navigation bar is selected.

In some embodiments, the display apparatus can directly enter the display interface of the signal source selected a previous time or the signal source selection interface after startup, where the signal source may be a preset video-on-demand application or may be at least one of an HDMI interface, a live TV interface, etc. After the user selects different signal sources, the display can display the content obtained from the different signal sources.

In some embodiments, the display apparatus can be used as a smart terminal device, and can also be used as a smart TV. When the display apparatus is connected with network, the display apparatus is used as a smart terminal device, and different applications are configured in the device to provide the user with the function of playing media resources such as movies, TV drama, music or games. When the display apparatus is connected with the set-top box (HDMI signal), the display apparatus is used as a smart TV to provide the user with the function of TV programs playing.

In order to improve the user's listening experience, when the media resource is played, different sound effects can usually be configured for the media resource. For example, when the music is played, the digital sound effects that can be added include classical music mode, normal mode, rock music mode, jazz mode, etc.

For another example, when a movie or a TV drama is played, the ambient sound effect can be added. The ambient sound effect is mainly to make the listener feel as if he/she is in different environments through environmental filtering, environmental displacement, environmental reflection, environmental transition and other processing on the sound. The ambient sound effects include hall, opera house, theater, cave, stadium and other sound effects.

The sound effects configured for the media resources may also be common sound effects adjusted through an equalizer, such as sound effects in different frequency bands.

The above-mentioned sound effects that can be configured to be synchronously output on the media resources are relatively common sound effects, and the improvement of the user's listening experience by the above-mentioned sound effects is only at the common level. Moreover, the above-mentioned sound effects all need to be manually selected and started by the user to realize the output of the sound effects, and the start of the sound effects is not efficient.

Therefore, in order to enhance the listening experience from multiple levels, the embodiments of the disclosure may configure specific sound effects such as Dolby Audio or Dolby Atmos for media resources. Also, in order to improve the start efficiency of sound effect, an automatic recognition system of sound effect is provided, which can automatically analyze the media resource to play, determine the type of sound effect the media resource can support, and automatically turn on a corresponding sound effect switch, without the need for the user to manually select and start. The sound effect is started more efficiently.

An embodiment of the disclosure provides a display apparatus equipped with an automatic recognition system of sound effect, which is applicable to scenarios of playing media resources such as DMP, TV signal and HDMI signal.

In some embodiments, the automatic recognition system of sound effect includes a decoding module, a playing module, a system menu module, a Logo display module, etc. The decoding module is used to decode the media resource to determine whether the media resource supports a specific sound effect and which type of specific sound effect is supported. The playing module is used to realize the synchronous output of the media resource and corresponding specific sound effect. The system menu module is used to provide a specific sound effect switch, so as to automatically start the corresponding specific sound effect. The Logo display module is used to realize the display of the logo pattern of the specific sound effect.

In order to achieve the effect of automatically starting the sound effect, the automatic recognition system of sound effect can pre-register the sound effect global broadcast, for example, register the broadcast of "intent.action.dolby.atmos" corresponding to "Dolby Atmos" and the broadcast of "intent.action.dolby.audio" corresponding to "Dolby Audio" respectively in the playing module, system menu module and Logo display module in the whole apparatus, to monitor in real time whether there is a media resource that needs to play and the specific sound effect supported by the media resource, so as to automatically activate a corresponding specific sound effect switch.

Two specific sound effect switches in the system menu module correspond to the database in the whole display apparatus. The flag bit (key) of the database is: "key_advanced_dolby_atmos" and "key_advanced_dolby_audio", and the default value is 0. Meanwhile, the real-time monitoring of database change is added. If the database changes, which specific sound effect switch needs to be activated can be determined in real time according to the key value, and then the sound effect switch is turned on, to realize the effect of automatically starting the corresponding specific sound effect when playing the media resource.

Figure 44:
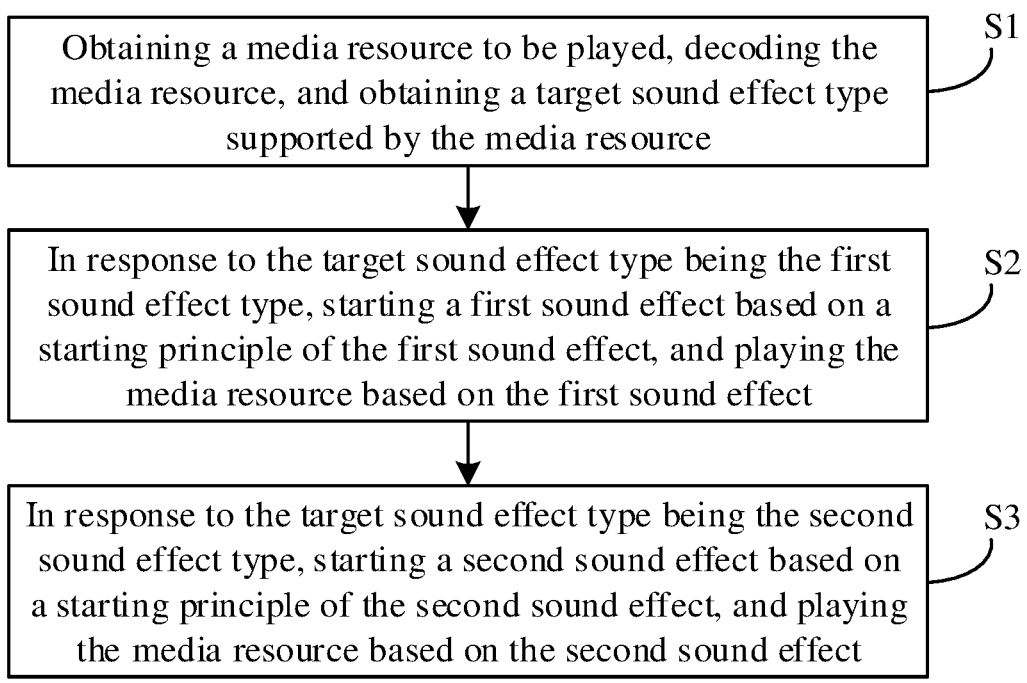
FIG. 44 shows a flowchart of a method for automatic recognition of sound effect according to some embodiments.
Figure 45:
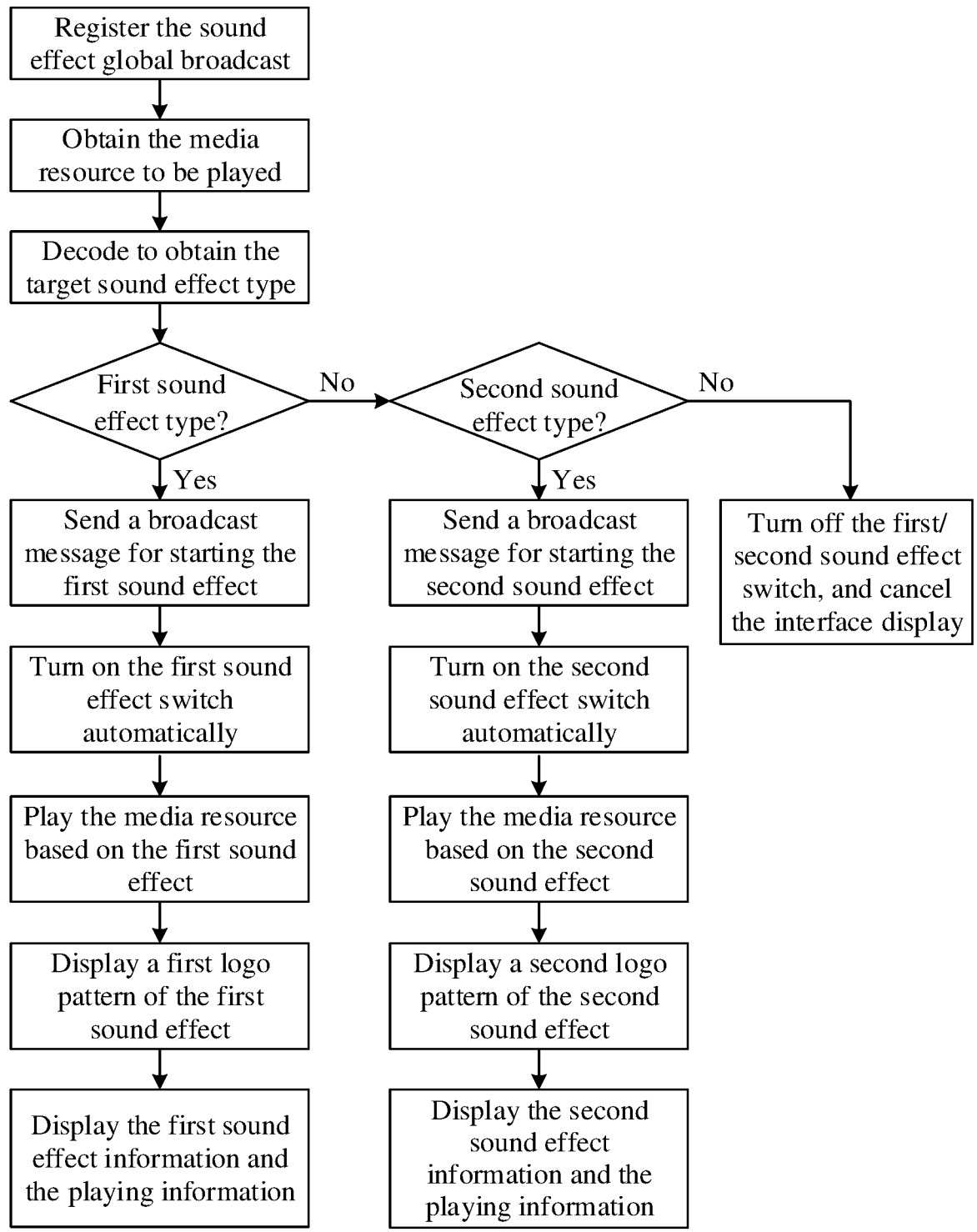
FIG. 45 shows a data flow diagram of a method for automatic recognition of sound effect according to some embodiments.

FIG. 44 shows a flowchart of a method for automatic recognition of sound effect according to some embodiments, and FIG. 45 shows a data flow diagram of a method for automatic recognition of sound effect according to some embodiments. Based on the automatic recognition system of sound effect provided above, an embodiment of the disclosure provides a display apparatus, including: a display configured to present a user interface; and a memory configured to store instructions and data associated with the display, a processor in connection with the display and the memory. When executing the method for automatic recognition of sound effect shown in FIG. 44 and FIG. 45, the processor is configured to execute the instructions to cause the display apparatus to perform the following steps.

S1: obtaining a media resource to be played, decoding the media resource, and obtaining a target sound effect type supported by the media resource.

When the display apparatus is started, the configured automatic recognition system of sound effect can be started at startup process, so as to be able to register the sound effect global broadcast in time, so that the system can monitor the media resource to be play in real time and start the corresponding specific sound effect in time when the display apparatus needs to be used to play the media resource.

When the display apparatus prepares a media resource that needs to be played, the decoding module is called to decode the media resource to obtain the target sound effect type of the media resource. For example, the sound effect type of the media resource is obtained by hard decoding in the chip driver layer.

The sound effect type may be the first sound effect type or the second sound effect type. In some embodiments, the first sound effect type is Dolby Atmos, and the second sound effect type is Dolby Audio.

Different media resources are configured with different sound effect types, that is to say, not every media resource supports the same sound effect type. Therefore, the sound effect type can be obtained through decoding to determine the specific sound effect supported by the media resource, and different types of sound effects correspond to different sound effect starting principles.

S2: in response to the target sound effect type being the first sound effect type, starting a first sound effect based on a starting principle of the first sound effect, and playing the media resource based on the first sound effect.

After analyzing the target sound effect type obtained through decoding, if the target sound effect type is the first sound effect type, it means that the current media resource to be played can support Dolby Atmos. Therefore, the system menu module can be called to automatically turn on the switch corresponding to the first sound effect type to start the first sound effect, and then the media resource can be played based on the first sound effect.

When the target sound effect type is the first sound effect type, the starting principle of the first sound effect is a starting principle related to Dolby Atmos.

In some embodiments, when starting the first sound effect based on the starting principle of the first sound effect, the processor is further configured to:

generate a broadcast message for starting the first sound effect in response to the target sound effect type being the first sound effect type;

turn on the first sound effect switch based on the broadcast message for starting the first sound effect, to start the first sound effect.

When the target sound effect type is the first sound effect type, the automatic recognition system of sound effect will send the broadcast message for starting the first sound effect, which may be in the form of global broadcast message of "intent.action.dolby.atmos".

In response to receiving the broadcast message for starting the first sound effect, the system menu module sets the flag bit "key_advanced_dolby_atmos" corresponding to the first sound effect in the database to 1.

Figure 46:
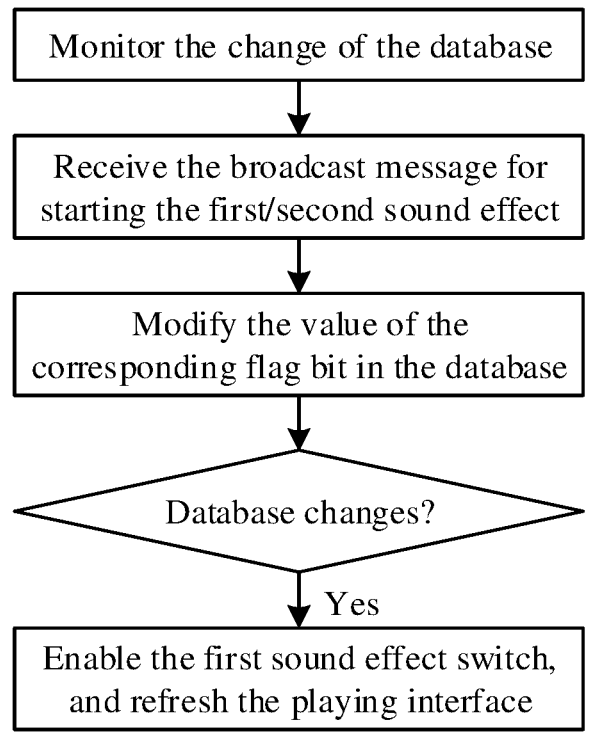
FIG. 46 shows a data flow diagram of activating a specific sound effect switch according to some embodiments.
Figure 47:
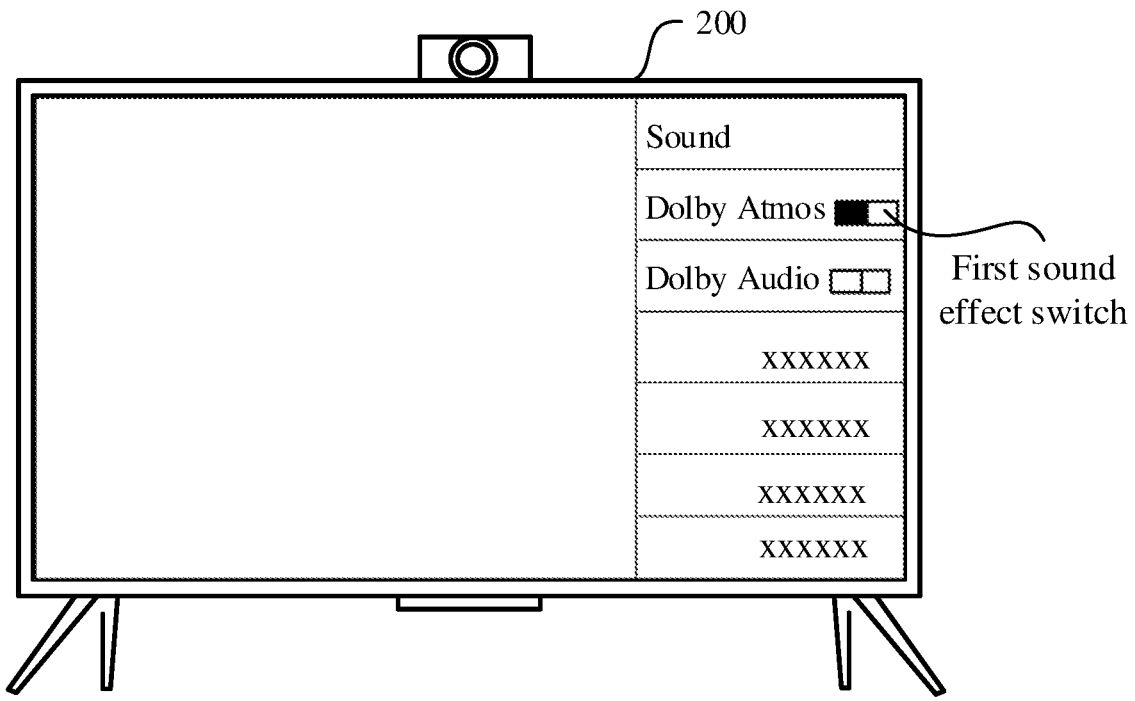
FIG. 47 shows a schematic diagram of a user interface with a first sound effect switch enabled according to some embodiments.

FIG. 46 shows a data flow diagram of activating a specific sound effect switch according to some embodiments. FIG. 47 shows an interface with the first sound effect switch enabled according to some embodiments. Referring to FIG. 46 and FIG. 47, when the flag bit in the database is changed from the default value 0 to 1, the system monitors the change of the database, and then calls the system menu module to activate the first sound effect switch to implement the start of the first sound effect. The first sound effect switch can be set in the system settings of the display apparatus.

After the first sound effect is started, the media resource can be played. In this case, while playing the media resource based on the first sound effect, the processor is further configured to perform: obtaining an audio stream of the media resource after starting the first sound effect; obtaining first audio information by superimposing the first sound effect and the audio stream, and playing the media resource based on the first audio information.

After the first sound effect is started, the sound effect can be output synchronously. In order to enable the media resource to present the first sound effect while being played, the first sound effect may be superimposed in the audio stream of the media resource to obtain the first sound effect information. Finally, the playing module is called to play the media resource based on the first audio information.

In some embodiments, when the media resource is played, the playing interface can be refreshed synchronously. In this case, the processor is further configured to perform the following steps: obtaining the playing content of the media resource and a first logo pattern of the first sound effect while playing the media resource; generating a media resource playing interface based on the playing content and the first logo pattern, and displaying the media resource playing interface on the user interface.

Figure 48:
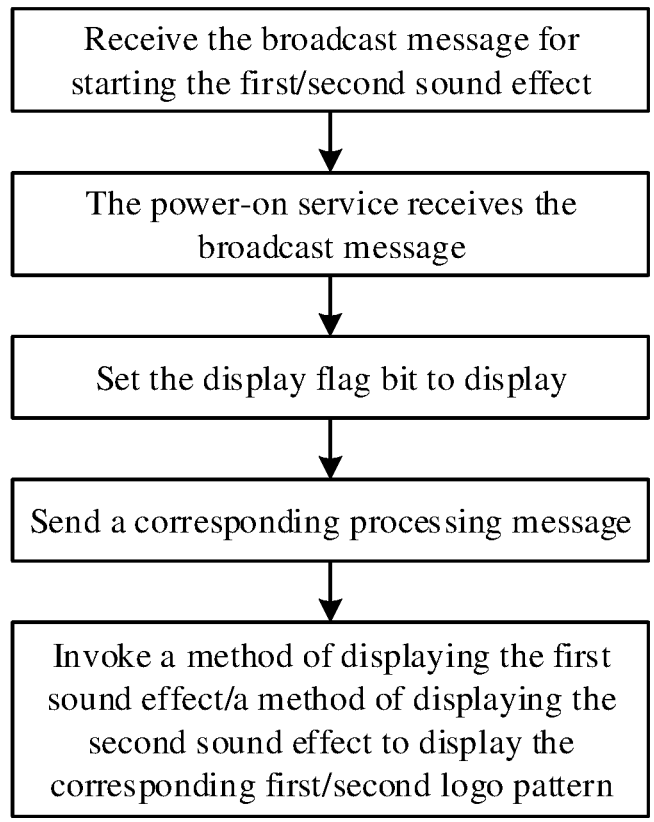
FIG. 48 shows a data flow diagram for illustrating a logo pattern of the specific sound effect according to some embodiments.

FIG. 48 shows a data flow diagram for presenting a logo pattern of the specific sound effect according to some embodiments. Referring to FIG. 48, while playing the media resource based on the first sound effect, the logo of the first sound effect can be synchronously displayed for the user, in order to prompt the user of the currently presented sound effect. In this scenario, the Logo display module is called to display the Logo. The Logo display module is a service that is started at startup process. When the display apparatus is powered on, the Logo display module (that is, startup service) can be started.

In response to receiving the broadcast message for starting the first sound effect, the Logo display module sets the display flag bit of the first sound effect (Dolby Atmos) to True to indicate that the Logo of the first sound effect currently needs to be displayed. The display flag bit defaults to False, indicating that the logo of the first sound effect is not currently displayed.

After setting the display flag bit of the first sound effect to True, the Logo display module sends a handler message to call the ShowDolbyAtmos method to obtain the first logo pattern (i.e., Logo) of the first sound effect. Meanwhile, the playing module is invoked to obtain the playing content of the currently played media resource, generate a media resource playing interface based on the playing content and the first logo pattern, and display the media resource playing interface on the user interface.

Figure 49:
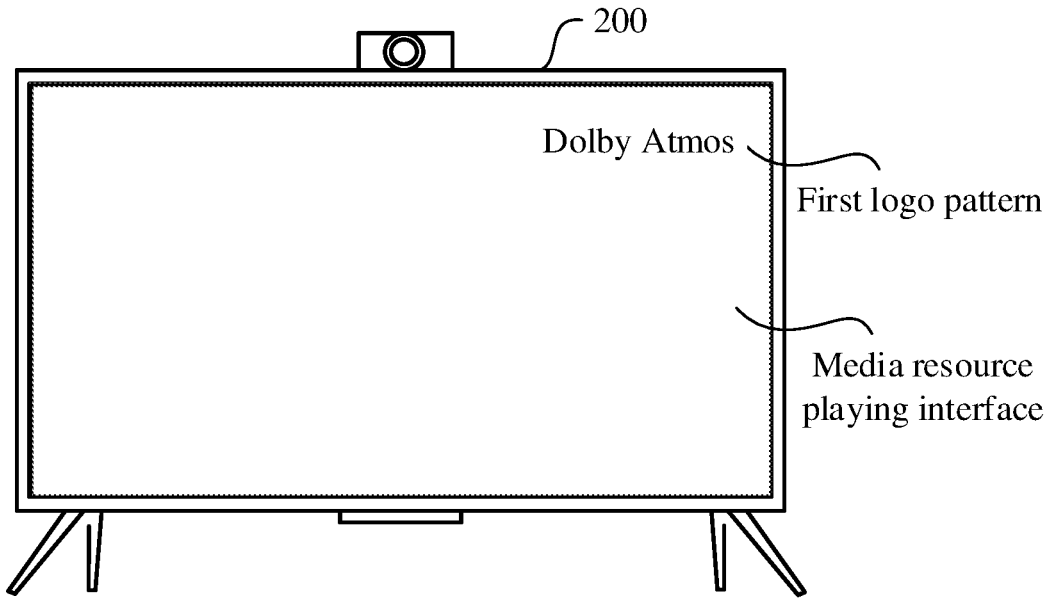
FIG. 49 shows a schematic diagram of a user interface presenting a logo pattern of the first sound effect according to some embodiments.

FIG. 49 shows an interface presenting a logo pattern of the first sound effect according to some embodiments. Referring to FIG. 49, the first logo pattern may be shown in the upper right corner of the interface for playing the content.

In some embodiments, in order to improve the visual effect of the user, the audio effect information and the playing information are usually hidden when the media resource is played, so as to ensure that the content of the media resource can be displayed in full screen in the display. In order to facilitate the user to know the relevant information of the currently played media resource in time, the relevant information can be called out and shown on the media resource playing interface by selecting a function key.

Therefore, in this scenario, the processor is further configured to execute the instructions to cause the display apparatus to perform: while displaying the media resource playing interface, in response to a menu calling instruction, obtaining the first sound effect information of the first sound effect and the playing information of the media resource, where the menu calling instruction is generated based on selection of a function key; generating a first menu interface based on the first sound effect information and the playing information, and displaying the first menu interface in the media resource playing interface.

While the media resource playing interface is displayed in the display apparatus, if the user wants to know the relevant information of the currently played media resource, he/she can select a function key on the remote control, for example, select the up key on the remote control, to generate the menu calling instruction.

In response to receiving the menu calling instruction, the playing module obtains the playing information of the media resource and the first sound effect information of the first sound effect, and the first menu interface is generated based on the first sound effect information and the playing information, and the first menu interface is displayed in the media resource playing interface.

Figure 50:
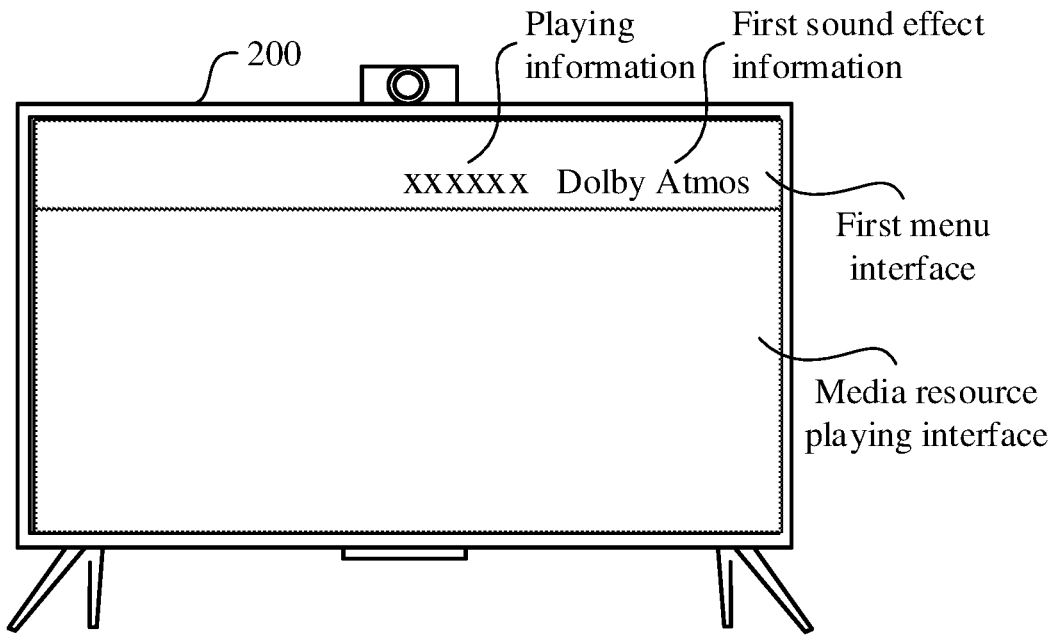
FIG. 50 shows a schematic diagram of a user interface presenting a first menu interface according to some embodiments.

FIG. 50 shows an interface presenting a first menu interface according to some embodiments. Referring to FIG. 50, the first menu interface is called by pressing the up key, and the first sound effect information (such as Dolby Atmos information) and the playing information (such as definition) are shown in the first menu interface.

In some embodiments, when the first menu interface is presented in the media resource playing interface, the first menu interface can be presented on the top of the media resource playing interface, and the display of the first logo pattern is canceled.

As can be seen, when it is determined that the sound effect type supported by the media resource to be played is the first sound effect type, the starting principle of the first sound effect can be activated, to generate the broadcast message for starting the first sound effect, and the first sound effect switch is automatically turned on, to implement the start of the first sound effect and play synchronously with the media resource. The display apparatus can not only provide the specific sound effect with higher auditory effect while playing the media resource, but also automatically start the corresponding specific sound effect, so that the sound effect is started more efficiently.

S3: in response to the target sound effect type being the second sound effect type, starting a second sound effect based on a starting principle of the second sound effect, and playing the media resource based on the second sound effect.

After analyzing the target sound effect type obtained through decoding, if the target sound effect type is the second sound effect type, it means that the current media resource to be played can support Dolby Audio. Therefore, the system menu module is called to automatically turn on the switch corresponding to the second sound effect type to start the second sound effect, and then the media resource can be played based on the second sound effect.

When the target sound effect type is the second sound effect type, the starting principle of the second sound effect is a starting principle related to Dolby Audio.

In some embodiments, when starting the second sound effect based on the starting principle of the second sound effect, the processor is further configured to execute instructions to cause the display apparatus to perform: generating a broadcast message for starting the second sound effect in response to the target sound effect type being the second sound effect type; turning on the second sound effect switch based on the broadcast message for starting the second sound effect, to start the second sound effect.

When the target sound effect type is the second sound effect type, the automatic recognition system of sound effect will send a broadcast message for starting the second sound effect, which may be in the form of global broadcast message of "intent.action.dolby.audio".

In response to receiving the starting broadcast message of the second sound effect, the system menu module sets the flag bit "key_advanced_dolby_audio" corresponding to the second sound effect in the database to 1.

Figure 51:
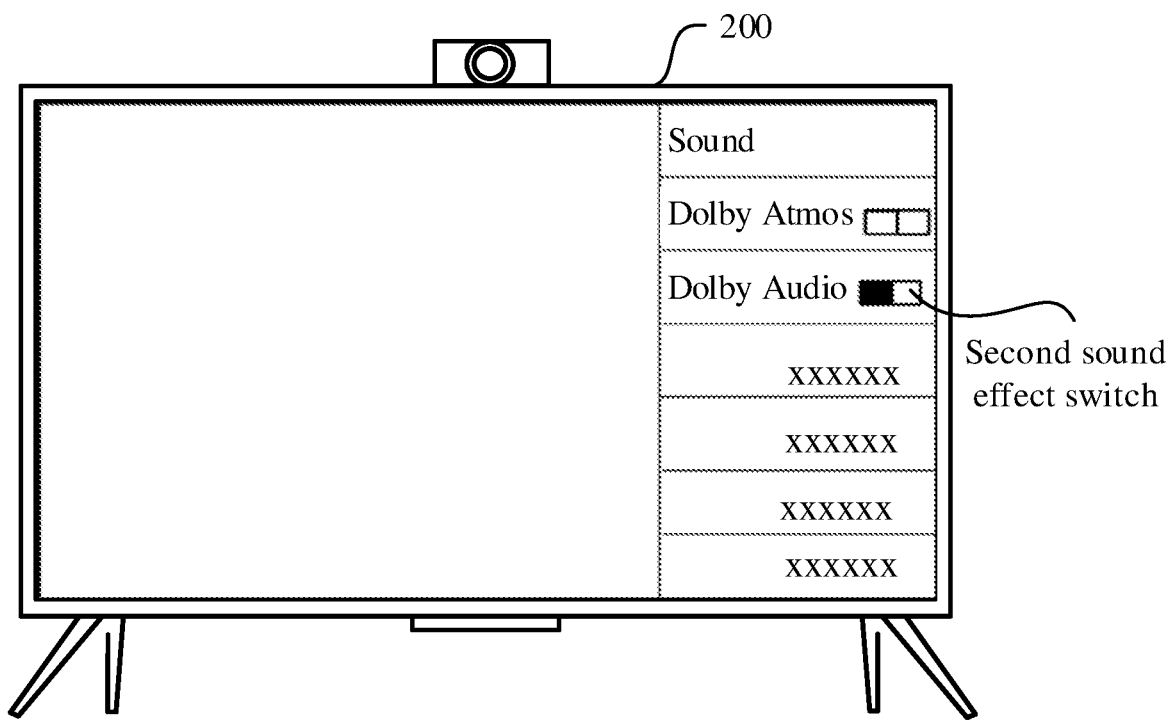
FIG. 51 shows a schematic diagram of a user interface with a second sound effect switch enabled according to some embodiments.

FIG. 51 shows an interface with the second sound effect switch enabled according to some embodiments. Referring to FIG. 46 and FIG. 51, when the flag bit in the database is changed from the default value 0 to 1, the system monitors the change of the database, and then calls the system menu module to activate the second sound effect switch to implement the start of the second sound effect. The second sound effect switch can be set in the system settings of the display apparatus.

After the second sound effect is started, the media resource can be played. In this case, while playing the media resource based on the second sound effect, the processor is further configured to execute the instructions to cause the display apparatus to perform: obtaining an audio stream of the media resource after starting the second sound effect; obtaining second audio information by superimposing the second sound effect and the audio stream, and playing the media resource based on the second audio information.

After the second sound effect is started, the sound effect can be output synchronously. In order to enable the media resource to present the second sound effect while being played, the second sound effect may be superimposed in the audio stream of the media resource to obtain the second sound effect information. Finally, the playing module is called to play the media resource based on the second audio information.

In some embodiments, when the media resource is played, the playing interface can be refreshed synchronously. In this case, the processor is further configured to execute the instructions to cause the display apparatus to perform: obtaining the playing content of the media resource and a second logo pattern of the second sound effect while playing the media resource;

generating a media resource playing interface based on the playing content and the second logo pattern, and displaying the media resource playing interface in the user interface.

Referring to FIG. 48 again, while playing the media resource based on the second sound effect, the logo of the second sound effect can be shown for the user, in order to prompt the user of the currently presented sound effect. In this scenario, the Logo display module is called to display the Logo. The Logo display module is a service that is started at the startup process. When the display apparatus is powered on, the Logo display module can be started.

In response to receiving the broadcast message for starting the second sound effect, the Logo display module sets the display flag bit of the second sound effect (Dolby Audio) to True to indicate that the Logo of the second sound effect currently needs to be displayed. The display flag bit defaults to False, indicating that the logo of the second sound effect is not currently displayed.

After setting the display flag bit of the second sound effect to True, the Logo display module sends a handler message to call the ShowDolbyAudio method to obtain the second logo pattern (i.e., Logo) of the second sound effect. Meanwhile, the playing module is invoked to obtain the playing content of the currently played media resource, generate a media resource playing interface based on the playing content and the second logo pattern, and display the media resource playing interface in the user interface.

Figure 52:
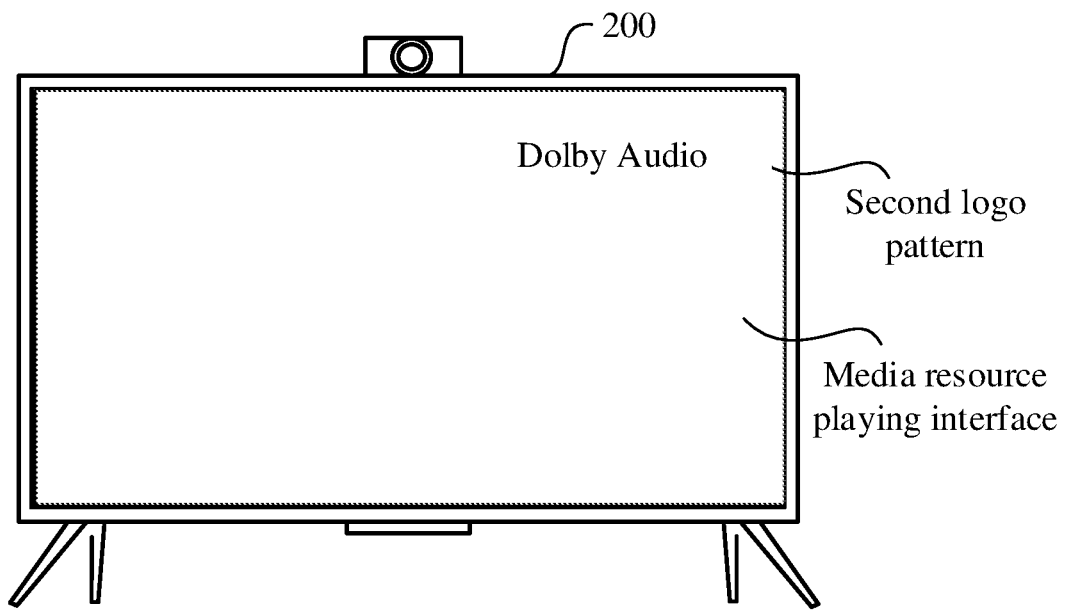
FIG. 52 shows a schematic diagram of a user interface presenting a logo pattern of the second sound effect according to some embodiments.

FIG. 52 shows an interface presenting a logo pattern of the second sound effect according to some embodiments. Referring to FIG. 52, the second logo pattern may be displayed in the upper right corner of the interface where the playing content is located in some embodiments.

In some embodiments, in order to improve the visual effect for the user, the audio effect information and the playing information are usually hidden when the media resource is played, so as to ensure that the content of the media resource can be displayed in full screen in the display. In order to facilitate the user to know the relevant information of the currently played media resource in time, the relevant information can be called out and displayed in the media resource playing interface by selecting a function key.

Therefore, in this scenario, the processor is further configured to execute the instructions to cause the display apparatus to perform: while displaying the media resource playing interface, in response to a menu calling instruction, obtaining the second sound effect information of the second sound effect and the playing information of the media resource, where the menu calling instruction is generated based on selection of a function key; generating a second menu interface based on the second sound effect information and the playing information, and displaying the second menu interface in the media resource playing interface.

When the media resource playing interface is displayed in the display apparatus, if the user wants to know the relevant information of the currently played media resource, he/she can select a function key on the remote control, for example, select the up key on the remote control, to generate the menu calling instruction.

In response to receiving the menu calling instruction, the playing module obtains the playing information of the media resource and the second sound effect information of the second sound effect, and the second menu interface is generated based on the second sound effect information and the playing information, and the second menu interface is displayed in the media resource playing interface.

Figure 53:
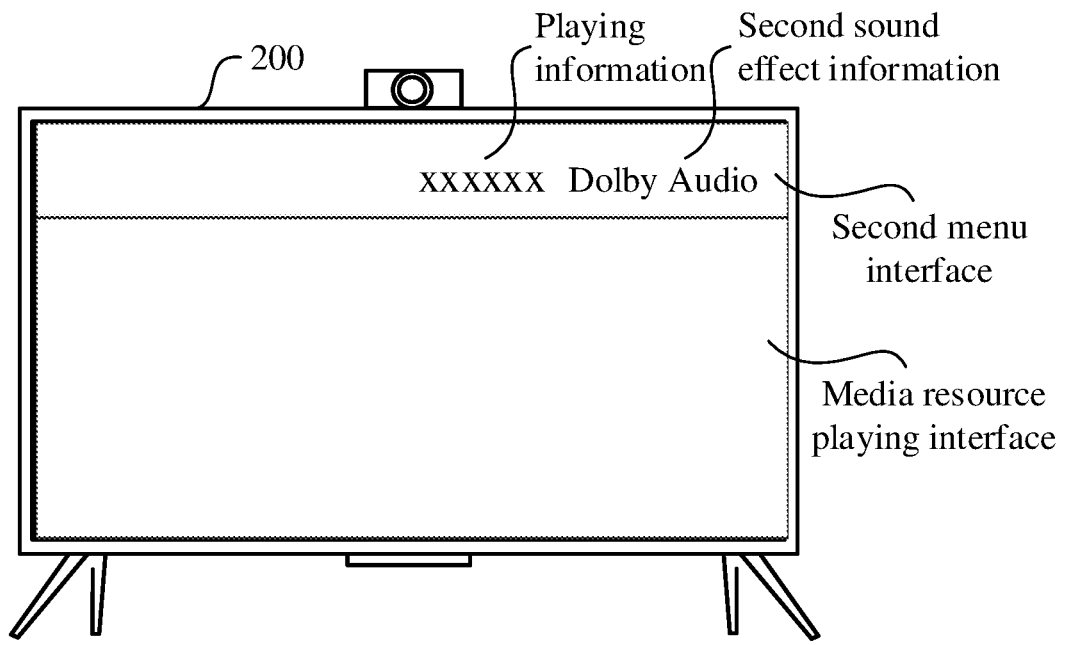
FIG. 53 shows a schematic diagram of a user interface presenting a second menu interface according to some embodiments.

FIG. 53 shows an interface presenting the second menu interface according to some embodiments. Referring to FIG. 53, the second menu interface is called by pressing the up key, and the second sound effect information (such as Dolby Audio information) and the playing information (such as definition) are displayed in the second menu interface.

In some embodiments, if the second menu interface is displayed in the media resource playing interface, the second menu interface can be displayed on the top of the media resource playing interface, and the display of the second logo pattern is canceled.

As can be seen, when it is determined that the sound effect type supported by the media resource to be played is the second sound effect type, the starting principle of the second sound effect is activated to generate a broadcast message for starting the second sound effect, and the second sound effect switch is automatically turned on, to implement the start of the second sound effect and play synchronously with the media resource. The display apparatus can not only provide the specific sound effect with higher auditory effect when playing the media resource, but also automatically start the corresponding specific sound effect, so that the sound effect is started more efficiently.

In some embodiments, after analyzing the target sound effect type obtained through decoding, if the target sound effect type is neither the first sound effect type nor the second sound effect type, it means that the current media resource only supports the common sound effect. In this case, the system menu module is invoked to keep the switches of the two specific sound effects in the system settings turned off, without displaying the information about the specific sound effects.

In some embodiments, after the playing of the currently played media resource is finished, the automatic recognition system of sound effect will send an exit broadcast message "intent.action.dolby.exit", and the playing module will stop playing the media resource and cancel the display of the media resource playing interface in response to receiving the exit broadcast message; the system menu module will restore the default value for each flag bit corresponding to each specific sound effect after receiving the exit broadcast message; and the Logo display module will hide the logo pattern or menu interface displayed in the whole display apparatus in response to receiving the exit broadcast message.

In some embodiments, the priority of the first sound effect type is higher than that of the second sound effect type. Therefore, after obtaining the target sound effect type of the media resource to be played by decoding, it is firstly to determine whether the target sound effect type is the first sound effect type; if so, then perform the starting principle of the first sound effect; if not, then determine whether the target sound effect type is the second sound effect type; if so, then perform the starting principle of the second sound effect; if not, turn off the switch of the specific sound effect and cancel the display of the relevant interface.

It can be seen that the display apparatus in the embodiments of the disclosure decodes the media resource to be played to obtain the target sound effect type; in response to the target sound effect type being the first sound effect type, the first sound effect is started based on the starting principle of the first sound effect, and the media resource is played based on the first sound effect; in response to the target sound effect type being the second sound effect type, the second sound effect is started based on the starting principle of the second sound effect, and the media resource is played based on the second sound effect. It can be seen that the display apparatus can automatically identify the sound effect type of the media resource, and automatically start a corresponding specific sound effect based on different starting principle, without the need for the user to manually select and start. The sound effect is started more efficiently.

For the convenience of explanation, the above description has been made in combination with specific embodiments. However, the above exemplary discussions are not intended to be exhaustive or to limit embodiments to the specific forms disclosed above. Numerous modifications and variations can be obtained in light of the above teachings. The above embodiments are chosen and described in order to better explain the principles and practical applications, so as to enable those skilled in the art to better utilize the described embodiments and various variant embodiments suitable for specific use considerations.

What is claimed is:

1. A display apparatus, comprising:
   a display configured to display an image from a broadcast system or network and/or a user interface;
   an external device interface configured to connect with one or more external devices;
   a memory configured to store computer instructions and data associated with the display; and
   a processor in connection with the display, the external device interface and the memory and configured to execute the computer instructions to cause the display apparatus to perform:
   receiving a command for adjusting an audio state of an external audio output device in connection with the display apparatus;
   determining a target audio state to which the external audio output device needs to be adjusted by parsing the command, wherein the target audio state comprises a mute state and an unmute state;
   sending an audio state adjusting instruction for adjusting the audio state to the target audio state to the external audio output device; wherein the audio state adjusting instruction is used to adjust a current audio state of the external audio output device to the mute state or the unmute state determined by the target audio state; and
   receiving the mute state or the unmute state from the external audio output device and displaying the mute state or the unmute state on the display of the display apparatus,
   wherein the processor is further configured to execute the computer instructions to cause the display apparatus to perform:
   determining that the external audio output device supports multiple sound systems, and controlling the display to present a system configuration interface for the user to select a user's sound system configuration;
   receiving the user's sound system configuration;
   in response to the multiple sound systems supported by the external audio output device not including a sound system same as a sound system configured by the user's sound system configuration, selecting one of the multiple sound systems of the external audio output device and adjusting the user's sound system configuration to use the selected sound system;
   determining, for reducing data processing amount of the processor, whether an operation for switching between enabling and disabling states of sound channels is needed for the selected sound system, by comparing the selected sound system with a preset sound system, wherein the preset sound system is a sound system last used by the external audio output device connected to the display apparatus; and
   in response to the selected sound system being same as the preset sound system, outputting the audio data using the preset sound system of the external audio output device.

2. The display apparatus according to claim 1, wherein the processor is further configured to execute the computer instructions to cause the display apparatus to perform:
   before determining the external audio output device supports the multiple sound systems, reading a quantity of sound systems supported by the external audio output device, each sound system comprising corresponding sound channels.

3. The display apparatus according to claim 1, wherein the processor is further configured to execute the computer instructions to cause the display apparatus to perform:
   determining a target volume to which the external audio output device needs to be adjusted by parsing the command; and
   sending a volume adjusting instruction and a volume return request to the external audio output device, wherein the volume adjusting instruction is used to adjust a current volume of the external audio output device to the target volume, and the volume return request is used to request the external audio output device to send the target volume after adjustment based on the volume adjusting instruction to the display apparatus.

4. The display apparatus according to claim 3, wherein the processor is further configured to execute the computer instructions to cause the display apparatus to perform:
   receiving the target volume after adjustment sent from the external audio output device; and
   displaying the target volume on a user interface of the display apparatus in a form of a volume bar, wherein the volume bar comprises a particular portion for indicating a size of the target volume, and displaying a value of the target volume near the volume bar.

5. The display apparatus according to claim 1, wherein the processor is further configured to execute the computer instructions to cause the display apparatus to perform:
   determining that the external audio output device needs to be in the mute state by parsing the command; and
   sending a volume adjusting instruction and a volume return request to the external audio output device, wherein the volume adjusting instruction is used to adjust the current audio state of the external audio output device to the mute state, and the volume return request is used to request the external audio output device to send the mute state after adjustment to the display apparatus.

6. The display apparatus according to claim 5, wherein the processor is further configured to execute the computer instructions to cause the display apparatus to perform:
receiving the mute state sent from the external audio output device; and
displaying the mute state on a user interface of the display apparatus in a form of a mute sign.

7. A display apparatus, comprising:
a display configured to display an image from a broadcast system or network and/or a user interface, wherein an external audio output device is in connection with the display apparatus;
a memory configured to store computer instructions and data associated with the display; and
a processor in connection with the display and the memory, and configured to execute the computer instructions to cause the display apparatus to perform:
determining that the external audio output device supports multiple sound systems, and controlling the display to present a system configuration interface for the user to select a user's sound system configuration;
receiving the user's sound system configuration;
in response to the multiple sound systems supported by the external audio output device not including a sound system same as a sound system configured by the user's sound system configuration, selecting one of the multiple sound systems of the external audio output device and adjusting the user's sound system configuration to use the selected sound system;
determining whether an operation for switching between enabling and disabling states of corresponding sound channels is needed for the selected sound system, by comparing the selected sound system with a preset sound system, wherein the preset sound system is a sound system last used by the external audio output device connected to the display apparatus; and
in response to the selected sound system being not same as the preset sound system, enabling one or more sound channels and disabling one or more sound channels according to the selected sound system; and
after a completion of the enabling and disabling of the sound channels according to the selected sound system, outputting the audio data to the one or more enabled sound channels.

8. The display apparatus according to claim 7, wherein the processor is further configured to execute the computer instructions to cause the display apparatus to perform:
in response to starting the enabling and disabling of the sound channel, setting an identification bit corresponding to the sound channel as a first identification bit, wherein the external audio output device in connection with the sound channel does not obtain audio data from the sound channel with the first identification bit; and
in response to ending the enabling and disabling of the sound channel, setting the identification bit corresponding to the sound channel as a second identification bit, wherein the external audio output device in connection with the sound channel obtains audio data from the sound channel with the second identification bit.

9. The display apparatus according to claim 7, wherein disabling the one or more sound channels according to the selected sound system is configured to avoid chaotic sound.

10. The display apparatus according to claim 7, wherein the processor is further configured to execute the computer instructions to cause the display apparatus to perform:
in response to plugging-in of the external audio output device to the display apparatus or removal of plugging-in of the external audio output device from the display apparatus, reading device information of the external audio output device;
creating an audio stream path according to the device information; and
outputting audio data to the enabled one or more sound channels of the external audio output device via the audio stream path.

11. The display apparatus according to claim 10, wherein the processor is further configured to execute the computer instructions to cause the display apparatus to perform:
outputting, by an external service in the display apparatus, the device information, wherein the device information comprises a connection state of the external audio output device and an identity of the external audio output device;
in response to reception of the device information from the external service, outputting, by a policy distribution service in the display apparatus, an instruction notification, wherein the instruction notification comprises the connection state of the external audio output device and the identity of the external audio output device; and
in response to the connection state being a connected state and the reception of the instruction notification sent from the policy distribution service, creating, by an audio driver service in the display apparatus, an audio path corresponding to the identity of the external audio output device.

12. The display apparatus according to claim 11, wherein the processor is further configured to execute the computer instructions to cause the display apparatus to perform:
in response to reception of the device information sent from the external service, filtering, by an audio service in the display apparatus, repeated device information which is a repetition of the device information; and
sending the filtered device information to the policy distribution service.

13. A method for a display apparatus, comprising:
receiving a command for adjusting an audio state of an external audio output device in connection with the display apparatus; wherein the display apparatus comprises: a display configured to display an image from a broadcast system or network and/or a user interface;
determining a target audio state to which the external audio output device needs to be adjusted by parsing the command;
sending an audio state adjusting instruction for adjusting the audio state to the target audio state; wherein the audio state adjusting instruction is used to adjust a current audio state of the external audio output device to a mute state or an unmute state determined by the target audio state; and
receiving the mute state or the unmute state from the external audio output device and displaying the mute state or the unmute state on a display of the display apparatus, the method further comprising:
determining that the external audio output device supports multiple sound systems, and controlling the display to present a system configuration interface for the user to select a user's sound system configuration;
receiving the user's sound system configuration;
in response to the multiple sound systems supported by the external audio output device not including a sound system same as a sound system configured by the user's sound system configuration, selecting one of the multiple sound systems of the external audio output device and adjusting the user's sound system configuration to use the selected sound system;

determining, for reducing data processing amount of the processor, whether an operation for switching between enabling and disabling states of sound channels is needed for the selected sound system, by comparing the selected sound system with a preset sound system, wherein the preset sound system is a sound system last used by the external audio output device connected to the display apparatus; and performing one of:
- in response to the selected sound system being same as the preset sound system, outputting the audio data using the preset sound system of the external audio output device, and
- in response to the selected sound system being not same as the preset sound system, enabling one or more sound channels and disabling one or more sound channels according to the selected sound system; and after a completion of the enabling and disabling of the sound channels according to the selected sound system, outputting the audio data to the one or more enabled sound channels.

14. The method according to claim 13, further comprising:
before determining the external audio output device supports the multiple sound systems, reading a quantity of sound systems supported by the external audio output device, each sound system comprising corresponding sound channels.

15. The method according to claim 13, further comprising:
in response to plugging-in of the external audio output device to the display apparatus or removal of plugging-in of the external audio output device from the display apparatus, reading device information of the external audio output device;
creating an audio stream path according to the device information; and
outputting audio data to the enabled one or more sound channels of the external audio output device via the audio stream path.

16. The method according to claim 13, wherein disabling the one or more sound channels according to the selected sound system is configured to avoid chaotic sound.

17. The method according to claim 13, further comprising:
determining a target volume to which the external audio output device needs to be adjusted by parsing the command; and
sending a volume adjusting instruction and a volume return request to the external audio output device, wherein the volume adjusting instruction is used to adjust a current volume of the external audio output device to the target volume and the volume return request is used to request the external audio output device to send the target volume after adjustment to the display apparatus.

18. The method according to claim 17, further comprising:
receiving the target volume after adjustment sent from the external audio output device; and
displaying the target volume on a user interface of the display apparatus in a form of a volume bar, wherein the volume bar comprises a particular portion for indicating a size of the target volume, and displaying a value of the target volume near the volume bar.

19. The method according to claim 13, further comprising:
determining that the external audio output device needs to be in the mute state by parsing the command; and
sending a volume adjusting instruction and a volume return request to the external audio output device, wherein the volume adjusting instruction is used to adjust the current audio state of the external audio output device to the mute state, and the volume return request is used to request the external audio output device to send the mute state to the display apparatus.

20. The method according to claim 19, further comprising:
receiving the mute state sent from the external audio output device; and
displaying the mute state on a user interface of the display apparatus in a form of a mute sign.

* * * * *